US012607271B2

(12) United States Patent
Nielson et al.

(10) Patent No.: US 12,607,271 B2
(45) **Date of Patent: \*Apr. 21, 2026**

(54) HYDRAULIC FLUID RELEASE VALVE ASSEMBLIES

(71) Applicant: Roadtek Enterprises Inc., Blaine, WA (US)

(72) Inventors: Dustin Nielson, Sedro Wolley, WA (US); Maggie Hu, Vancouver (CA)

(73) Assignee: Roadtek Enterprises Inc.

( * ) Notice: Subject to any disclaimer, the term of this patent is extended or adjusted under 35 U.S.C. 154(b) by 23 days.

This patent is subject to a terminal disclaimer.

(21) Appl. No.: 18/614,471

(22) Filed: Mar. 22, 2024

(65) Prior Publication Data

US 2025/0297688 A1     Sep. 25, 2025

(51) Int. Cl.
*F16K 15/18* (2006.01)
*F16K 31/06* (2006.01)

(52) U.S. Cl.
CPC ........ *F16K 15/182* (2021.08); *F16K 15/1823* (2021.08); *F16K 31/0655* (2013.01); *F15B 2211/50536* (2013.01); *Y10T 137/7782* (2015.04); *Y10T 137/7841* (2015.04); *Y10T 137/7845* (2015.04); *Y10T 137/7876* (2015.04); *Y10T 137/7877* (2015.04); *Y10T 137/7925* (2015.04); *Y10T 137/7927* (2015.04); *Y10T 137/7929* (2015.04)

(58) Field of Classification Search
USPC ............. 137/522, 538, 539; 251/77–83, 126, 251/129.03, 129.11, 251–263; 60/482
See application file for complete search history.

(56) References Cited

U.S. PATENT DOCUMENTS

| | | | | |
|---|---|---|---|---|
| 1,723,131 A | * | 8/1929 | Burkholder | ............... B66F 3/42 60/482 |
| 1,779,640 A | * | 10/1930 | Rayfield | ............ F02M 37/0023 251/83 |
| 1,868,498 A | | 7/1932 | Gruman | |

(Continued)

FOREIGN PATENT DOCUMENTS

| | | |
|---|---|---|
| CN | 201169513 Y | 12/2008 |
| CZ | 2018402 A3 | 2/2020 |

(Continued)

OTHER PUBLICATIONS

International Search Report and Written Opinion Application No. PCT/US2024/053981 dated Mar. 24, 2025, 20 pages.

*Primary Examiner* — Matthew W Jellett
(74) *Attorney, Agent, or Firm* — AEON Law, PLLC; Adam L. K. Philipp; James Namiki

(57) ABSTRACT

Hydraulic fluid release valve assemblies are described herein. The hydraulic fluid release valve assemblies may include a hydraulic unit base with a hydraulic fluid return channel and a hydraulic fluid release valve that is at least partially inserted in the hydraulic fluid return channel. The hydraulic fluid release valve assembly may further include a driving assembly to contact with the hydraulic fluid release valve to apply a pushing force on the hydraulic release valve to open the hydraulic fluid release valve, and an electrically powered driver connected to the driving assembly, the electrically powered driver, when actuated, causes the driving assembly to move to apply the pushing force to the hydraulic fluid release valve.

16 Claims, 27 Drawing Sheets

(56)     References Cited

U.S. PATENT DOCUMENTS

| | | | | |
|---|---|---|---|---|
| 1,893,757 | A | * | 1/1933 | Banks ..................... F16K 17/00 |
| | | | | 60/482 |
| 2,359,802 | A | | 10/1944 | Stephens |
| 2,653,626 | A | * | 9/1953 | Finlayson ............... F15B 13/01 |
| | | | | 251/60 |
| 3,088,283 | A | * | 5/1963 | Furia .................. A01B 63/1013 |
| | | | | 91/461 |
| 3,744,518 | A | | 7/1973 | Stacey |
| 4,080,994 | A | | 3/1978 | Flaschar et al. |
| 4,343,596 | A | | 8/1982 | Shimazawa et al. |
| 4,391,296 | A | * | 7/1983 | Abbott ................ F16K 31/0613 |
| | | | | 137/523 |
| 4,650,159 | A | * | 3/1987 | Shimamura ............. F16K 31/04 |
| | | | | 251/258 |
| 5,095,939 | A | * | 3/1992 | Alderfer ................. F16K 17/04 |
| | | | | 137/512.1 |
| 5,113,896 | A | * | 5/1992 | Tortellier ............ F16K 31/0675 |
| | | | | 137/269 |
| 5,113,899 | A | * | 5/1992 | Yonezawa ............... F16K 15/18 |
| | | | | 251/297 |
| 5,464,330 | A | | 11/1995 | Prince et al. |
| 6,029,448 | A | * | 2/2000 | Hobson .............. F15B 11/0423 |
| | | | | 417/42 |
| 6,295,812 | B1 | * | 10/2001 | Hsu ........................... F15B 7/04 |
| | | | | 60/482 |

| | | | | |
|---|---|---|---|---|
| 6,971,628 | B2 | * | 12/2005 | Ichimaru ........... F16K 31/52416 |
| | | | | 251/251 |
| 7,533,556 | B2 | * | 5/2009 | Lefavour ................ B25F 5/005 |
| | | | | 60/477 |
| 9,670,040 | B2 | * | 6/2017 | Martinez Martinez ... B66F 3/25 |
| 10,487,854 | B2 | * | 11/2019 | Schneider ................. F15B 1/04 |
| 10,859,075 | B2 | | 12/2020 | Bredbeck et al. |
| 2009/0246045 | A1 | | 10/2009 | Kathmann |
| 2013/0121861 | A1 | | 5/2013 | Schepp et al. |
| 2017/0158473 | A1 | | 6/2017 | Wu |
| 2017/0298963 | A1 | * | 10/2017 | Linjie ..................... F15B 15/18 |
| 2017/0356472 | A1 | * | 12/2017 | Ballard ................ B23D 29/002 |
| 2019/0048862 | A1 | | 2/2019 | Lee |
| 2021/0199138 | A1 | | 7/2021 | Okamoto et al. |
| 2021/0404487 | A1 | | 12/2021 | Trinchieri |
| 2023/0191581 | A1 | | 6/2023 | Ballard |

FOREIGN PATENT DOCUMENTS

| | | | |
|---|---|---|---|
| DE | | 1453531 A1 | 5/1969 |
| DE | 102015220204 A1 | | 4/2017 |
| DE | 102018124776 A1 | | 4/2020 |
| EP | | 2634426 A1 | 9/2013 |
| FR | | 936664 | 7/1948 |
| GB | | 837087 A | 6/1960 |
| GB | | 2471941 A | 1/2011 |
| RU | | 2204735 C1 | 5/2003 |

* cited by examiner

HYDRAULIC FLUID RELEASE VALVE ASSEMBLIES

CROSS-REFERENCE TO RELATED APPLICATION(S)

This application is a co-pending application to U.S. patent application Ser. No. 18/614,462 entitled Hydraulic Piston Pump Assemblies, naming as inventors Dustin Nielson and Maggie Hu, filed on Mar. 22, 2024, and to U.S. patent application Ser. No. 18/614,420 entitled Hydraulic Jack Assemblies, naming as inventors Dustin Nielson and Maggie Hu, filed on Mar. 22, 2024, which are incorporated herein by reference in their entirety.

BACKGROUND

Field of the Embodiments

The present disclosure relates to valves, and more particularly, to electrically powered hydraulic release valve assemblies.

Description of the Related Art

A hydraulic jack typically comprises a pump that drives a hydraulic fluid, such as oil, from a hydraulic fluid reservoir into a hydraulic cylinder containing a ram rod (or simply "ram") during a load-lifting operation. During a lifting operation, the ram pushes upwards a lifting arm with a saddle that sits on the end of the lifting arm. The saddle is typically placed underneath the load so that the ram through the lifting arm and the saddle pushes the load upwards during the lifting operation. To lower the load, the hydraulic fluid contained in the hydraulic cylinder is discharged back to the hydraulic fluid reservoir by opening a release valve between the hydraulic cylinder and the hydraulic fluid.

Existing hydraulic jacks can be divided into electric and manual types. The electric type uses a motor to drive an electric pump to inject the hydraulic fluid into the hydraulic cylinder for lifting loads and the manual type uses a manual pump that requires the operator to manually and repeatedly press the pump to inject the hydraulic fluid into the hydraulic cylinder for lifting loads.

During a load-lowering operation performed by either the electric types or the manual types of hydraulic jacks, a hydraulic fluid release valve that is located in a hydraulic fluid return channel between the hydraulic cylinder and a hydraulic fluid reservoir (hereinafter "hydraulic fluid tank") will be opened so that the hydraulic fluid in the hydraulic cylinder, which may be under high pressure, can flow to the hydraulic fluid tank. Such an operation normally requires the operator to manually open the hydraulic fluid release valve to lower the lift arm assembly of the hydraulic jack regardless of whether the hydraulic jack is a manual or electric type of hydraulic jack.

The hydraulic fluid release valves that are used in conventional hydraulic jacks are opened and closed manually using a twisted motion of the jack handle or the release valve itself. It is by manual power and not by electric power that such operations are typically performed. That is, the conventional hydraulic fluid release valves that are commonly used in such situations are typically opened and closed manually by an operator when the operator manually employs certain components to push the valve pin away from the valve seat to open the hydraulic fluid release valve and fluidly connect the hydraulic fluid source (e.g., hydraulic cylinder) to a hydraulic fluid reservoir (e.g., hydraulic fluid tank).

As to the pumps of these conventional hydraulic jacks, they often employ a piston pump to inject the hydraulic fluid into a hydraulic cylinder. As noted above, a hydraulic jack can be either manually operated or electrically powered jacks that employ electric pumps. Electric pumps rely on electricity as the power source for running, for example, electric motors to run the pumps. Generally, the amount of hydraulic fluid supplied by an electric pump of a conventional electric hydraulic jack is constant when used, so the lifting speed of the piston is uniform regardless of whether there is a heavy load, a light load, or no load. Further, to maintain the lifting capabilities for heavier loads and to improve the stability during lifting operations, the lifting speed is generally set slower, resulting in the lifting speed being too slow when there is no load or a light load.

SUMMARY

Various embodiments of the present disclosure provide for hydraulic fluid release valve assemblies. In some embodiments, a hydraulic fluid release valve assembly may include a hydraulic unit base with a hydraulic fluid return channel, and a hydraulic fluid release valve that is at least partially inserted in the hydraulic fluid return channel. The hydraulic fluid release valve assemblies may further include a driving assembly to apply a pushing force on the hydraulic release valve to open the hydraulic fluid release valve, and an electrically powered driver connected to the driving assembly, the electrically powered driver, when actuated, causes the driving assembly to move to apply the pushing force to the hydraulic fluid release valve.

In some embodiments, the hydraulic unit base may be a support structure comprised of steel, iron, aluminum, or other metal or alloy. In some embodiments, the hydraulic fluid return channel of the hydraulic unit base may have a first end and a second end opposite of the first end, wherein the first end of the hydraulic fluid return channel is located at a surface of the hydraulic unit base and the second end of the hydraulic fluid return channel is a closed-end, and wherein the hydraulic fluid release valve partially extends out of the hydraulic unit base through the first end of the hydraulic fluid return channel.

In some embodiments, the hydraulic fluid release valve may include a valve pin movably placed in the hydraulic fluid return channel and having a first end and a second end opposite of the first end, the first end of the valve pin being nearer to the first end of the hydraulic fluid return channel than the second end of the valve pin, and a valve seat disposed in the hydraulic fluid return channel between the first end of the valve pin and the first end of the hydraulic fluid return channel to seat the first end of the valve pin when the valve pin is urged to mate with the valve seat, wherein when the valve pin is seated on the valve seat, hydraulic fluid is prevented from flowing through the hydraulic fluid return channel.

In some embodiments, the valve seat may protrude out of one or more walls of the hydraulic fluid return channel. In some embodiments, the hydraulic fluid release valve may further comprise a push rod movably disposed in the hydraulic fluid return channel and having a first end and a second end opposite of the first end, the first end of the push rod extending out of the hydraulic unit base through the first end of the hydraulic fluid return channel. In some embodiments, the hydraulic fluid release valve further includes a first spring in contact with the push rod to urge the push rod towards the first end of the hydraulic fluid return channel, and a second spring disposed between the second end of the valve pin and the second end of the hydraulic fluid return channel to urge the first end of the valve pin towards the valve seat. In some embodiments, In some embodiments, the hydraulic unit base may include a hydraulic fluid inlet and a hydraulic fluid outlet connected to (e.g., in fluid communication with) the hydraulic fluid return channel, the hydraulic fluid inlet to connect with a high-pressure hydraulic source to receive pressurized hydraulic fluid from the high-pressure hydraulic source and the hydraulic fluid outlet to connect with a hydraulic fluid tank to discharge the pressurized hydraulic fluid into the hydraulic fluid tank via the hydraulic fluid return channel. For these embodiments, the valve seat may divide the hydraulic fluid return channel into a first channel segment and a second channel segment, the first channel segment includes the push rod and the second channel segment includes the valve pin, and wherein the hydraulic fluid outlet is connected to the first channel segment and the hydraulic fluid inlet is connected to the second channel segment.

In some embodiments, the valve may be a two-stage valve pin that includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity. For these embodiments, the second spring may be in contact with another end of the primary valve pin that is opposite from the end of the primary valve pin attached to the push pin to urge the primary valve pin to be fully inserted into the secondary valve pin cavity and to fully extend the push pin out of the hole at the end of the secondary valve pin.

In some embodiments, the outer surface of the primary valve pin is provided with a spiral groove. In some embodiments, an outer surface of the secondary valve pin may be provided with an outlet groove. In some embodiments, the hydraulic fluid release valve assembly further includes a sealing ball disposed between the push pin and the primary valve pin, wherein the sealing ball having a larger diameter than a diameter of the hole at the end of the secondary valve pin cavity.

In some embodiments, the driving assembly may include a guide slope piece attached to a driving arm, an end of the driving arm being connected to the electrically powered driver. For these embodiments, the driving arm may be an articulated arm with a pivot point. In some embodiments, the end of the driving arm that is connected to the electrically powered driver is a first arm end, and the driving arm may further include a second arm end at an opposite end from the first arm end, the second arm end rotatably connected to a support bar on the hydraulic unit base, and the guide slope piece attached to the driving arm to push down on the push rod of the hydraulic fluid release valve when the second arm end rotates around the support bar. In some embodiments, the second arm end may be connected to the support bar via a bearing.

In some embodiments, the electrically powered driver is further connected to a puller to manually cause the driving assembly to apply the pushing force to the hydraulic fluid release valve. In some embodiments, the electrically powered driver includes at least one of a push-pull electromagnet, an electric push rod, an air cylinder, a hydraulic cylinder, or a servo cam mechanism.

In various embodiments, a valve assembly is disclosed that includes a hydraulic unit base having a support structure body with a hydraulic fluid return channel disposed in the support structure body of the hydraulic unit base, the hydraulic fluid channel having a first end and a second end opposite of the first end, wherein the first end of the hydraulic fluid return channel is located at a surface of the hydraulic unit base and the second end of the hydraulic fluid return channel is a closed-end. The valve assembly may also include a two-stage valve pin movably disposed in the hydraulic fluid return channel and having a first end and a second end opposite of the first end, the first end of the two-stage valve pin being nearer to the first end of the hydraulic fluid return channel than the second end of the two-stage valve pin, the two-stage valve pin includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity. The valve assembly may additionally include a valve seat disposed in the hydraulic fluid return channel between the two-stage valve pin and the first end of the hydraulic fluid return channel to seat the first end of the two-stage valve pin when the two-stage valve pin is urged to mate with the valve seat, wherein when the primary valve pin is fully inserted into the secondary valve pin cavity and when the two-stage valve pin is seated on the valve seat, hydraulic fluid is prevented from flowing through the hydraulic fluid return channel. And the valve assembly may further include a push rod movably disposed in the hydraulic fluid return channel and having a first end and a second end opposite of the first end, the first end of the push rod extending out of the hydraulic unit base through the first end of the hydraulic fluid return channel and the second end of the push rod to contact the push pin first before contacting the secondary valve pin when the push rod is urged towards the second end of the hydraulic fluid return channel.

In some embodiments, the hydraulic fluid return channel may include a first spring in contact with the push rod to urge the push rod towards the first end of the hydraulic fluid return channel, and a second spring disposed between the second end of the two-stage valve pin and the second end of the hydraulic fluid return channel to urge the first end of the two-stage valve pin towards the valve seat. In some embodiments, the second spring may be in contact with another end of the primary valve pin that is opposite from the end of the primary valve pin attached to the push pin to urge the primary valve pin to be fully inserted into the secondary valve pin cavity and to fully extend the push pin out of the hole at the end of the secondary valve pin. In some embodiments, the outer surface of the primary valve pin is provided with a spiral groove and wherein the outer surface of the secondary valve pin is provided with an outlet groove to provide throttling control of hydraulic fluid flow.

Various embodiments of the present disclosure provide for hydraulic piston pump assemblies. In some embodiments, a hydraulic piston pump assembly may include a hydraulic unit base having therein a piston cavity, a small piston outlet channel, and a medium piston outlet channel, the small piston outlet channel and the medium piston outlet channel each connected to (e.g., in fluid communication with) a respective fluid inlet and a respective fluid outlet. The hydraulic piston pump assembly may also include a dual pump piston that is slidably disposed in the piston cavity, the dual pump piston comprising a small piston and a medium piston connected to the small piston along a longitudinal axis of the dual pump piston. For these embodiments, the small piston may have a smaller displacement volume than the displacement volume of the medium piston. A small piston fluid space may be formed at the periphery of the small piston and a medium piston fluid space may be formed at the periphery of the medium piston, where the small piston outlet channel is connected to (e.g., in fluid communication with) the small piston fluid space and the medium piston outlet channel is connected to (e.g., in fluid communication with) the medium piston fluid space.

In various embodiments, the hydraulic piston pump assembly may additionally include a small piston low-pressure one-way outlet valve and a small piston high-pressure one-way outlet valve that are disposed in series in the small piston outlet channel between the fluid inlet and the fluid outlet connected to the small piston outlet channel to form a small piston temporary storage cavity between the small piston low-pressure one-way outlet valve and the small piston high-pressure one-way outlet valve. For the embodiments, the small piston low-pressure one-way outlet valve and the small piston high-pressure one-way outlet valve may be oriented in the small piston outlet channel such that a fluid can flow from the fluid inlet to the fluid outlet of the small piston outlet channel but cannot flow in opposite direction from the fluid outlet to the fluid inlet of the small piston outlet channel, and wherein the small piston temporary storage cavity is connected (e.g., in fluid communication with) to the small piston fluid space of the small piston. For these embodiments, the hydraulic piston pump assembly may also include a medium piston low-pressure one-way outlet valve and a medium piston high-pressure one-way outlet valve disposed in series in the medium piston outlet channel between the fluid inlet and the fluid outlet connected to the medium piston outlet channel to form a medium piston temporary storage cavity between the medium piston low-pressure one-way outlet valve and the medium piston high-pressure one-way outlet valve. For the embodiments, the medium piston low-pressure one-way outlet valve and the medium piston high-pressure one-way outlet valve may be oriented in the medium piston outlet channel such that a fluid can flow from the fluid inlet to the fluid outlet of the medium piston outlet channel but cannot flow in opposite direction from the fluid outlet to the fluid inlet of the medium piston outlet channel, and wherein the medium piston temporary storage cavity is connected to (e.g., in fluid communication with) the medium piston fluid space of the medium piston.

In some embodiments, the hydraulic unit base may be a support structure comprised of steel, iron, aluminum, or other metal or alloy. In some embodiments, the hydraulic piston pump assembly may further include a pump housing installed in a segment of the piston cavity, wherein the dual pump piston is positioned in the piston cavity such that the pump housing slidingly encircles at least a portion of the small piston. In some embodiments, the small piston fluid space is formed between the small piston, the pump housing, and enclosed end of the piston cavity, and wherein the medium piston fluid space is formed between the medium piston and the pump housing.

In some embodiments, the piston cavity, the small piston outlet channel, and the medium piston outlet channel may have elongated cavity shapes with a respective longitudinal axis, and the axis of the small piston outlet channel and the axis of the medium piston outlet channel are orthogonal to the axis of the piston cavity. In some embodiments, the piston cavity may have a closed end and an opened end opposite of the closed end, and the dual pump piston may extend at least partially out of the opened end of the piston cavity into a drive cavity, wherein the drive cavity may include an eccentric wheel to drive the dual pump piston. In some embodiments, the hydraulic piston pump assembly may further include a spring in the piston cavity to urge the dual pump piston to at least partially extend out of the opened end of the piston cavity. In some embodiments, the hydraulic piston pump assembly may further include a motor connected to the eccentric wheel to cause the eccentric wheel to rotate to drive the dual pump piston.

In some embodiments, the hydraulic unit base may further include a first overflow channel including a small piston safety valve that is set to open when the small piston high-pressure one-way outlet valve is closed and when hydraulic fluid pressure in the small piston fluid space exceeds the cracking pressure of the small piston safety valve at which the small piston safety valve opens. In some embodiments, the hydraulic unit base may further include a second overflow channel including a medium piston safety valve that is set to open when the medium piston high-pressure one-way outlet valve is closed and when hydraulic fluid pressure in the medium piston fluid space exceeds the cracking pressure of the medium piston safety valve at which the medium piston safety valve opens. In some embodiments, the cracking pressure of the medium piston safety valve is less than the cracking pressure of the small piston safety valve.

In some embodiments, the hydraulic unit base further includes a large piston cavity having a larger volume than the piston cavity, the large piston cavity having a closed end and an opened end connected to the drive cavity, and a large piston slidably disposed in the large piston cavity extending at least partially out of the opened end of the large piston cavity into the drive cavity.

In some embodiments, the hydraulic piston pump assembly may further include a spring in the large piston cavity to urge the large piston to at least partially extend out of the opened end of the large piston cavity.

In some embodiments, the hydraulic unit base may further include a large piston outlet channel connected to a respective fluid inlet and a respective fluid outlet, where the large piston outlet channel further includes a large piston low-pressure one-way outlet valve and a large piston high-pressure one-way outlet valve disposed in series in the large piston outlet channel between the fluid inlet and the fluid outlet connected to the large piston outlet channel to form a large piston temporary storage cavity between the large piston low-pressure one-way outlet valve and the large piston high-pressure one-way outlet valve. For these embodiments, the large piston low-pressure one-way outlet valve and the large piston high-pressure one-way outlet valve are oriented in the large piston outlet channel such that a fluid can flow from the fluid inlet to the fluid outlet of the large piston outlet channel but cannot flow in opposite direction from the fluid outlet to the fluid inlet of the large piston outlet channel, and wherein the large piston temporary storage cavity is connected to the large piston cavity.

In some embodiments, the large piston low-pressure one-way outlet valve may be set to open at a lower pressure than the large piston high-pressure one-way outlet valve. In some embodiments, the large piston low-pressure one-way outlet valve may be a first check valve that includes a first ball and a first spring and the large piston high-pressure one-way outlet valve is a second check valve that includes a second ball and a second spring. In some embodiments, the hydraulic unit base may further include a third overflow channel connected to (e.g., in fluid communication with) the large piston cavity, the third overflow channel that is connected to (e.g., in fluid communication with) the large piston cavity includes a large piston safety valve that is set to open when the large piston high-pressure one-way outlet valve is closed and when the hydraulic fluid pressure in the large piston cavity exceeds the cracking pressure of the large piston safety valve. In some embodiments, the cracking pressure for the large piston safety valve is lower than the cracking pressure of the medium piston safety valve.

In some embodiments, the dual pump piston has a first end and a second end opposite of the first end, wherein the first end extends at least partially out of the opened end of the piston cavity, the small piston positioned further away from the first end of the dual-piston then the medium piston.

In some embodiments, the small piston low-pressure one-way outlet valve may be set to open at a lower pressure than the small piston high-pressure one-way outlet valve. In some embodiments, the medium piston low-pressure one-way outlet valve is set to open at a lower pressure than the medium piston high-pressure one-way outlet valve.

In some embodiments, the small piston low-pressure one-way outlet valve is a first check valve that includes a first ball and a first spring, the small piston high-pressure one-way outlet valve is a second check valve that includes a second ball and a second spring, the medium piston low-pressure one-way outlet valve is a third check valve that includes a third ball and a third spring, and the medium piston high-pressure one-way outlet valve is a fourth check valve that includes a fourth ball and fourth spring.

In some embodiments, a hydraulic piston pump assembly may include a hydraulic unit base having therein a first piston cavity and a second piston cavity, a drive cavity connected to (e.g., in fluid communication with) the first and second piston cavities, a small piston outlet channel, and a large piston outlet channel, the small piston outlet channel and the large piston outlet channel each connected to a respective fluid inlet and a respective fluid outlet. The hydraulic piston pump assembly may also include a small piston that is slidably disposed in the first piston cavity and a large piston that is slidably disposed in the second piston cavity, the small piston having a smaller displacement volume than the displacement volume of the large piston. The hydraulic piston pump assembly may also include an eccentric wheel that is included in the drive cavity to drive the small piston and the large piston.

In various embodiments, the hydraulic piston pump assembly may also include a small piston low-pressure one-way outlet valve and a small piston high-pressure one-way outlet valve disposed in series in the small piston outlet channel between the fluid inlet and the fluid outlet connected to the small piston outlet channel to form a small piston temporary storage cavity between the small piston low-pressure one-way outlet valve and the small piston high-pressure one-way outlet valve. For these embodiments, the small piston low-pressure one-way outlet valve and the small piston high-pressure one-way outlet valve may be oriented in the small piston outlet channel such that a fluid can flow from the fluid inlet to the fluid outlet of the small piston outlet channel but cannot flow in opposite direction from the fluid outlet to the fluid inlet of the small piston outlet channel, and wherein the small piston temporary storage cavity is connected to the first piston cavity.

In various embodiments, the hydraulic piston pump assembly may also include a large piston low-pressure one-way outlet valve and a large piston high-pressure one-way outlet valve disposed in series in the large piston outlet channel between the fluid inlet and the fluid outlet connected to the large piston outlet channel to form a large piston temporary storage cavity between the large piston low-pressure one-way outlet valve and the large piston high-pressure one-way outlet valve. For these embodiments, the large piston low-pressure one-way outlet valve and the large piston high-pressure one-way outlet valve may be oriented in the large piston outlet channel such that a fluid can flow from the fluid inlet to the fluid outlet of the large piston outlet channel but cannot flow in opposite direction from the fluid outlet to the fluid inlet of the large piston outlet channel, and wherein the large piston temporary storage cavity is connected to the second piston cavity.

Various embodiments of the present disclosure provide for hydraulic jack assemblies. In some embodiments, a hydraulic jack assembly may include a hydraulic cylinder including a ram, a hydraulic fluid tank, and a hydraulic unit base connected to the hydraulic cylinder and the hydraulic fluid tank and having a support structure body with a hydraulic fluid return channel disposed in the support structure body of the hydraulic unit base, the hydraulic fluid return channel having a first end and a second end opposite of the first end, and wherein the first end of the hydraulic fluid return channel is located at a surface of the hydraulic unit base and the second end of the hydraulic fluid return channel is a closed-end. The hydraulic jack assembly may also include a two-stage valve pin movably that is disposed in the hydraulic fluid return channel and that has a first end and a second end opposite of the first end, the first end of the two-stage valve pin being nearer to the first end of the hydraulic fluid return channel than the second end of the two-stage valve pin, the two-stage valve pin includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity.

The hydraulic jack assembly may further include a valve seat disposed in the hydraulic fluid return channel between the two-stage valve pin and the first end of the hydraulic fluid return channel to seat the first end of the two-stage valve pin when the two-stage valve pin is urged to mate with the valve seat, wherein when the primary valve pin is fully inserted into the secondary valve pin cavity and when the two-stage valve pin is seated on the valve seat, hydraulic fluid is prevented from flowing through the hydraulic fluid return channel. And the hydraulic jack assembly includes a push rod movably disposed in the hydraulic fluid return channel and that has a first end and a second end opposite of the first end, the first end of the push rod extending out of the hydraulic unit base through the first end of the hydraulic fluid return channel and the second end of the push rod to contact the push pin first before contacting the secondary valve pin when the push rod is urged towards the second end of the hydraulic fluid return channel.

In some embodiments, the hydraulic fluid tank at least partially encapsulates the hydraulic cylinder. In some embodiments, the hydraulic unit base includes a hydraulic fluid inlet and a hydraulic fluid outlet connected to the hydraulic fluid return channel, the hydraulic fluid inlet is further connected with the hydraulic cylinder to receive pressurized hydraulic fluid from the hydraulic cylinder and the hydraulic fluid outlet is connected to the hydraulic fluid tank to discharge the pressurized hydraulic fluid into the hydraulic fluid tank via the hydraulic fluid return channel. For these embodiments, the valve seat may divide the hydraulic fluid return channel into a first channel segment and a second channel segment, wherein the push rod is located in the first segment and the two-stage valve pine is located in the second channel segment, and wherein the hydraulic fluid inlet is connected to the second channel segment and the hydraulic fluid outlet is connected to the hydraulic fluid tank.

In some embodiments, the hydraulic fluid return channel includes a first spring in contact with the push rod to urge the push rod towards the first end of the hydraulic fluid return channel, and a second spring disposed between the second end of the two-stage valve pin and the second end of the hydraulic fluid return channel to urge the first end of the two-stage valve pin towards the valve seat. In some embodiments, the second spring is in contact with another end of the primary valve pin that is opposite from the end of the primary valve pin attached to the push pin to urge the primary valve pin to be fully inserted into the secondary valve pin cavity and to fully extend the push pin out of the hole at the end of the secondary valve pin.

In some embodiments, the hydraulic jack assembly may further comprise a driving assembly to apply a pushing force on the push rod. For these embodiments, the driving assembly may include a guide slope piece attached to a driving arm, and an end of the driving arm being connected to the electrically powered driver. In some embodiments, the driving arm may be an articulated arm with a pivot point. In some embodiments, the end of the driving arm that is connected to the electrically powered driver is a first arm end, and the driving arm further includes a second arm end at an opposite end from the first arm end, the second arm end rotatably connected to a support bar on the hydraulic unit base, and the guide slope piece attached to the driving arm to push down on the push rod of the hydraulic fluid release valve when the second arm end rotates around the support bar.

In some embodiments, a hydraulic jack assembly may include a hydraulic cylinder assembly including a hydraulic cylinder containing a ram and a hydraulic fluid tank that at least partially encapsulates the hydraulic cylinder, a hydraulic unit base with a hydraulic fluid return channel that is connected to the hydraulic cylinder and the hydraulic fluid tank, a hydraulic fluid release valve that is at least partially inserted in the hydraulic fluid return channel, a driving assembly to apply a pushing force on the hydraulic release valve to open the hydraulic fluid release valve, and an electrically powered driver connected to the driving assembly, the electrically powered driver, when actuated, causes the driving assembly to move to apply the pushing force to the hydraulic fluid release valve.

In some embodiments, a hydraulic jack assembly may include a hydraulic cylinder including a ram, a hydraulic fluid tank, and a hydraulic unit base having therein a piston cavity, a small piston outlet channel, and a medium piston outlet channel, the small piston outlet channel and the medium piston outlet channel each connected to a respective fluid inlet and a respective fluid outlet. In some embodiments, the hydraulic jack assembly may also include a dual pump piston slidably disposed in the piston cavity, the dual pump piston comprising a small piston and a medium piston connected to the small piston along a longitudinal axis of the dual pump piston, the small piston having a smaller displacement volume than a displacement volume of the medium piston. For these embodiments, a small piston fluid space is formed at a periphery of the small piston and a medium piston fluid space is formed at a periphery of the medium piston, wherein the small piston outlet channel is connected to the small piston fluid space and the medium piston outlet channel is connected to the medium piston fluid space.

The hydraulic jack assembly may also include a small piston low-pressure one-way outlet valve and a small piston high-pressure one-way outlet valve disposed in series in the small piston outlet channel between the fluid inlet and the fluid outlet connected to the small piston outlet channel to form a small piston temporary storage cavity between the small piston low-pressure one-way outlet valve and the small piston high-pressure one-way outlet valve, wherein the small piston low-pressure one-way outlet valve and the small piston high-pressure one-way outlet valve are oriented in the small piston outlet channel such that a fluid can flow from the fluid inlet to the fluid outlet of the small piston outlet channel but cannot flow in opposite direction from the fluid outlet to the fluid inlet of the small piston outlet channel, and wherein the small piston temporary storage cavity is connected to the small piston fluid space of the small piston. The hydraulic jack assembly may further include a medium piston low-pressure one-way outlet valve and a medium piston high-pressure one-way outlet valve disposed in series in the medium piston outlet channel between the fluid inlet and the fluid outlet connected to the medium piston outlet channel to form a medium piston temporary storage cavity between the medium piston low-pressure one-way outlet valve and the medium piston high-pressure one-way outlet valve, wherein the medium piston low-pressure one-way outlet valve and the medium piston high-pressure one-way outlet valve are oriented in the medium piston outlet channel such that a fluid can flow from the fluid inlet to the fluid outlet of the medium piston outlet channel but cannot flow in opposite direction from the fluid outlet to the fluid inlet of the medium piston outlet channel, and wherein the medium piston temporary storage cavity is connected to the medium piston fluid space of the medium piston.

For these embodiments, the respective fluid inlets of the small piston outlet channel and the medium piston outlet channel are connected to the hydraulic fluid tank, and the respective fluid outlets of the small piston outlet channel and the medium piston outlet channel are connected to the hydraulic cylinder.

In some embodiments, the hydraulic fluid tank at least partially encapsulates the hydraulic cylinder. In some embodiments, the piston cavity, the small piston outlet channel, and the medium piston outlet channel have elongated cavity shapes with a respective longitudinal axis, and the axis of the small piston outlet channel and the axis of the medium piston outlet channel are orthogonal to the axis of the piston cavity.

In some embodiments, the piston cavity has a closed end and an opened end opposite of the closed end, the dual pump piston extending at least partially out of the opened end of the piston cavity into a drive cavity, wherein the drive cavity includes an eccentric wheel to drive the dual pump piston. For these embodiments, the hydraulic jack assembly may further include a motor connected to the eccentric wheel to cause the eccentric wheel to rotate to drive the dual pump piston.

In some embodiments, the hydraulic unit base further includes a first overflow channel including a small piston safety valve that is set to open when the small piston high-pressure one-way outlet valve is closed and when hydraulic fluid pressure in the small piston fluid space exceeds the cracking pressure of the small piston safety valve at which the small piston safety valve opens. In some embodiments, the hydraulic unit base further includes a second overflow channel including a medium piston safety valve that is set to open when the medium piston high-pressure one-way outlet valve is closed and when hydraulic fluid pressure in the medium piston fluid space exceeds the cracking pressure of the medium piston safety valve at which the medium piston safety valve opens. In some embodiments, the hydraulic unit base further includes a large piston cavity having a larger volume than the piston cavity, the large piston cavity having a closed end and an opened end connected to the drive cavity, and a large piston slidably disposed in the large piston cavity extending at least partially out of the opened end of the large piston cavity into the drive cavity.

In some embodiments, the hydraulic unit base further includes a large piston outlet channel connected to a respective fluid inlet and a respective fluid outlet. The large piston outlet channel further includes a large piston low-pressure one-way outlet valve and a large piston high-pressure one-way outlet valve disposed in series in the large piston outlet channel between the fluid inlet and the fluid outlet connected to the large piston outlet channel to form a large piston temporary storage cavity between the large piston low-pressure one-way outlet valve and the large piston high-pressure one-way outlet valve. In various embodiments, the large piston low-pressure one-way outlet valve and the large piston high-pressure one-way outlet valve are oriented in the large piston outlet channel such that fluid can flow from the fluid inlet to the fluid outlet of the large piston outlet channel but cannot flow in opposite direction from the fluid outlet to the fluid inlet of the large piston outlet channel, and wherein the large piston temporary storage cavity is connected to the large piston cavity.

DETAILED DESCRIPTION

Figure 1:
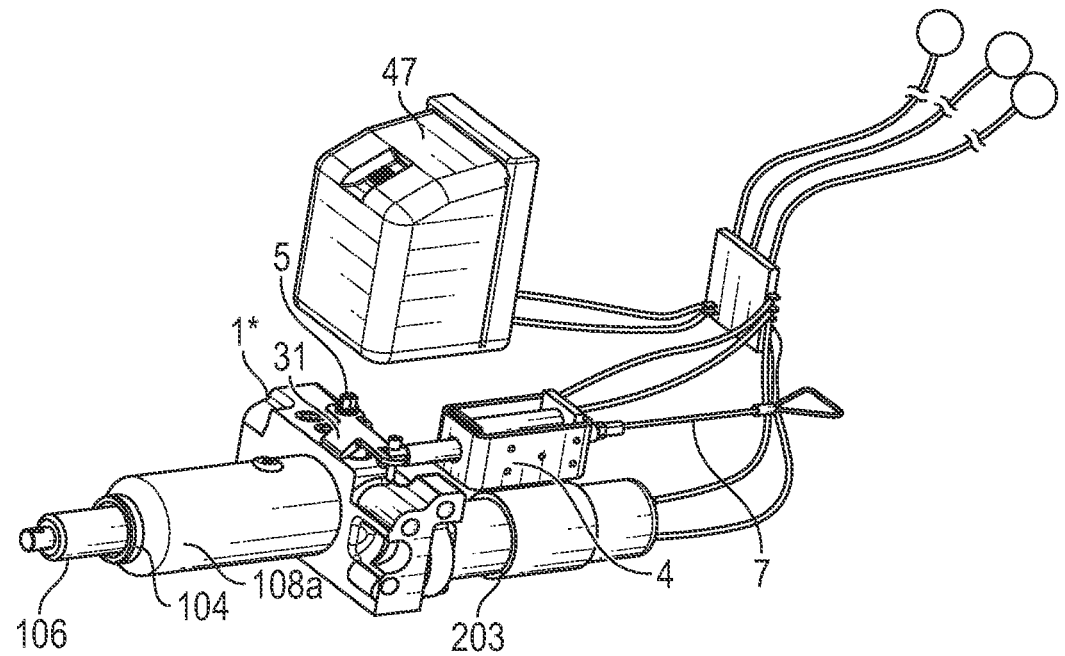
FIG. 1 illustrates some components of an example hydraulic jack according to some example embodiments.

According to various embodiments of the present disclosure, robust electrically powered hydraulic jacks, hereinafter simply "hydraulic jacks," are disclosed that employ efficient structures and assemblies that allow these devices to provide advantageous features and characteristics. For example, and as well be further described herein, these hydraulic jacks may employ electrically powered hydraulic fluid release valve assemblies that have structures and components that make them highly reliable for use even in extreme conditions such as when the loads of the hydraulic jacks are substantial. Further, the hydraulic jacks may additionally or alternatively employ hydraulic piston pump assemblies that have highly efficient structures with small form factors that are highly adaptive to different load conditions. Other useful features of the hydraulic jacks will also be described herein.

According to various embodiments, efficient hydraulic fluid release valve assemblies are disclosed herein that include a hydraulic fluid release valve, which may be opened and closed using an electrically powered driving mechanism, and/or may include a hydraulic fluid release valve with a two-stage valve pin to open the valve. In various embodiments, the hydraulic fluid release valve assemblies may be used to allow hydraulic fluid to flow from, for example, a pressurized hydraulic fluid source to a retention tank (hereinafter "hydraulic fluid tank").

As noted above, in some cases, the hydraulic fluid release valve assemblies may be employed in, for example, hydraulic jacks (e.g., hydraulic floor jacks). In such cases, the hydraulic fluid release valve assemblies may be connected to (e.g., in fluid communication with) the hydraulic cylinder of the hydraulic jack and to a hydraulic fluid tank of the hydraulic jack. More particularly, the hydraulic fluid release valve assemblies may control the flow of high-pressure hydraulic fluid from the hydraulic cylinder to the hydraulic fluid tank of the hydraulic jack, where the hydraulic cylinder typically contains a ram rod (hereinafter simply "ram") that is used to drive the lifting arm of the hydraulic jack upwards during jack lifting operations. The hydraulic fluid in the hydraulic cylinder is often under high pressure, particularly when the hydraulic jack has a heavy load. As a result, it is sometimes difficult to manually open the hydraulic release valves of such devices using a conventional manual release valve system since these valves will have difficulties opening against the high pressure of the hydraulic fluid. By employing an electric driver and/or a two-stage valve pin, the operations to open the hydraulic release valve are made greatly easier and more efficient.

Although the following descriptions of the hydraulic fluid release valve assemblies will be described in the context of being used as part of an electric hydraulic floor jack, in various alternative embodiments, the hydraulic fluid release valve assemblies may be employed in other settings/environments to control the flow of hydraulic fluid, such as oil, between a high-pressure hydraulic fluid source and a repository or holding tank for holding hydraulic fluids.

As will be further described herein, according to various embodiments, hydraulic fluid release valve assemblies are disclosed herein that, in brief, may include, among other things, a hydraulic unit base (e.g., a support structure or housing), a hydraulic fluid release valve that is at least partially disposed in the hydraulic unit base, and a driving mechanism that includes a driving assembly and an electrically powered driver. For example, in some embodiments, a hydraulic fluid release valve assembly may include a hydraulic unit base that includes a hydraulic fluid return channel, a hydraulic fluid release valve that is at least partially inserted into the hydraulic fluid return channel, a driving assembly to apply a pushing force on the hydraulic release valve to open the hydraulic fluid release valve, and an electrically powered driver connected to the driving assembly, the electrically powered driver, when actuated, causes the driving assembly to move to apply the pushing force to the hydraulic releasee valve.

In some alternative embodiments, a hydraulic fluid release valve assembly may include a hydraulic unit base having a support structure body with a hydraulic fluid return channel disposed in the support structure body of the hydraulic unit base, the hydraulic fluid channel having a first end and a second end opposite of the first end, wherein the first end of the hydraulic fluid return channel is located at a surface of the hydraulic unit base and the second end of the hydraulic fluid return channel is a closed-end. For these embodiments, a two-stage valve pin may be movably disposed in the hydraulic fluid return channel and may have a first end and a second end opposite of the first end, the first end of the two-stage valve pin being nearer to the first end of the hydraulic fluid return channel than the second end of the valve pin, the two-stage valve pin includes a primary valve pin and a secondary valve pin, the primary valve pin movably disposed in a secondary valve pin cavity of the secondary valve pin, a push pin may be attached to an end of the primary valve pin, where the push pin extends out of a hole at an end of the secondary valve pin cavity when the primary valve pin is fully inserted into the secondary valve pin cavity.

In these embodiments, the hydraulic fluid release valve assembly may further include a valve seat disposed in the hydraulic fluid return channel between the two-stage valve pin and the first end of the hydraulic fluid return channel to seat the first end of the valve pin when the valve pin is urged to mate with the valve seat, wherein when the valve pin is seated on the valve seat, hydraulic fluid is prevented from flowing through the hydraulic fluid return channel. And a push rod movably disposed in the hydraulic fluid return channel and having a first end and a second end opposite of the first end, the second first end of the push rod extending out of the hydraulic unit base through the first end of the hydraulic fluid return channel and the second end of the push rod to contact the push pin first before contacting the secondary valve pin when the push rod is urged towards the second end of the hydraulic fluid return channel. The specific functions and features of various alternative embodiments of the hydraulic fluid release valve assemblies will be described with reference to FIGS. 1 through 9.

Additionally, and according to various embodiments of the present disclosure, hydraulic piston pump assemblies are disclosed herein that employ multiple pump pistons that can drive or discharge hydraulic fluids with different characteristics (e.g., different flow volumes with different fluid pressures), which allow the assemblies to operate flexibly depending on load conditions. For example, when used in a hydraulic floor jack, and if the hydraulic floor jack is used to lift a light load, hydraulic fluids outputted or discharged by multiple pump pistons with different pumping capabilities (e.g., pistons that discharge hydraulic fluids with different fluid pressures and flow rates such as one piston that discharges hydraulic fluid at one flow rate and pressure and another piston that discharges hydraulic fluid at another flow rate and pressure) may all be used to quickly lift the light load. On the other hand, if the hydraulic floor jack is being used to lift a heavy load, only hydraulic fluid discharged by a subset of the pump pistons may be used for lifting the heavy load. That is only hydraulic fluids produced by those pump pistons that produce hydraulic fluid under relatively high pressure but at lower flow rates may be used for lifting the heavy load since lower pressure hydraulic fluids are typically not useful in lifting heavy loads. The selective use of all or a subset of hydraulic fluids with different characteristics (e.g., different pressure and flow rates) produced by different pistons may be done using combinations of, for example, one-way check valves that are strategically located and that are set to open at different hydraulic pressures, which will be referred to herein as cracking pressures. Further, the hydraulic piston pump assemblies employ efficient structures and components that may result in assemblies having small form factors.

In one example embodiment, a medium piston and a small piston (which has a smaller fluid displacement volume than the medium piston during a pumping operation) may be integrated into an example hydraulic piston pump assembly. For this embodiment, the hydraulic fluid that may be discharged by the small piston may be hydraulic fluid with a relatively high hydraulic pressure but at a relatively low flow rate, while the hydraulic fluid discharged by the medium piston may be hydraulic fluid with a lower hydraulic pressure, but at relatively higher flow volume. When the example hydraulic piston pump assembly is used in, for example, a hydraulic floor jack to lift a light load, both the small piston and the medium piston may be used to quickly lift the light load. However, when the hydraulic floor jack is to lift a relatively heavy load, only the small piston, which outputs hydraulic fluid having high pressure but at low flow volume, may be used to lift the heavy load. Thus, light loads can be quickly lifted, while heavy loads are lifted at a slower but at steadier speed.

In some embodiments, hydraulic piston pump assemblies are disclosed that employ three rather than two pump pistons including a small piston, a medium piston, and a large piston. Note that references to the "small," "medium," and "large" pistons herein will be in reference to the relative fluid displacement sizes of these pistons during, for example, pumping operations. Further note that each of these pistons (e.g., the small piston, the medium piston, or the large piston) of the hydraulic piston pump assemblies may be associated with their own output subsystem, which will be referred to herein as a "hydraulic outlet system," which are illustrated for example, in FIGS. 14, 16, and 21, with components that are uniquely associated with their respective piston (e.g., the small piston, the medium piston, or the large piston).

Because of the large number of components that are included in these hydraulic piston pump assemblies with multiple hydraulic outlet systems, for ease of illustration and understanding, these components will be named according to which piston they are associated with. For example, in various embodiments, included in each piston's hydraulic outlet system is a corresponding safety valve. Thus, these safety valves may be referred to as a small piston safety valve, a medium piston safety valve, and a large piston safety valve, respectively.

Note that for purposes of the following discussion, the use of relative terms such as "high" and "low," such as "high-pressure" hydraulic fluid and "low-pressure" hydraulic fluid, is only to distinguish between one item or feature (e.g., a flow of hydraulic fluid) from another similar item or feature (e.g., another flow of hydraulic fluid) that have different characteristics and may only be relevant with respect to each other. For example, in this example scenario, the "high-pressure" hydraulic fluid has a higher fluid pressure relative to the "low-pressure" hydraulic fluid.

In the following description, the hydraulic piston pump assemblies to be described will be described in the context of electrically powered hydraulic jacks such as hydraulic floor jacks. However, the hydraulic piston pump assemblies may be employed in a variety of settings and systems other than in the field of hydraulic jacks in various alternative embodiments.

Further, these hydraulic piston pump assemblies have unique structures that make them spatially efficient with a small form factor as briefly described above. For example, according to some embodiments, a hydraulic piston pump assembly is provided that may include a dual pump piston that may be integrated into a piston cavity of a support or housing structure, referred to herein as a "hydraulic unit base," where the dual pump piston comprises a small piston and a medium piston connected to the small piston along a longitudinal axis of the dual pump piston. In various embodiments, the small piston may have a smaller displacement volume than the displacement volume of the medium piston. When the dual pump piston is disposed in the piston cavity of the hydraulic unit base, a small piston fluid space may be formed adjacent to or at the periphery of the small piston and a medium piston fluid space may be formed adjacent to or at the periphery of the medium piston and where hydraulic fluids may be present during pumping operations. The hydraulic unit base may further include a small piston outlet channel that is connected to the small piston fluid space and a medium piston outlet channel that is connected to the medium piston fluid space, where the small piston outlet channel and the medium piston outlet channel are each connected to a respective fluid inlet and a respective fluid outlet through which hydraulic fluids may be received and discharged, respectively.

As will be further described herein, the small piston outlet channel, in various embodiments, may output/discharge relatively high-pressure low flow volume hydraulic fluid, while the medium piston outlet channel may output/discharge relatively low-pressure high flow volume hydraulic fluid. Further, the small piston outlet channel and the medium piston outlet channel may include components such as one-way check valves to prevent backflows. These channels and their components may make up portions of the hydraulic outlet systems of the small and medium pistons that were briefly mentioned above, the examples of which are illustrated, for example, in FIGS. 14 and 16 and will be discussed in greater detail herein.

Further, the small piston and medium piston outlet channels may include various components that permit hydraulic fluids discharged by both the small piston outlet channel and the medium piston outlet channel to be used during the lifting of light loads but may only permit hydraulic fluid discharge by the small piston outlet channel to be used for lifting during the lifting of heavy loads (note in cases of extremely heavy loads, hydraulic fluids from neither the small and medium piston outlet channels may be used).

That is, when the hydraulic piston pump assembly is employed in a hydraulic jack, and the load to be lifted is relatively light, hydraulic fluids outputted by both the small piston outlet channel and the medium piston outlet channel may be used to drive the ram rod or cylinder of the hydraulic jack to perform the lifting operation. Because hydraulic fluids from both outlet channels are being used, the lifting operation is performed relatively quickly. However, when the hydraulic jack is to be used to lift a heavy load, only the relatively high-pressure low flow hydraulic fluid discharged by the small piston outlet channel may be employed to drive up the ram rod of the hydraulic jack to perform the heavy lifting operation. The components of each of the small piston outlet channel and the medium piston outlet channel and their configurations/orientations will be described in greater detail herein.

In some embodiments, hydraulic piston pump assemblies are disclosed herein where three different pump pistons (e.g., a small piston, a medium piston, and a large piston) may be employed to discharge hydraulic fluid flows having different characteristics. For these embodiments, a combination of a dual pump piston (e.g., a piston that combines a small and medium piston) and a separate induvial piston (e.g., a large piston) may be employed for discharging the hydraulic fluids having different characteristics (e.g., different hydraulic pressures and different flow rates). For example, for these embodiments, the hydraulic piston pump assemblies may employ the dual pump piston with the small and medium pistons that were previously described and an individual large piston. These hydraulic piston pump assemblies may be able to selectively use hydraulic fluids discharged through one, two, or three different outlet channels of, for example, the small, medium, and large pump pistons depending on, for example load conditions.

In some alternative embodiments, hydraulic piston pump assemblies are disclosed herein that employ two individual pump pistons in the hydraulic unit base to drive two different hydraulic fluids through two distinct hydraulic outlet channels (e.g., a small piston outlet channel and a large piston outlet channel). For these embodiments, the hydraulic piston pump assemblies operate similar to the hydraulic piston pump assemblies that employed a dual pump piston except that the two pistons are actually two individual and separate pistons, and one of the pistons is a large piston as opposed to a medium piston. However, because "medium" and "large" are relative terms, they are only relevant with respect to comparison with the small piston. A more detailed discussion related to the three-piston hydraulic piston pump assemblies and hydraulic piston pump assemblies with two individual pistons will be discussed in greater detail herein.

For case of illustration and to facilitate understanding of the various features and components of the hydraulic fluid release valve assemblies to be described herein, a component listing is provided herein with respect to each set of drawings. Further, for components where multiple versions thereof are disclosed, figure numbers where such components can be found are also listed below:

Component Listing for FIGS. 1-9:

1—hydraulic unit base; 2a—hydraulic fluid release valve (FIG. 4); 2b hydraulic fluid release valve (FIG. 5); 2c—hydraulic fluid release valve (FIG. 7B); 3—driving assembly; 4—driver; 5—support bar; 6—bearing; 7—manual puller; 8—Secondary valve pin; 9—primary valve pin; 10—two-stage valve pin; 11—hydraulic fluid return channel; 11a—first end of the hydraulic fluid return channel; 11b—second end of the hydraulic fluid return channel; 110a—first channel segment; 110b—second channel segment; 12—block; 21—valve seat; 22—valve pin; 23—hydraulic fluid release valve push rod; 24—first spring; 25—second spring; 31—guide slope piece (with a slopped guide slope bottom); 32—driving arm; 32a—straight driving arm; 33—first arm end; 34—second arm end; 47—battery; 82—outlet groove; 83—secondary valve pin cavity; 84—hole at end of secondary valve pin cavity; 91—push pin; 92—spiral groove;

94—scaling ball; 95—hydraulic fluid outlet; 96—hydraulic fluid inlet; 100—hydraulic fluid release valve assembly (FIG. 2); 100a—hydraulic fluid release valve assembly (FIG. 3); 102a—hydraulic cylinder assembly (FIG. 4); 102b—hydraulic cylinder assembly (FIG. 6); 104—hydraulic cylinder; 106—ram; 108a—hydraulic fluid tank (FIG. 4); and 108b—hydraulic fluid tank (FIG. 6); 110a—first channel segment; and 110b—second channel segment.

Component Listing of FIGS. 10-24:

1a—hydraulic unit base (FIG. 10); 1b—hydraulic unit base (FIG. 18); 1c—hydraulic unit base (FIG. 23); 203—motor; 204—dual pump piston; 206—fluid inlet; 207—large piston cavity; 211—drive cavity; 212—piston cavity; 213—closed end of piston cavity; 214—opened end of the piston cavity; 221—small piston outlet channel; 222—medium piston outlet channel; 223—block; 224—pump housing; 225—spring; 226—small piston fluid space; 227—medium piston fluid space; 228—small piston cavity; 231—eccentric wheel; 241—small piston (FIG. 12); 242—medium piston; 243—small piston low-pressure one-way outlet valve; 244—small piston high-pressure one-way outlet valve; 245—medium piston low-pressure one-way valve; 246—medium piston high-pressure one-way valve; 247—dual pump piston axis; 248—small piston (FIG. 24); 250—piston cavity axis; 251—small piston outlet channel axis; 252—medium piston outlet channel axis; 253—large piston cavity axis; 254—large piston outlet channel axis; 261—fluid outlet; 263—small piston temporary storage cavity; 264—medium piston temporary storage cavity; 265—overflow channel; 266—overflow hole; 267—small piston safety valve; 268—medium piston safety valve; 269—sealing ball; 271—large piston block; 272—large piston; 273—large piston spring; 274—large piston fluid space; 275—large piston outlet channel; 276—large piston low-pressure one-way outlet valve; 277—large piston high-pressure one-way outlet valve; 278—large piston temporary storage cavity; 279—large piston safety valve; 280—first end of the dual pump piston that extends out into the drive cavity; 281—second end of the dual pump piston; 295—closed end of large piston cavity; 296—opened end of the large piston cavity; 300a—hydraulic pump piston assembly (FIG. 10); 300b—hydraulic pump piston assembly (FIG. 18); 300c—hydraulic pump piston assembly (FIG. 23); 304—hydraulic outlet system (small piston); 306—hydraulic outlet system (medium piston); and 308—hydraulic outlet system (large piston).

Component Listings for FIGS. 25-31:

1*—hydraulic unit base; 102—hydraulic cylinder; hydraulic unit base; 203—motor; 400—hydraulic jack; 401—jack body; 402—frame assembly; 403—arm assembly; 407—driving mechanism; 408—wheel; 409—handle; 431—saddle; and 447 battery pack; 500—hydraulic jack; 501—jack body; 502—handle assembly; 503—aviation plug; 504—control circuit board; 505—battery pack holder; 506—threaded connection sleeve; 511—frame assembly; 512—hydraulic fluid pump assembly; 513—arm assembly; 521—handle yoke; 522—handle tube; 523—handle; 531—male plug; 532—female plug; 541—lifting work switch; 542—power switch; 551—battery pack wiring board; 552—battery pack; 561—nut; and 562—limit step.

FIG. 1 illustrates some functional components of an example hydraulic jack according to some example embodiments. As will be further described herein, the hydraulic jack, according to various embodiments, may include a ram rod (hereinafter simply "ram 106") for pushing up a lifting arm during a lifting operation. In FIG. 1, the ram 106 is extended out of a hydraulic cylinder 104, which is disposed inside a hydraulic fluid tank 108a. FIG. 1 also shows a guide slope piece 31 that is part of a release valve assembly to be discussed in greater detail herein. A motor 203 may be included to drive a piston pump, and a driver 4 may then employed to drive the release valve to be described herein. In various embodiments, a manual puller 7 may be included as part of the release valve assembly.

In various embodiments, various components such as components associated with the release valve assembly that controls the hydraulic fluid between, for example, the hydraulic cylinder 104 and the hydraulic fluid tank 108a, as well as the components of the piston pump assembly that drives the hydraulic fluid between the hydraulic cylinder 104 and the hydraulic fluid tank 108a may be integrated into a hydraulic unit base 1*. FIG. 1 also shows a support bar 5, which plays a role in the release valve assembly as will be described herein. A battery 47 may be included to drive a number of electronic components. Note that for purposes of the following description, "*" is a wildcard. Thus, references to, for example, hydraulic unit base 1* may be in reference to the hydraulic unit base 1a of FIG. 10, hydraulic unit base 1b of FIG. 18, or the hydraulic unit base 1c of FIG. 23.

Figure 2:
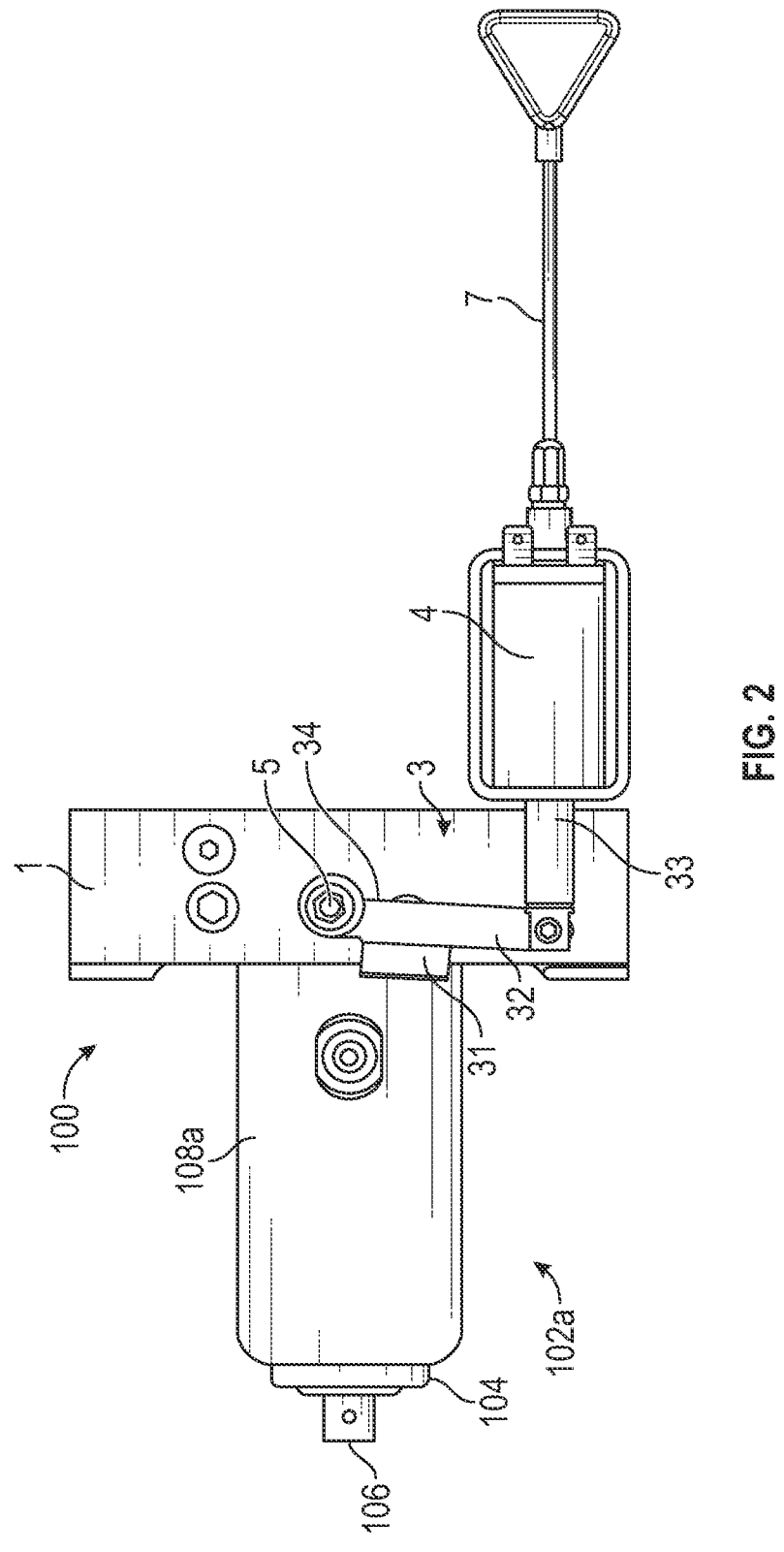
FIG. 2 illustrates some components of an example hydraulic fluid release valve assembly connected to a hydraulic cylinder assembly according to some example embodiments.
Figure 4:
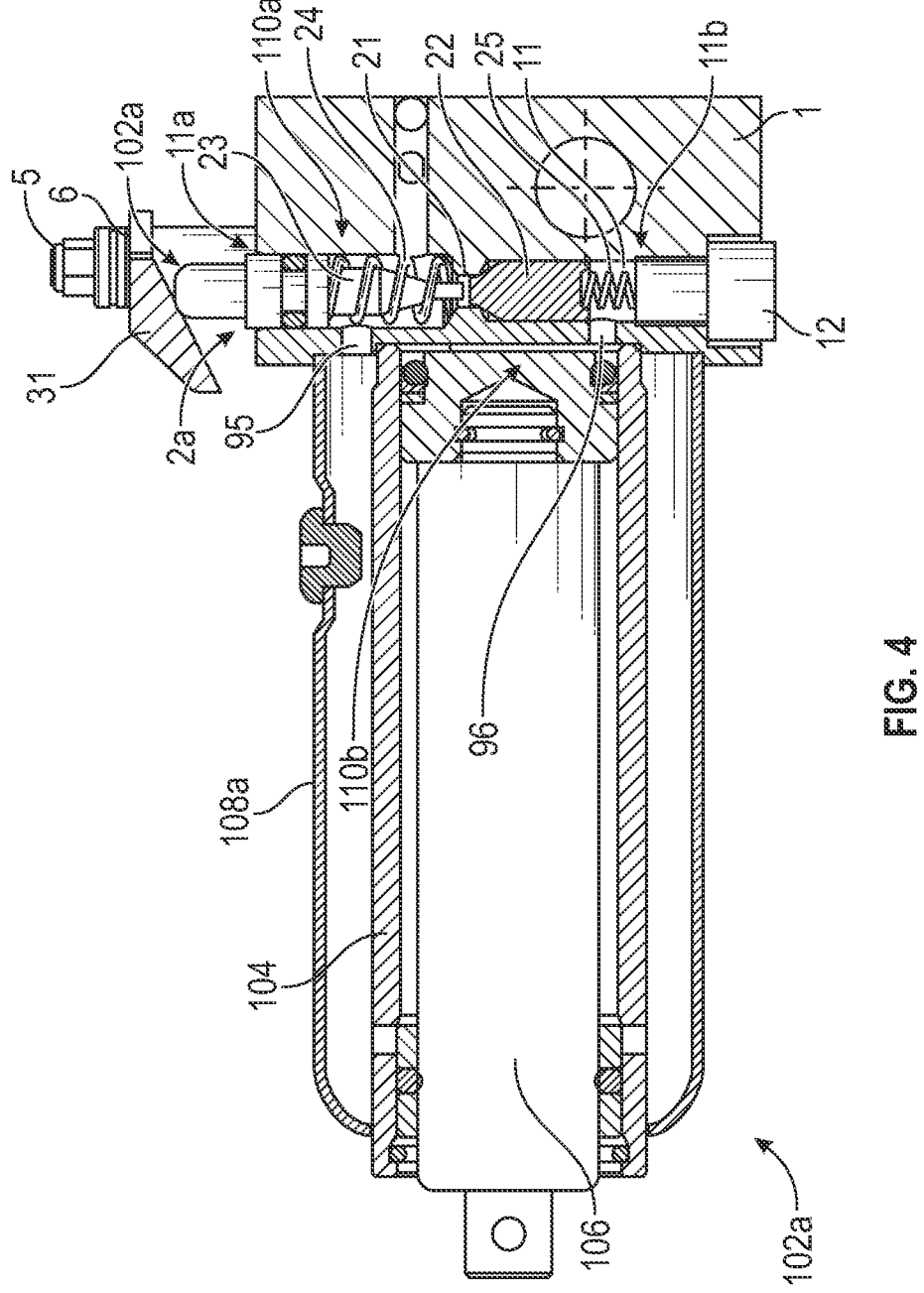
FIG. 4 illustrates a cross-sectional view of a hydraulic fluid release valve integrated into a hydraulic unit base according to some example embodiments.
Figure 5:
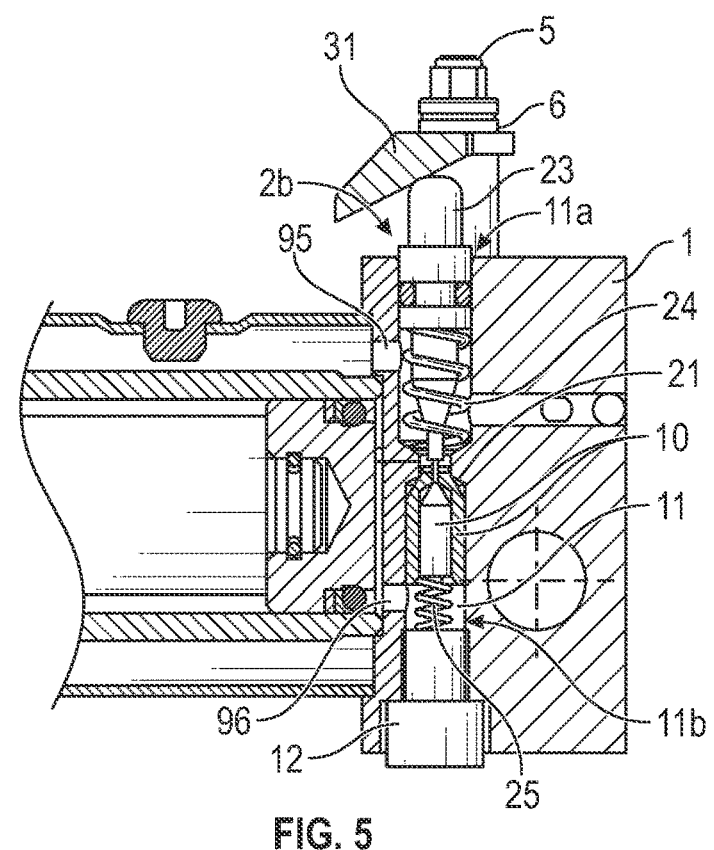
FIG. 5 illustrates a cross-sectional view of a hydraulic fluid release valve integrated into a hydraulic unit base according to some alternative example embodiments.
Figures 7A, 7B:
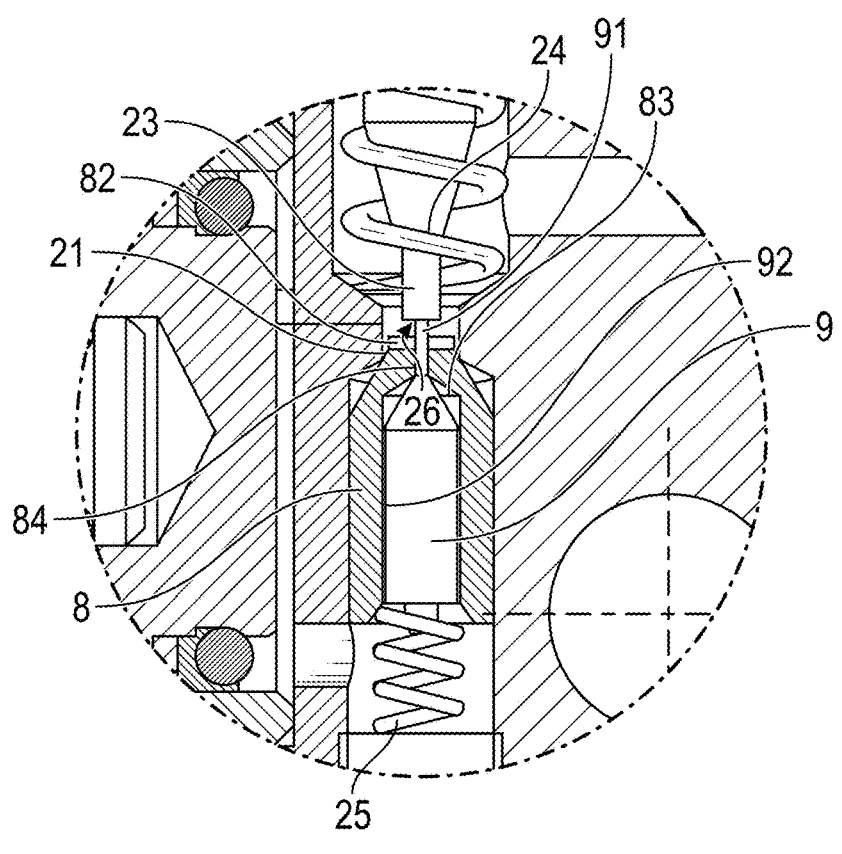
FIG. 7A illustrates a close-up cross-sectional view of portions of the hydraulic fluid release valve of FIG. 5 according to some example embodiments.
FIG. 7B illustrates a close-up cross-sectional view of portions of a hydraulic fluid release valve according to some alternative embodiments.

FIG. 2 illustrates some components of an example hydraulic fluid release valve assembly that may be connected to a hydraulic cylinder assembly of, for example, a hydraulic jack according to some embodiments. In various embodiments, a hydraulic fluid release valve assembly 100 may include, among other things, a hydraulic base unit 1, which may be a housing or support structure for housing or supporting components of a hydraulic fluid release valve 2* (see, for example, the hydraulic fluid release valves 2a or 2b in FIG. 4 or 5), and a driving mechanism, which may include a driving assembly 3, a driver 4, and a manual puller 7 for operating the hydraulic fluid release valve 2*. Note that FIGS. 4 and 5 illustrate alternative implementations of a hydraulic fluid release valve 2* (e.g., hydraulic fluid release valve 2a and hydraulic fluid release valve 2b) according to some embodiments that may be integrated in the hydraulic unit base 1 of FIG. 2. Also, a third implementation of a hydraulic fluid release valve 2c is illustrated in FIG. 7B.

As will be further described herein, the hydraulic unit base 1 may be a support structure for housing or supporting various components of a hydraulic fluid release valve 2*. In various embodiments, the hydraulic unit base 1 may be made of steel, iron, aluminum, or other metals, alloys, or composites having similar hardness and durability characteristics of metals/alloys. In various embodiments, the hydraulic unit base 1 may include other components/features of other devices in addition to the components of a hydraulic fluid release valve 2*. For example, if the hydraulic unit base 1 is employed in a hydraulic jack, such as a hydraulic floor jack, the hydraulic unit base 1 may include components of a pump.

As noted above, the driving mechanism for the hydraulic fluid release valve assembly 100 may include a driving assembly 3 (which may include a driving arm 32 and a guide slope piece 31), an electrically powered driver (hereinafter "driver") 4, and a manual puller 7 for electrically or manually operating the hydraulic fluid release valve 2* integrated into the hydraulic base unit 1. The driver 4 may be an electric driver such as one or more push-pull electromagnets. In some embodiments, the driver 4 may comprise one or more electric push rods, air cylinders, hydraulic cylinders, and servo cam mechanisms. The electrically powered driver 4, when actuated, causes the driving assembly 4 to move to apply the pushing force to the hydraulic fluid release valve 2*. The manual puller 7 may be for manually pulling the driver 4 to manually operate components of the hydraulic release valve 2* when, for example, there is no power available to power the driver 4. Under such circumstances, an operator can pull the manual puller 7, which may then drive the driver 4 and the driving assembly 3 to open the hydraulic fluid release valve 2* so that hydraulic fluid is allowed to pass through the hydraulic fluid release valve 2*. Such a feature may be useful when there is no power available for powering the driver 4.

In various embodiments, the driving assembly 3 includes a driving arm 32, which may be an articulated arm with a pivot point as illustrated in FIG. 2, and a guide slope piece 31 connected to the driving arm 32. The driving assembly 3, as will be further described herein, may be in contact with a hydraulic fluid release valve 2* to apply a pushing force on the hydraulic release valve 2* to open the hydraulic fluid release valve 2*.

The driving assembly 3 comprises of a drive slope piece 31 attached to a driving arm 32. As further illustrated in FIG. 2, the driving arm 32 may be connected to the electrically powered driver 4 at one end and connected to a support bar 5 (which is more clearly illustrated in FIG. 4) at the other end. More specifically, the driving arm 32 includes a first arm end 33 that is connected to the electrically powered driver 4, and a second arm end 34 at an opposite end from the first arm end 33 that is rotatably connected to the support bar 5 on the hydraulic unit base 1. The guide slope piece 31 attached to the driving arm 32 is configured and oriented to push down on a hydraulic fluid release valve push rod (hereinafter "push rod") 23—see FIG. 4—of the hydraulic fluid release valve 2* when the second arm end 34 rotates around the support bar 5. Through the arrangement the guide slope piece 31, the driving assembly 3 is in contact with the push rod 23. During the operation of the driving assembly 3, the underside of the guide slope piece 31 is used as a driving surface to drive the oil release valve push rod 23 to move accordingly downwards. The contact point of the guide slope piece 31 moves along the push rod 23 to perform up and down movements.

Figure 3:
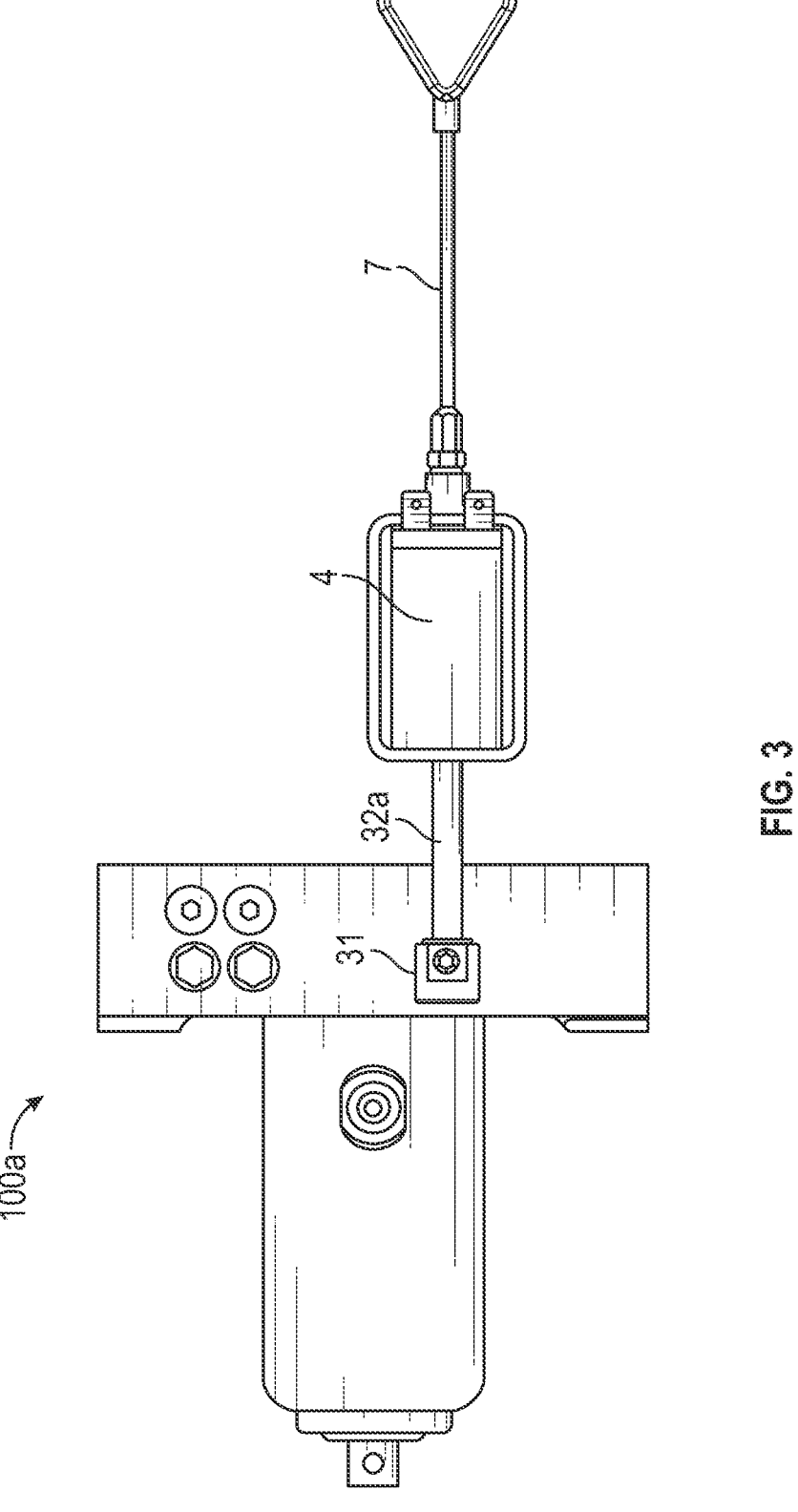
FIG. 3 illustrates some components of an example hydraulic fluid release valve assembly that employs a driving straight arm according to some alternative example embodiments.

Referring to FIG. 3, which illustrates some components of an example hydraulic fluid release valve assembly 100a that employs a driving straight arm 32a according to some alternative example embodiments. The driving straight arm 32a generally performs the same functionalities of the driving arm 32 to push down on a hydraulic fluid release valve push rod 34.

As will be further illustrated in FIGS. 4, 5, and/or 6, the support bar 5 may be a bar that may extend out of an outer surface of the hydraulic unit base 1. The support bar 5 may be disposed on the surface of the hydraulic unit base 1 by various means, including, for example, by welding, cementing, screwing, or by other means, or maybe a unitary piece of the hydraulic unit base 1.

To operate or open the hydraulic fluid release valve 2* integrated into the hydraulic unit base 1, the driver 4 may be electrically actuated to cause the driving arm 32 to move forward (and backward when deactivated). As a result, the end of the driving arm 32 moves back and forth, causing the glide slope piece 31 to move and push down on the push rod 23 of, for example, the hydraulic fluid release valve 2a of FIG. 4 and causing the hydraulic fluid release valve 2a to open.

In FIG. 2, the example hydraulic fluid release valve assembly 100 (which may include the hydraulic unit base 1, the driving mechanism that includes the driving assembly 3, the driver 4, and the manual puller 7, among other things, and a hydraulic fluid release valve 2a integrated into the hydraulic unit base 1 of FIG. 4) is illustrated as being connected to a hydraulic cylinder assembly 102a of an example hydraulic jack. As illustrated further in FIGS. 2 and 4, the hydraulic cylinder assembly 102a may include a hydraulic fluid tank 108a that at least laterally (e.g., partially) encapsulates a hydraulic cylinder 104, which further holds a ram 106 for driving the saddle of the hydraulic jack during lifting operations. During lifting and lowering operations, hydraulic fluid may flow between the hydraulic cylinder 104 and the hydraulic fluid tank 108a, extending or retracting the ram 106. Note that although the hydraulic fluid release valve assembly 100 is illustrated as being used in controlling the hydraulic fluid between the hydraulic cylinder 104 and the hydraulic fluid tank 108a, the example hydraulic fluid release valve assembly 100 to be described herein may be used to control hydraulic fluid flow in other environments/settings where hydraulic fluid flow between, for example, a high-pressure hydraulic fluid source (e.g., hydraulic cylinder) and a hydraulic fluid reservoir may need to be efficiently and easily controlled.

Referring particularly now to FIG. 4, which illustrates a cross-sectional view of an example hydraulic release valve 2a integrated into the hydraulic unit base 1 of FIG. 2 according to various embodiments As more clearly shown in FIG. 4, the guide slope piece 31, when rotated around the support bar 5 by the driving arm 32 (not shown in FIG. 4), may contact and push down the push rod 23 of the hydraulic fluid release valve 2a to cause the hydraulic fluid release valve 2a to open. The second arm end 34 (see FIG. 2) of the driving arm 32 with the guide slope piece 31 may be connected to the support bar 5 via bearing 6 to reduce resistance during rotating movements of the second arm end 34 when the driving arm 32 moves. The bearing 6 can be any type of bearing, such as a plane bearing or a ball bearing, to increase the smoothness of the rotation of the second arm end 34 and avoid jamming or jamming due to resistance.

As illustrated in FIG. 4, in various embodiments, the hydraulic fluid release valve 2a includes the previously described push rod 23, a valve seat 21 (which in FIG. 4 is facing downwards), a valve pin 22, a block 12, a first spring 24, and a second spring 25, that are all disposed in a hydraulic fluid return channel 11. The hydraulic fluid return channel 11 has a first end 11a and a second end 11b, where the first end 11a is at the surface of the hydraulic unit base 1 and the second end 11b is a closed-end (e.g., where block 12 is located). The hydraulic fluid release valve 2a, in various embodiments, may be located or disposed in a hydraulic fluid return channel 11 of the hydraulic unit base 1 and may partially extend out of the hydraulic unit base 1 through the first end 11a of the hydraulic fluid return channel 11.

The valve seat 21, in various embodiments, may divide the hydraulic fluid return channel 11 into two sections, a first channel segment 110a and a second channel segment 110b. For these embodiments, the first channel segment 110a may include the push rod 23, and the second channel segment 110 may include the valve pin 22. Connected to the first channel segment 110a is a hydraulic fluid outlet 95, and connected to the second channel segment 110b is a hydraulic fluid inlet 96. For these embodiments, the hydraulic fluid inlet 96 may be connected to a high-pressure hydraulic fluid source, such as a hydraulic cylinder 104, to receive pressurized hydraulic fluid from the high-pressure hydraulic source, while the hydraulic fluid outlet 95 may be connected to a hydraulic fluid reservoir, such as a hydraulic fluid tank 108a of the hydraulic cylinder assembly 102a to discharge the pressurized hydraulic fluid into the hydraulic fluid tank 108a via the hydraulic fluid return channel 11.

In various embodiments, valve pin 22 may be placed or disposed movably in the hydraulic fluid return channel 11. The valve pin 22 has a first end and a second end opposite of the first end, where the first end of the valve pin 22 (e.g., the top end of the valve pin 22 in FIG. 4) being nearer to the first end 11a of the hydraulic fluid return channel 11 than the second end of the valve pin 22 (e.g., the bottom end of the valve pin 22 in FIG. 4).

In various embodiments, the valve seat 21 is disposed in the hydraulic fluid return channel 11 between the first end of the valve pin 22 (e.g., the top end of valve pin 22 in FIG. 4 and the first end 11a of the hydraulic fluid return channel 11 to seat the first end of the valve pin 22 when the valve pin 22 is urged to mate with the valve seat 21, wherein when the valve pin 22 is seated on the valve seat 21, hydraulic fluid is prevented from flowing through the hydraulic fluid return channel 11. In some embodiments, the valve seat 21 protrudes out of one or more walls of the hydraulic fluid return channel 11. For example, the valve seat 21, in some cases, may be an inward extension of the inner wall of the hydraulic fluid return channel 11.

In some embodiments, the first spring 24 urges the push rod 23 upwards away from the valve seat 21, while the second spring 25 urges the valve pin 22 upwards to seat in the valve seat 21. When the hydraulic fluid contained in the hydraulic cylinder 104 is in communication with the chamber under the valve pin 22 via the hydraulic fluid inlet 96, the valve pin 22 may be additionally exposed to the pressure provided by the hydraulic fluid contained in the hydraulic cylinder 104. As a result, the combination of the pressure from the second spring 25 and the hydraulic fluid pressure from the hydraulic cylinder 104 may apply significant pressure to the valve pin 22 to remain seated in the valve seat 21, particularly when there is significant pressure present in the hydraulic cylinder 104 such as at heavy load time.

When the guide slope piece 31, via its bottom sloped surface, pushes down on the top of the push rod 23, the push rod 23, in turn, will push down the valve pin 22 and away from the valve seat 21, which opens or creates a channel through the hydraulic fluid release vale 2a, allowing hydraulic fluid to flow from the hydraulic fluid inlet 96 to the hydraulic fluid outlet 95. Note that push rod 23 has a top end and a bottom end opposite of the top end, and the top end extends partially out of the first end 11a of the hydraulic fluid return channel 11. In FIG. 2, as well as in FIG. 5, unnumbered features are shown on the right side of the figures in the hydraulic base unit 1. These features, such as the circular shape and the hole with two circles, represents features and cavities of other devices, such as a piston pump of a hydraulic jack, that may be integrated into hydraulic base unit 1 and may play no relevant part with respect to the hydraulic fluid release valve 2a.

FIG. 5 illustrates another hydraulic fluid release valve 2b in accordance with various alternative embodiments, the hydraulic fluid release valve 2b employs a two-stage valve pin 10, which is more clearly shown in FIG. 7A. Note that all the components of FIG. 5 were already described and illustrated with respect to FIG. 4 except for the two-stage valve pin 10. The two-stage valve pin 10, as with valve pin 22 of FIG. 4, is disposed in the hydraulic fluid return channel 11. Similar to valve pin 22 of FIG. 4, the two-stage valve pin 10 has a first end at the top of the pin 10 and a second end at the bottom of the pin 10 opposite of the first end, the first end of the two-stage valve pin 10 being nearer to the first end 11a of the hydraulic fluid return channel 11 than the second end of the two-stage valve pin 10.

The two-stage valve pin 10 includes a primary valve pin 9 and a secondary valve pin 8. In various embodiments, the primary valve pin 9 may be movably disposed in a secondary valve pin cavity 83 of the secondary valve pin 8. A push pin 91 may be attached to an end of the primary valve pin 9 such that the push pin 91 extends out of a hole 84 at the end of the secondary valve pin cavity 83 when the primary valve pin 9 is fully inserted into the secondary valve pin cavity 83. Disposed on and around the outer surface of the primary valve pin 9 is a spiral groove 92, while on the top surface of the secondary valve pin 8 is an outlet groove 82. In various embodiments, these grooves may be used to throttle or to control the flow of hydraulic fluid flow through the hydraulic fluid return channel 11 when the hydraulic fluid release valve 2b is open.

As in FIG. 4 the hydraulic fluid return channel 11 in FIGS. 5 and 7A includes a first spring 24 in contact with the push rod 23 to urge the push rod 23 towards the first end 11a of the hydraulic fluid return channel 11, and a second spring 25 disposed between the second or bottom end of the two-stage valve pin 10 and the second end 11b of the hydraulic fluid return channel 11 to urge the first end (e.g., top end of the two-stage valve pin 10 with outlet grove 82) of the two-stage valve pin 10 towards the valve seat 21. As illustrated in FIG. 7A, the second spring 25 is in contact with an end of the primary valve pin 9 (e.g., bottom of primary valve pin 9 in FIGS. 5 and 7A) that is opposite from the end of the primary valve pin 9 attached to the push pin 91 to urge the primary valve pin 9 to be fully inserted into the secondary valve pin cavity 83 and to fully extend the push pin 91 out of the hole 84 at the end of the secondary valve pin 8.

When the hydraulic fluid release valve 2b of FIG. 5 is to be opened, the push rod 23 is pushed down, contacting the top of the push pin 91 and causing the primary valve pin 9 to also be pushed down. That is, the push rod 23 has a first end and a second opposite of the first end, where the first end of the push rod 23 extends out of the hydraulic unit base 1 through the first end 11a of the hydraulic fluid return channel 11 and the second end of the push rod 23 to contact the push pin 91 first at 26 (see FIG. 7A, which is a close-up cross-sectional view of portions of the hydraulic fluid release valve of FIG. 5 and which shows the push rod 23 already in contact with the push pin 91) before contacting the secondary valve pin 8 when the push rod 23 is urged towards the second end 11b of the hydraulic fluid return channel 11.

More particularly, upon being pushed downward by the push rod 91, the primary valve pin 9 is pushed downward against the spring 25 and the hydraulic fluid pressure from the hydraulic fluid inlet 96, which are applying counter upward pressure to the primary valve pin 9, to open the hydraulic fluid path between the primary valve pin 9 and the secondary valve pin 8. The hydraulic fluid from the hydraulic fluid inlet 96 flows upward through the spiral groove 92 on the primary valve pin 9 in the gap between the primary valve pin 9 and the secondary valve pin 8 and flows through the outlet groove 82 provided on the secondary valve pin 8 to flow out of the hydraulic fluid outlet 95.

As a result, an initial flow of hydraulic fluid may flow from the hydraulic fluid inlet 96 and through the secondary valve pin cavity 83. As the hydraulic fluid flows through the secondary valve pin cavity 83, and so long as no other hydraulic fluid is being charged in significant amounts into the hydraulic fluid source (e.g., hydraulic cylinder 104), the hydraulic fluid pressure in the hydraulic fluid inlet 96 should diminish. As the push rod 23 continues to push downwards, the push rod 23 will eventually contact the top of the secondary valve pin 8 to also push down the secondary valve pin 8.

When the push rod 23 continues to move downward, it pushes the secondary valve pin 8 downwards away from the valve seat, pushing them apart. As a result, a hydraulic fluid path between the secondary valve pin 8 and the valve seat 21 is also opened, and the hydraulic fluid flows through the gap between the secondary valve pin 8 and the hydraulic fluid return channel 11. At this time, both the secondary valve pin 8 and the primary valve pin 9 are "open," realizing a double-stage hydraulic fluid flow.

Accordingly, even if there were initially substantial hydraulic fluid pressure at the hydraulic fluid source (e.g., hydraulic cylinder 104), because of the presence of the primary valve pin 9 in the secondary valve pin cavity 83, the hydraulic fluid release valve 2b will initially open a little through the channel between the primary valve pin 9 and the second valve pin 8, allowing hydraulic fluid to flow through the hydraulic fluid outlet 95. If the hydraulic pressure at the hydraulic fluid inlet 96 drops sufficiently, the secondary valve pin 8 will also separate from the valve seat 21, causing additional hydraulic fluid to flow through the outlet groove 82 and out the hydraulic fluid outlet 96.

Figure 6:
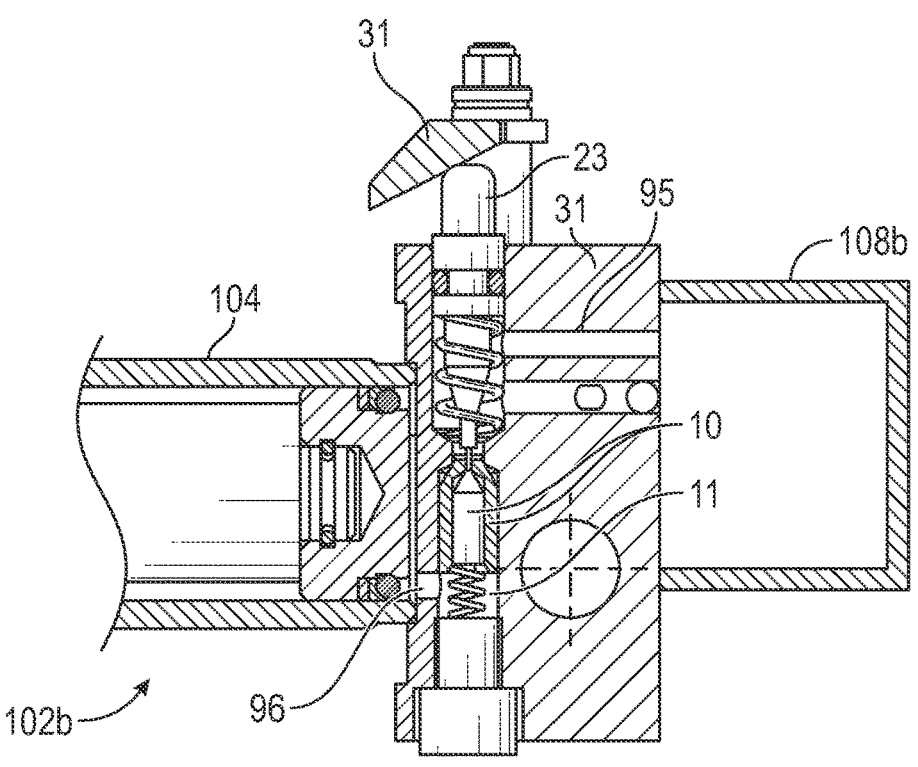
FIG. 6 illustrates a hydraulic fluid tank located in a location on a hydraulic unit base separate from a hydraulic cylinder assembly according to some alternative example embodiments.

Referring to FIG. 6, which illustrates an alternative embodiment of a hydraulic cylinder assembly 102b that may be attached to a hydraulic unit base 1. In this embodiment, the hydraulic cylinder 104 is not encapsulated by a hydraulic fluid tank. Instead, the hydraulic fluid tank 108b is a separate unit from the hydraulic cylinder assembly 102b and is located in a separate location on the hydraulic unit base 1.

Figure 8:
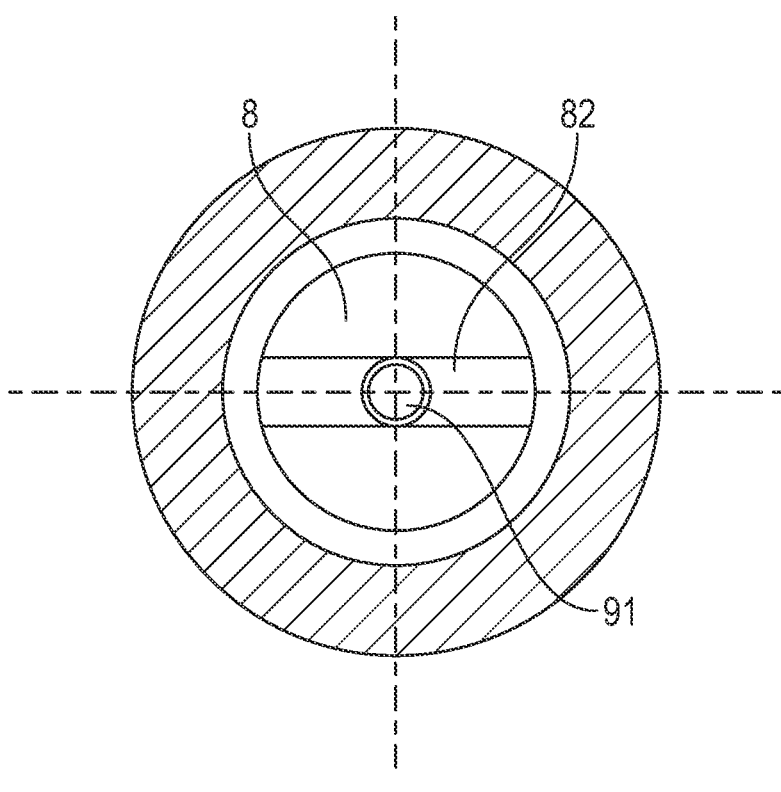
FIG. 8 illustrates a top-down cross-sectional view of a push-pin and primary valve pin of FIG. 6 according to some example embodiments.

FIG. 8 illustrates a top-down cross-sectional view of the push-pin 91 and the primary valve pin 9 of FIG. 6 according to some example embodiments. As further illustrated, FIG. 8 also illustrates a hydraulic fluid outlet groove 82 on top of the secondary valve pin 8 to allow hydraulic fluid to flow to the hydraulic fluid outlet 95.

Figure 9:
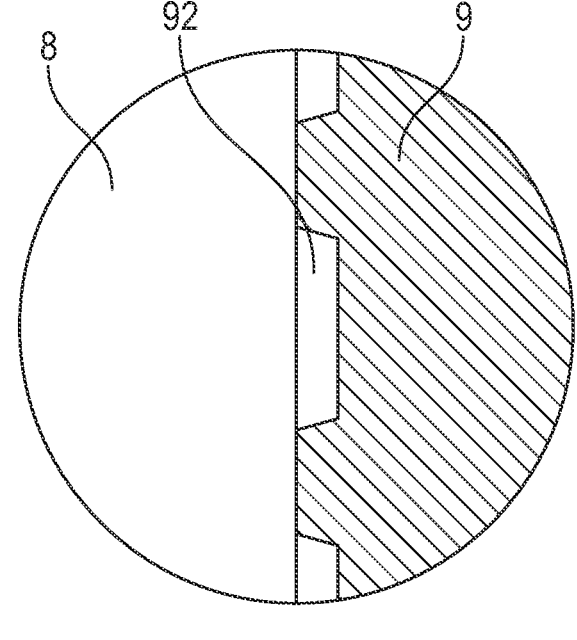
FIG. 9 illustrates a close-up cross-sectional view of a spiral groove on the primary valve pin of FIG. 6 according to some example embodiments.

FIG. 9 illustrates a close-up cross-sectional view of a spiral groove on the primary valve pin of FIG. 6 according to some example embodiments. More particularly, FIG. 9 shows the cross-sectional view of spiral groove 92 of the primary valve pin 9 disposed between the primary valve pin 9 and the secondary valve pin 8.

When it is necessary to cut off or close the hydraulic fluid release valve 2*, the power to the driver 4 may be simply shut-off, and the reset force of the spring 24 can drive the valve pin 10 or 22 to reset and fit the valve seat 21 to cut off the hydraulic fluid path of the hydraulic fluid return channel 11. At the same time, the push rod 23 is pushed upward by the restoring force of the spring 24. During the upward movement, the push rod 23 drives the driving assembly 3 to move and reset through the contact of the guide slope piece 31 with the driving assembly 3.

FIG. 7A illustrates a close-up cross-sectional view of portions of a hydraulic fluid release valve according to some alternative embodiments. More particularly, the hydraulic fluid release valve 2c employs a two-stage valve pin as before but in this implementation, there is a scaling ball 94 placed between the primary valve pin 9 and the push pin 91 to ensure a good seal when the primary valve pin 9 is seated at the top of the secondary valve pin cavity 83. In various embodiments, the scaling ball 94 has a wider diameter than the push pin 91 or the hole 84 at the end of the secondary valve pin cavity 83 and may be made of variety of metals or alloys including, for example, steel.

Figure 10:
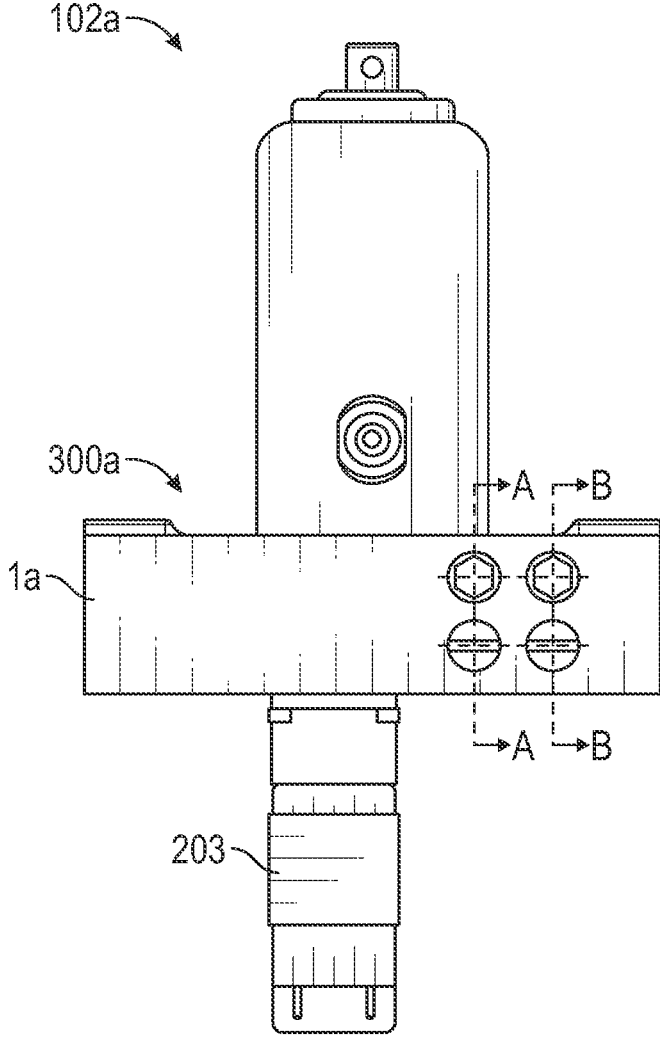
FIG. 10 illustrates some components of an example hydraulic piston pump assembly that may be connected to a hydraulic cylinder assembly according to some example embodiments.

FIGS. 10-17 illustrate an example hydraulic piston pump assembly according to some embodiments. More particularly, FIGS. 10-17 illustrate a hydraulic piston pump assembly 300*a* that employs a dual pump piston 204 (see FIG. 12) to output hydraulic fluids of different characteristics (e.g., different hydraulic pressures and flow rates), and to use selectively and automatically one, two, or none of the hydraulic fluids depending on, for example, load conditions in accordance with various embodiments. Referring particularly now to FIG. 10, which shows a hydraulic unit base 1*a* of the hydraulic piston pump assembly 300*a* connected to an example hydraulic cylinder assembly 102*a* of a hydraulic jack according to various embodiments. The hydraulic unit base 1*a*, in various embodiments, may be a support or housing structure to hold or support various components including various pump components such as the above-described dual pump piston 204 with the small and medium pistons and their associated hydraulic outlet systems that may be part of the hydraulic piston pump assembly 300*a*. In various embodiments, the hydraulic unit base 1*a* may be made of steel, iron, aluminum, or other metal or alloy.

The hydraulic piston pump assembly 300*a* may also include a motor 203 that may be used to drive, for example, the dual pump piston 204. The hydraulic cylinder assembly 102*a* may include a hydraulic fluid tank 108*a* (see, for example, FIG. 4), which may be a hydraulic fluid retention tank that, in the embodiment illustrated in FIG. 10, at least partially encapsulates a hydraulic cylinder 104 (see, for example, FIG. 4) that holds a ram for driving the saddle of the hydraulic jack during lifting operations. During lifting and lowering operations, hydraulic fluid may flow between the hydraulic cylinder and the hydraulic fluid tank. Note that although the hydraulic piston pump assembly 300*a* of FIGS. 10-17 is described herein as being used to pump hydraulic fluid from the hydraulic fluid tank to the hydraulic cylinder of a hydraulic jack, the example hydraulic piston pump assembly 300*a* of FIGS. 10-17, as well as the subsequent hydraulic piston pump assemblies 300*b* and 300*c* of FIGS. 18-24 may be used to pump hydraulic fluids between a hydraulic fluid source and a hydraulic fluid destination in other environments, settings, and systems.

As briefly noted above, attached to hydraulic unit base 1*a* is a motor 203, such as an electric motor, to rotate an eccentric wheel 231 (see, for example, FIG. 11), which in turn, may drive a dual pump piston 204 as will be further described herein. In various embodiments, the hydraulic unit base 1*a* may include a piston cavity 212 (see FIG. 13), a small piston outlet channel 221 (see FIG. 15), and a medium piston outlet channel 222 (see FIG. 17), among other things, to hold various components of the hydraulic piston pump assembly 300*a*. In brief, the piston cavity 212 in various embodiments includes the dual pump piston 204, while the small piston outlet channel 221 and the medium piston outlet channel 222 may be connected to (e.g., in fluid communication with) different parts of the piston cavity 212. Each of the small piston outlet channel 221 and the medium piston outlet channel 222 are connected to a fluid inlet 206 and fluid outlet 261 respectively. In various embodiments, the primary roles of the small piston outlet channel 221 and the medium piston outlet channel 222 are to pull hydraulic fluids from a fluid source (e.g., hydraulic fluid retention tank) and to selectively discharge or not discharge the hydraulic fluids to a hydraulic fluid destination (e.g., hydraulic cylinder with a ram rod).

Figures 11, 12:
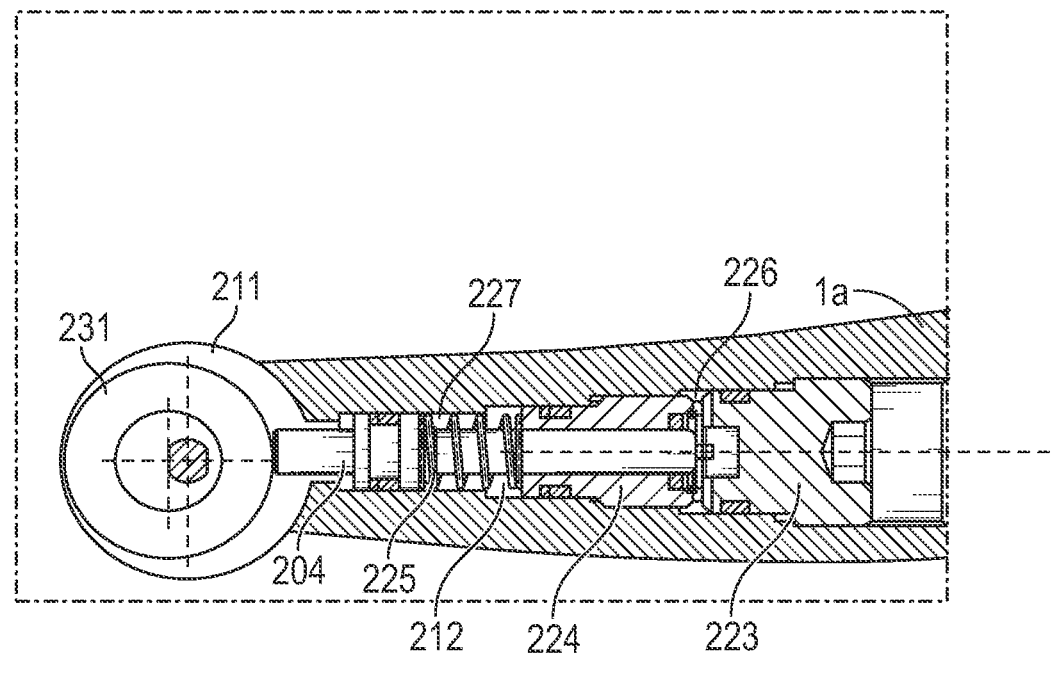
FIG. 11 illustrates a cross-sectional view of a piston cavity that includes a dual pump piston according to some example embodiments.
FIG. 12 illustrates the dual pump piston of FIG. 11 in isolation according to some example embodiments.

FIG. 12 illustrates an example dual pump piston 204, in isolation, in accordance with various embodiments. The dual pump piston 204 includes a small piston 241 and a medium piston 242 connected to the small piston 241 along a longitudinal axis 247 of the dual pump piston 204. In various embodiments, the small piston 241 may have a smaller displacement volume than the displacement volume of the medium piston 242 when used, for example, in a pumping operation.

Figure 13:
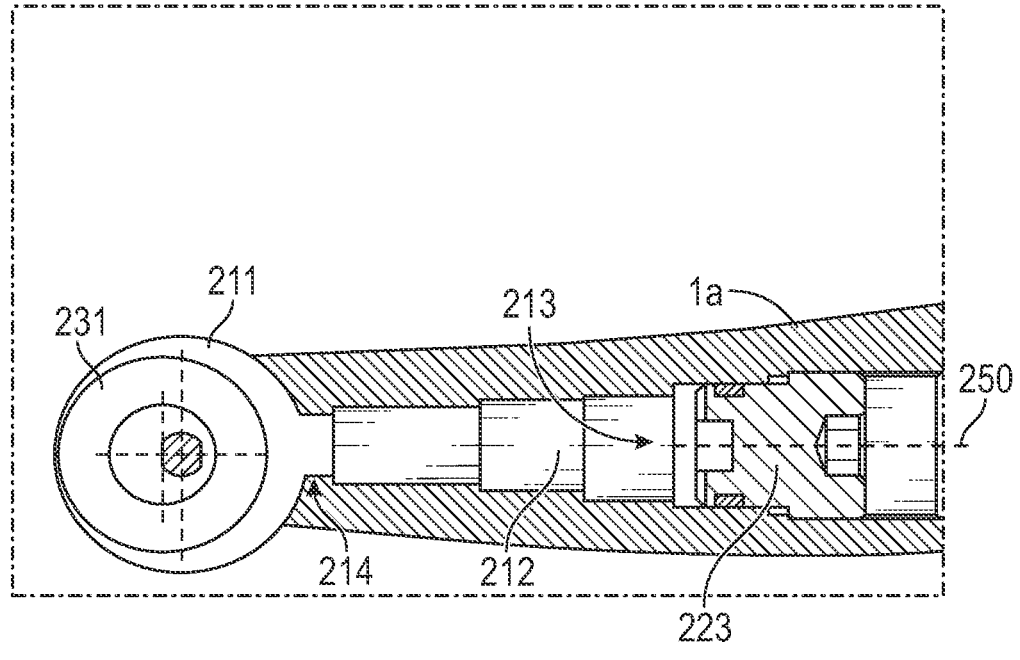
FIG. 13 illustrates a cross-sectional view of the piston cavity of FIG. 11 without the dual pump piston according to some example embodiments.

In various embodiments, the dual pump piston 204 may be slidably disposed in the piston cavity 212 of FIG. 13 such that the dual pump piston 204 is able to move longitudinally at least to a certain extent. More particularly, FIG. 13 illustrates a cross-sectional view of the piston cavity 212 prior to the insertion of the dual pump piston 204. As illustrated in FIG. 13, the piston cavity 212 may be an elongated cavity with a longitudinal axis 250, which in some cases, may trace the longitudinal axis 247 of the dual pump piston 204 when the dual pump piston 204 has been inserted into the piston cavity 212. As further illustrated in FIG. 13, the piston cavity 212 has a closed end 213, which is enclosed by a block 223, and at the opposite end, an opened end 214 that opens or interfaces with a driver cavity 211 containing the eccentric wheel 231.

FIG. 11 illustrates a cross-sectional view of the piston cavity 212 when the dual pump piston 204 is slidably disposed in the piston cavity 212 such that the dual pump piston 204 can move longitudinally at least to a certain degree. Also inserted in the piston cavity 212 is a pump housing 224 to slidably hold at least portions of the dual pump piston 204. More particularly, the pump housing 224, which may be part of the housing structure of the hydraulic unit base 1*a*, may at least laterally encircle the small piston 241. That is, the dual pump piston 204 may be positioned in a segment of the piston cavity 212 such that the pump housing 224 encircles at least a portion of the small piston 241 but does not encircle the medium piston 242.

A spring 225 is disposed between the end of the pump housing 224 and the medium piston 242. References to the dual pump piston 204 being slidably disposed in the piston cavity 212 is because the dual pump piston 204 may have a certain degree of movement longitudinally, as noted above. Note that in various embodiments, the spring 225 pushes the dual piston 4 by pushing off from the end of the pump housing 224, which may have a radially flat surface relative to the elongated piston cavity 212.

The dual pump piston 204 extends at least partially out of the piston cavity 212 piston cavity 212 into the drive cavity 211 and may contact the eccentric wheel 231 as a result of the spring 225 pushing or urging the dual pump piston 204 against the eccentric wheel 231. When the motor 203, which is connected to the eccentric wheel 231, causes the eccentric wheel 231 to rotate, the dual pump piston 204 is cyclically pushed into piston cavity 212 against the urging of the spring 225. As a result, the dual pump piston 204 moves back and forth in the piston cavity 212.

In various embodiments, when the dual pump piston 204 is placed in the piston cavity 212, a small piston fluid space 226 (see FIG. 11) is formed at the periphery/end of the small piston 241 and a medium piston fluid space 227 is formed at the periphery/end of the medium piston 242. More particularly, the small piston fluid space 226 that is formed is the space between the enclosed end of the piston cavity 212 (e.g., the block 223), the pump housing 224, and the small piston 241. In contrast, the medium piston fluid space 227 is the portion of the piston cavity 212 that is between the end of the pump housing 224, which may be flat, and the medium piston 242.

Figure 15:
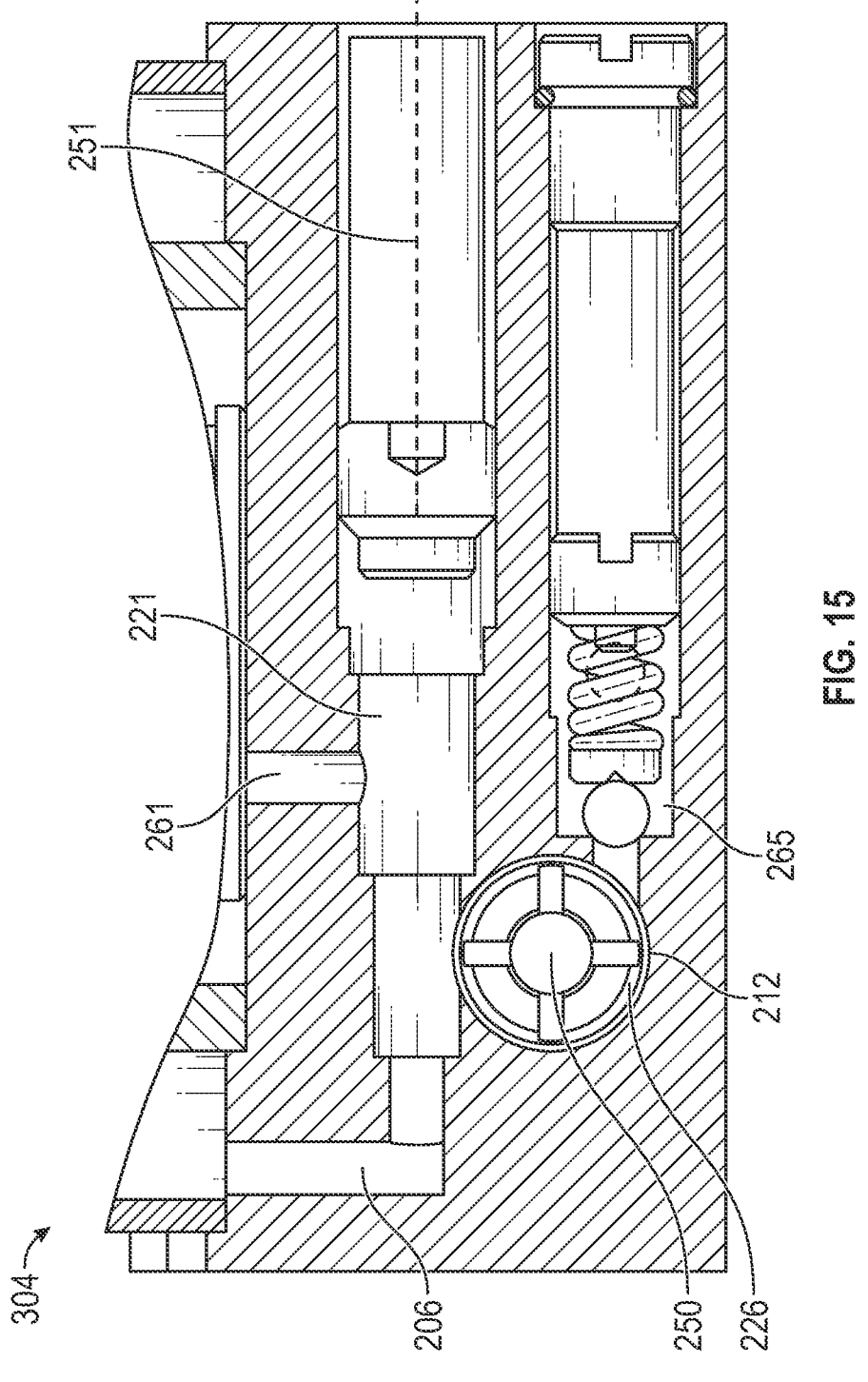
FIG. 15 illustrates a cross-sectional view of the small piston outlet channel of FIG. 14 according to some example embodiments.
Figure 16:
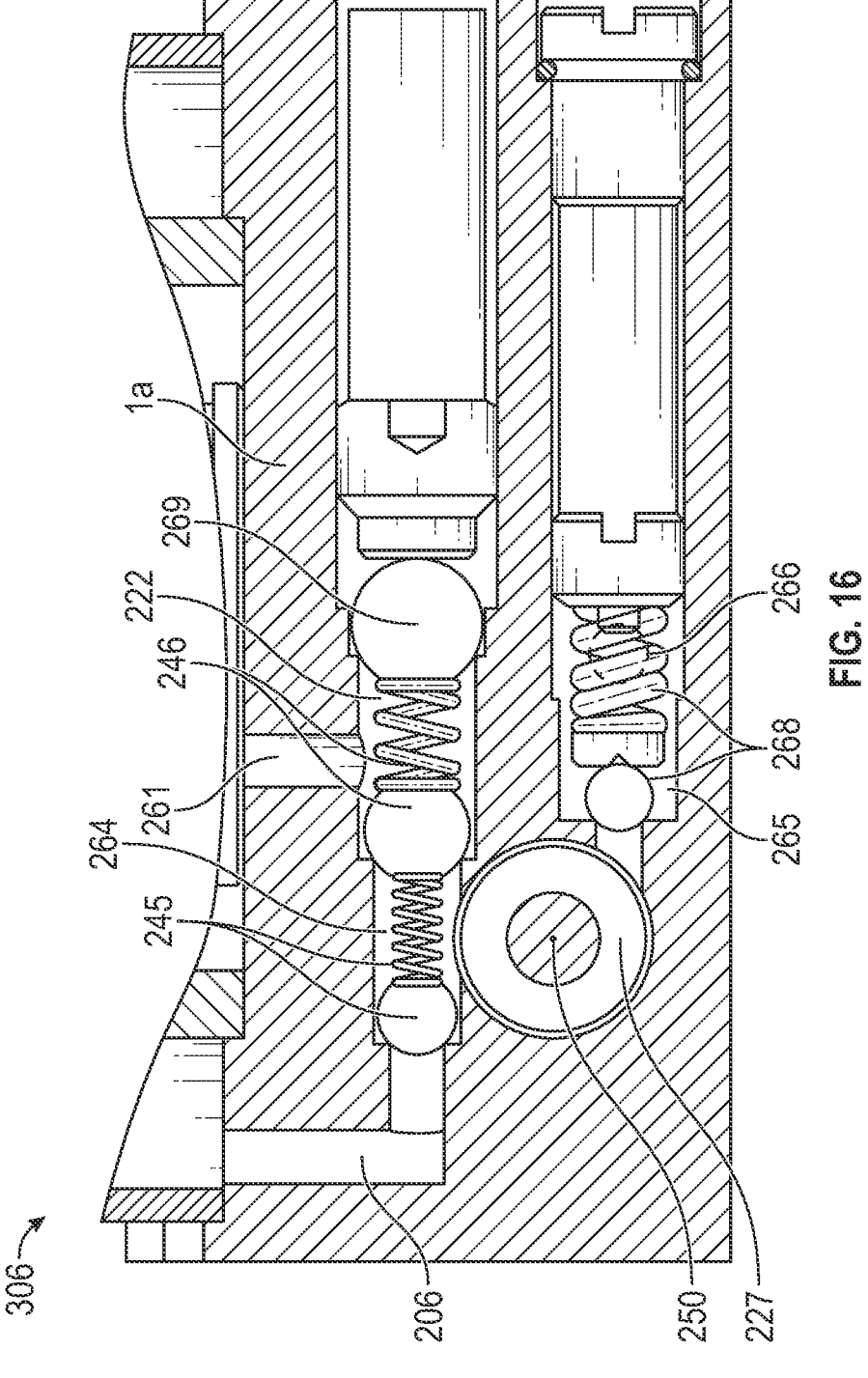
FIG. 16 illustrates an example hydraulic outlet system for the medium piston of FIG. 11 according to some example embodiments.
Figure 17:
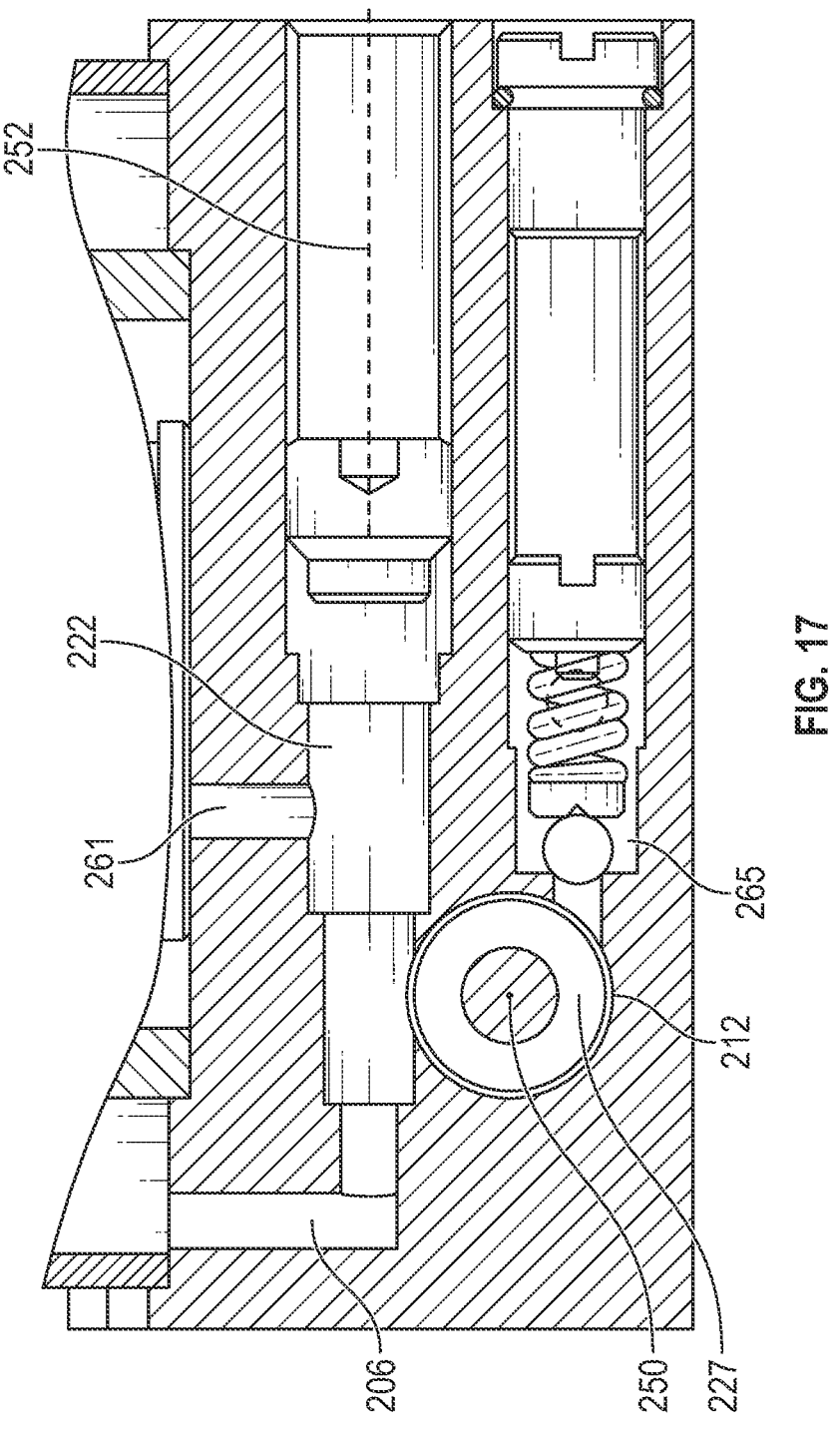
FIG. 17 illustrates a cross-sectional view of a medium piston outlet channel that is connected to the medium piston fluid space of FIG. 11 according to some example embodiments.

In various embodiments, the small piston outlet channel 221, which was previously described, is connected to the small piston fluid space 226 (see FIGS. 14 and 15), and the medium piston outlet channel 222, which was also previously described, is connected to the medium piston fluid space 227 (see FIGS. 16 and 17). Each of the small piston outlet channel 221 and the medium piston outlet channel 222 are connected to a respective fluid inlet 206 (which may be connected to a hydraulic fluid source, such as a hydraulic tank of a hydraulic jack) and to a respective fluid outlet 261 (which may be connected to a hydraulic fluid destination, such as a hydraulic cylinder of a hydraulic jack). Note that in various embodiments, the small piston outlet channel 221 and the medium piston outlet channel 222 may be connected to the same hydraulic fluid source and the same hydraulic fluid destination through their respective fluid inlet 206 and respective fluid outlet 261.

As noted above, the small piston outlet channel 221 and the medium piston outlet channel 222 are connected to different parts of the piston cavity 212 (e.g., the small piston fluid space 226 and the medium piston fluid space 227) and are generally orthogonal to the longitudinal axis 250 of the piston cavity 212. This can be clearly seen in FIG. 15, which shows the longitudinal axis 51 of the small piston outlet channel 221 orthogonal relative to the longitudinal axis 250 of piston cavity 212, and in FIG. 17, which shows the longitudinal axis 252 of the medium piston outlet channel 222 orthogonal relative to the longitudinal axis 250 of the piston cavity 212. Thus, in this embodiment, the small piston outlet channel 221 and the medium piston outlet channel 222 are parallel to each other.

Operationally, when the motor 203 is activated and running, it turns/rotates the eccentric wheel 231 as noted above. As the eccentric wheel 231 rotates, the concept of which is well known, it repeatedly and cyclically pushes the dual pump piston 204. Because of the presence of the spring 225 provides a counter force to the dual pump piston 204, the dual pump piston 204 moves back and forth in the piston cavity 212.

As will be further described herein, as the dual pump piston 204 moves back and forth, the hydraulic fluid to be pumped by the small piston 241 and the medium piston 242 of the dual pump piston 204 originates from and leaves through the small piston outlet channel 221 and the medium piston outlet channel 222, which are respectively connected to the small piston fluid space 226 and the medium piston fluid space 227. More particularly, as the dual pump piston 204 moves back and forth, the volume of the small piston fluid space 226, at the end/periphery of the small piston 241, and the medium piston fluid space 227, at the end/periphery of the medium piston 242, cyclically contracts and expands as the respective small piston 241 and the medium piston 242 moves back and forth during a pumping operation. That is, as the small piston 241 moves back and forth during a pumping operation, it pulls and then pushes out hydraulic fluid from and into the small piston outlet channel 221. As the medium piston 242 likewise moves back and fourth during the pumping operation, it pulls and then pushes out hydraulic fluid from and into the medium piston outlet channel 222.

Because of the relative size (e.g., cross-sectional size) of the small piston 241 with respect to the size of the medium piston 242, during a pumping operation, the hydraulic fluid that is injected into the small piston outlet channel 221 via the small piston fluid space 226 will be under higher pressure than the hydraulic fluid that is injected into the medium piston outlet channel 222 via the medium piston fluid space 227.

In various embodiments, the hydraulic fluids that were injected into the small piston outlet channel 221 and the medium piston outlet channel 222 may be both used during lifting operations when the load is light. However, when the lifting operations involve lifting heavy loads, only the high-pressure hydraulic fluid in the small piston outlet channel 221 may be used by the hydraulic pump piston assembly 300a during the heavy lifting operations. In extreme cases where the load is extremely heavy, however, neither the hydraulic fluids in the small piston outlet channel 221 nor the medium piston outlet channel 222 may be used to lift the heavy load since they may not have sufficient pressure to counter the weight of the heavy load. These features of the hydraulic pump piston assembly 300a will be discussed in greater detail below with reference to FIGS. 5 to 8. More particularly, FIGS. 14-17 shows cross-sectional views of the small piston outlet channel 221 and the medium piston outlet channel 222 at A-A and B-B of FIG. 10 illustrating views of, among other things, the small piston outlet channel 221 and the medium piston outlet channel 222 both when they are empty and both when they include components to facilitate the functionalities of the hydraulic pump piston assembly 300a.

Figure 14:
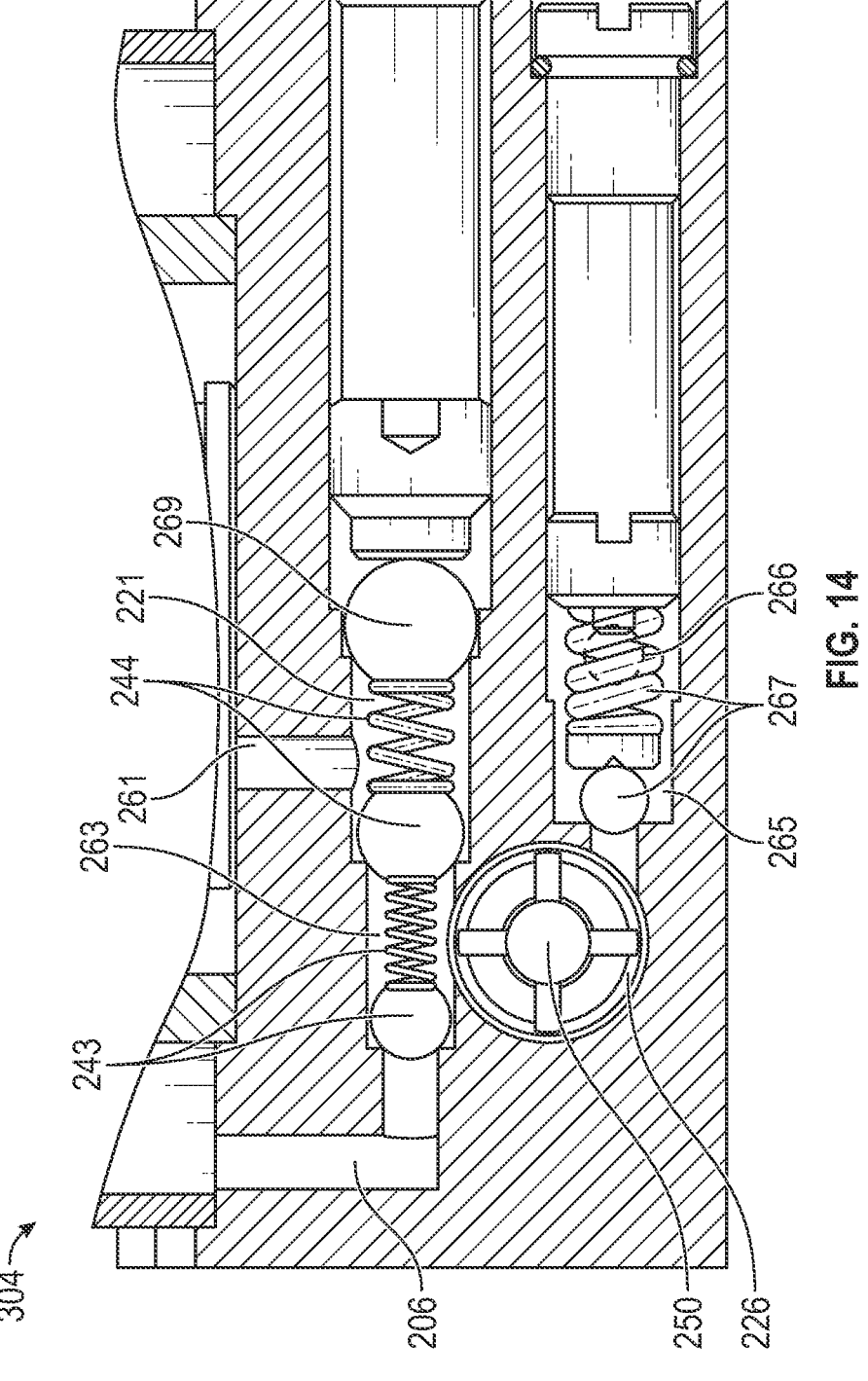
FIG. 14 illustrates an example hydraulic outlet system for the small piston of FIG. 11 according to some example embodiments.

Referring particularly now to FIG. 15, which shows a cross-sectional view at B-B in FIG. 10 of the small piston outlet channel 221 and the portion of the piston cavity 212 where the small piston fluid space 226 and the small piston outlet channel 221 are connected according to some embodiments. FIG. 15 further shows an overflow channel 265 connected to the small piston fluid space 226. In contrast, FIG. 14 illustrates the same cross-sectional view of the small piston outlet channel 221 of FIG. 15 but with some of the components that facilitate the functionalities of the hydraulic pump piston assembly 300a inserted into the small piston outlet channel 221. More particularly, FIG. 14 illustrates the components of the hydraulic outlet system 304 for the small piston 241 according to some embodiments.

As illustrated in FIGS. 14 and 15 the small piston outlet channel 221 is connected to fluid inlet 206, which may be connected to a hydraulic fluid source, and a fluid outlet 261, which may be connected to a hydraulic fluid destination. Located in the small piston outlet channel 221 between the fluid inlet 206 and the fluid outlet 261 are a small piston low-pressure one-way outlet valve 243 and a small piston high-pressure one-way outlet valve 244 in series. In various embodiments, each of the small piston low-pressure one-way outlet valve 243 and the small piston high-pressure one-way outlet valve 244 may be a ball and spring check valve. The small piston low-pressure one-way outlet valve 243 and the small piston high-pressure one-way outlet valve 244 in various embodiments are oriented in the small piston outlet channel 221 such that a fluid can flow from the fluid inlet 206 to the fluid outlet 261 of the small piston outlet channel 221 but cannot flow in the opposite direction from the fluid outlet 261 to the fluid inlet 206 of the small piston outlet channel 221. In various embodiments, the small piston low-pressure one-way outlet valve 243 is set to open at a lower pressure than the small piston high-pressure one-way outlet valve 244.

Located and formed between the small piston low-pressure one-way outlet valve 243 and the small piston high-pressure one-way outlet valve 244 is a small piston temporary storage cavity 263 that is connected to the small piston fluid space 226 of the small piston 241. At the enclosed end of the small piston outlet channel 221 is a sealing ball 269 to seal and enclose the end of the small piston outlet channel 221.

Connected to the small piston fluid space 226 is an overflow channel 265 that contains a small piston safety valve 267, which in the embodiment illustrated in FIG. 14 is a ball and spring check valve. The overflow channel 265 may be connected to an overflow hole 266 that may be further connected to the hydraulic fluid source that is connected to the fluid inlet 206. Note that in FIG. 14, only an outline of the overflow hole 266 is visible because the overflow hole 266 is orthogonal to the overflow channel 265. In various embodiments, the small piston safety valve 267, which is a one-way check valve, may be set to open when the small piston high-pressure one-way outlet valve 244 is closed and when hydraulic fluid pressure in the small piston fluid space 226 exceeds the cracking pressure of the small piston safety valve 267 at which the small piston safety valve 267 opens.

When the dual pump piston 204 is moving/sliding back and forth in the piston cavity 212, the small piston 241 is likewise moving back and forth, causing the fluid volume of the small piston fluid space 226 to contract and expand accordingly. Because of the contraction and expansion of the fluid volume of the small piston fluid space 226, negative and positive pressures are cyclically applied to the small piston temporary storage cavity 263.

During one-half of a pumping cycle of the dual pump piston 204 (e.g., when the dual pump piston 204 is extending outwards into the drive cavity 211), a negative pressure is applied to the hydraulic fluid in the small piston temporary storage cavity 263. As a result, the small piston low-pressure one-way outlet valve 243 is opened while the small piston high-pressure one-way outlet valve 244 remains shut, resulting in hydraulic fluid being pulled from the hydraulic fluid source through the fluid inlet 206, but not being allowed to flow out of the small piston high-pressure one-way outlet valve 244 and instead, flows into the expanding small piston fluid space 226.

During the other half of the pumping cycle of the dual pump piston 204 (e.g., when the dual pump piston 204 is contracting inwards into the piston cavity 212), a positive pressure is applied to the hydraulic fluid in the small piston temporary storage cavity 263. As a result, the small piston low-pressure one-way outlet valve 243 is closed while the small piston high-pressure one-way outlet valve 244 may be opened (depending on the pressure at the fluid outlet 261), resulting in the hydraulic fluid in the small piston temporary storage cavity 263 being pushed through the small piston high-pressure one-way outlet valve 244 and out through the fluid outlet 261 while the small piston low-pressure one-way outlet valve 243 remains shut.

Accordingly, the small piston 241 acts like a human lung pulling in hydraulic fluid through the small piston low-pressure one-way outlet valve 243 during the first half of a pump cycle, and then exhaling hydraulic fluid through the small piston high-pressure one-way outlet valve 244 during the second half the cycle.

Note that in cases where the hydraulic pressure at the fluid outlet 261 (e.g., the hydraulic pressure of a hydraulic cylinder 104 connected to the fluid outlet 261) is greater than the hydraulic pressure at the small piston temporary storage cavity 263, the small piston high-pressure one-way outlet valve 244 may not open even if hydraulic fluid is being injected into the small piston temporary storage cavity 263 so long as the hydraulic pressure of the small piston temporary storage cavity 263 does not at least exceed the hydraulic pressure at the fluid outlet 261. Such a scenario may occur, for example, if the hydraulic pump piston assembly 300a is being implemented as a part of a hydraulic jack and the load of the hydraulic jack is significant (e.g., very heavy). Under such circumstances, the pressure in the small piston temporary storage cavity 263 will rise if the small piston 241 continues to "squeeze" the hydraulic fluid in the small piston fluid space 226, rising until it reaches the cracking pressure of the small piston safety valve 267 at which point the small piston safety valve 267 opens. Once the small piston safety valve 267 opens, hydraulic fluid from the small piston temporary storage cavity 263 and/or the small piston fluid space 226 may flow through the small piston safety valve 267, through the overflow hole 266, and back to the hydraulic fluid source.

Referring to FIG. 17, which shows a cross-sectional view at A-A in FIG. 10 of the medium piston outlet channel 222 and the portion of the piston cavity 212 where the medium piston outlet channel 222 connects with the medium piston fluid space 227 according to some embodiments. FIG. 17 further shows an overflow channel 265 connected to the medium piston fluid space 227. In contrast, FIG. 16 illustrates the same cross-sectional view of the medium piston outlet channel 222 of FIG. 17 but with some of the components that facilitate the functionalities of the hydraulic pump piston assembly 300a inserted into the medium piston outlet channel 222. More particularly, FIG. 16 illustrates the components of the hydraulic outlet system 306 for the medium piston 242 according to some embodiments.

As illustrated in FIG. 16, the medium piston outlet channel 222 is connected to fluid inlet 206, which may be connected to a hydraulic fluid source, and a fluid outlet 261, which may be connected to a hydraulic fluid destination, that may be the same hydraulic fluid source and the hydraulic fluid destination that the small piston outlet channel 221 is connected to. Located in the medium piston outlet channel 222 between the fluid inlet 206 and the fluid outlet 261 are a medium piston low-pressure one-way outlet valve 245 and a medium piston high-pressure one-way outlet valve 246 in series. In various embodiments, each of the medium piston low-pressure one-way outlet valve 245 and the medium piston high-pressure one-way outlet valve 246 may be a ball and spring check valve. The medium piston low-pressure one-way outlet valve 245 and the medium piston high-pressure one-way outlet valve 246 in various embodiments are oriented in the small piston outlet channel 22 such that a fluid can flow from the fluid inlet 206 to the fluid outlet 261 of the medium piston outlet channel 222 but cannot flow in the opposite direction from the fluid outlet 261 to the fluid inlet 206 of the medium piston outlet channel 222. In various embodiments, the medium piston low-pressure one-way outlet valve 245 is set to open at a lower pressure than the medium piston high-pressure one-way outlet valve 246.

Located and formed between the medium piston low-pressure one-way outlet valve 245 and the medium piston high-pressure one-way outlet valve 246 is a medium piston temporary storage cavity 264 that is connected to the medium piston fluid space 227 of the medium piston 242. At the enclosed end of the medium piston outlet channel 222 is a sealing ball 269 to seal and enclose the end of the medium piston outlet channel 222.

Connected to the medium piston fluid space 227 is an overflow channel 265 that contains a medium piston safety valve 268, which in the embodiment illustrated in FIG. 16 is a ball and spring check valve. The overflow channel 265 may be connected to an overflow hole 266 that may be further connected to the hydraulic fluid source that is connected to the fluid inlet 206. Note that in FIG. 16, only an outline of the overflow hole 266 is visible because the overflow hole 266 is orthogonal to the overflow channel 265.

In various embodiments, the medium piston safety valve 268, which is a one-way check valve, may be set to open when the medium piston high-pressure one-way outlet valve 246 is closed and when hydraulic fluid pressure in the medium piston fluid space 227 exceeds the cracking pressure of the medium piston safety valve 268 at which the medium piston safety valve 268 opens. In some embodiments, the cracking pressure of the medium piston safety valve 268 is less than the cracking pressure of the small piston safety valve 267.

When the dual pump piston 204 is moving/sliding back and forth in the piston cavity 212, the medium piston 242 is likewise moving back and forth, causing the fluid volume of the medium piston fluid space 227 to contract and expand accordingly. Because of the contraction and expansion of the fluid volume of the medium piston fluid space 227, negative and positive pressures are cyclically applied to the medium piston temporary storage cavity 264.

During one-half of a pumping cycle of the dual pump piston 204 (e.g., when the dual pump piston 204 is extending outwards into the drive cavity 211), a negative pressure is applied to the hydraulic fluid in the medium piston temporary storage cavity 264. As a result, the medium piston low-pressure one-way outlet valve 245 is opened while the medium piston high-pressure one-way outlet valve 246 remains shut, resulting in hydraulic fluid being pulled from the hydraulic fluid source through the fluid inlet 206, but not being allowed to flow out of the medium piston high-pressure one-way outlet valve 246 and instead, flows into the expanding medium piston fluid space 227.

During the other half of the pumping cycle of the dual pump piston 204 (e.g., when the dual pump piston 204 is contracting inwards into the piston cavity 212), a positive pressure is to the hydraulic fluid in the medium piston temporary storage cavity 264. As a result, the medium piston low-pressure one-way outlet valve 245 is closed while the medium piston high-pressure one-way outlet valve 246 may be opened (depending on the pressure at the fluid outlet 261), resulting in hydraulic fluid in the medium piston temporary storage cavity 264 being pushed through the medium piston high-pressure one-way outlet valve 246 and out through the fluid outlet 261 while the medium piston low-pressure one-way outlet valve 245 remains shut.

Note that in cases where the hydraulic pressure at the fluid outlet 261 (e.g., the hydraulic pressure of a hydraulic cylinder 104 connected to the fluid outlet 261) is greater than the hydraulic pressure at the medium piston temporary storage cavity 264, the medium piston high-pressure one-way outlet valve 246 may not open even if hydraulic fluid is being injected into the medium piston temporary storage cavity 264 so long as the hydraulic pressure of the medium piston temporary storage cavity 264 does not at least exceed the hydraulic pressure at the fluid outlet 261. As previously discussed, such a scenario may occur, for example, if the hydraulic pump piston assembly 300a is being implemented as a part of a hydraulic jack and the load of the hydraulic jack is relatively heavy.

Under such circumstances, the pressure in the medium piston temporary storage cavity 264 will rise if the medium piston 242 continues to "squeeze" the hydraulic fluid in the medium piston fluid space 227. rising until it reaches the cracking pressure of the medium piston safety valve 268 at which point the medium piston safety valve 268 opens. Once the medium piston safety valve 268 opens, hydraulic fluid from the medium piston temporary storage cavity 264 and/or the medium piston fluid space 226 may flow through the medium piston safety valve 268, through the overflow hole 266, and back to the hydraulic fluid source.

In extreme cases, this may also occur with respect to the small piston high-pressure one-way outlet valve 244 (e.g., that the small piston high-pressure one-way outlet valve 244 does not open) because the pressure of the hydraulic fluid in the small piston temporary storage cavity 263 does not sufficiently exceed the pressure at the fluid outlet 261 to cause the small piston high-pressure one-way outlet valve 244 to open. Under such circumstances, hydraulic fluids outputted by the small piston 241 and the medium piston 242 are returned to the fluid source through their respective overflow channels 265.

Referring now to FIGS. 18-22 illustrating another example hydraulic piston pump assembly according to some embodiments. More particularly, FIGS. 18-22 illustrate a hydraulic piston pump assembly 300b that employs a dual pump piston 204 comprising a small piston and medium piston, similar or the same as the above-described hydraulic piston pump assembly 300a, and a third piston (hereinafter "large piston 272") to facilitate selectively discharging or outputting hydraulic fluids with different characteristics (e.g., different hydraulic pressures and flow rates) in response to, for example, different load conditions. For the embodiments, the large piston 272 may be placed in a separate cavity, referred to herein as a "large piston cavity 207" (see FIG. 20), of a hydraulic unit base 1b from the piston cavity 212 that includes the dual pump piston 204. As will be further described herein, the hydraulic unit base 1b may also include a hydraulic outlet system 308 (see FIG. 21) associated with the large piston 272, similar to the hydraulic outlet systems 304 and 306 of the small and medium pistons 241 and 242 of the dual pump piston 204.

Figure 18:
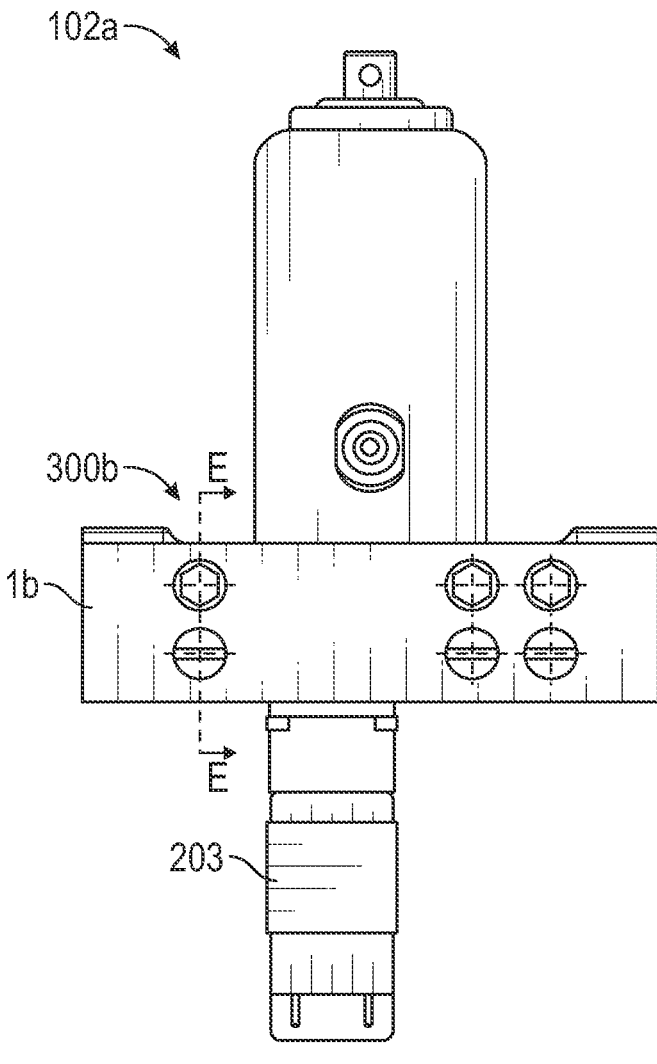
FIG. 18 illustrates some components of another example hydraulic piston pump assembly that may be connected to a hydraulic cylinder assembly according to some example embodiments.

Referring particularly now to FIG. 18, which shows a hydraulic unit base 1b of the hydraulic piston pump assembly 300b connected to an example hydraulic cylinder assembly 102a of a hydraulic jack according to various embodiments. The hydraulic unit base 1b, similar to the hydraulic unit base 1a previously described, may be a support or housing structure to hold or support various components including various pump components such as the above-described dual pump piston 204 with the small and medium pistons, the large piston 272, and their associated hydraulic outlet systems that may be part of the hydraulic piston pump assembly 300b. As illustrated in FIG. 18, the hydraulic piston pump assembly 300b may also include a motor 203 that may be used to drive the dual pump piston 204 and the large piston 272. In various embodiments, the hydraulic unit base 1b may be made of steel, iron, aluminum, or other metal or alloy.

The hydraulic cylinder assembly 102a may include a hydraulic fluid tank 108a and a hydraulic cylinder 104 containing a ram 106 as previously described. In various embodiments, the motor 203, such as an electric motor, may rotate an eccentric wheel 231, which in turn, drives the dual pump piston 204 as well as the large piston 272.

Figures 19, 20:
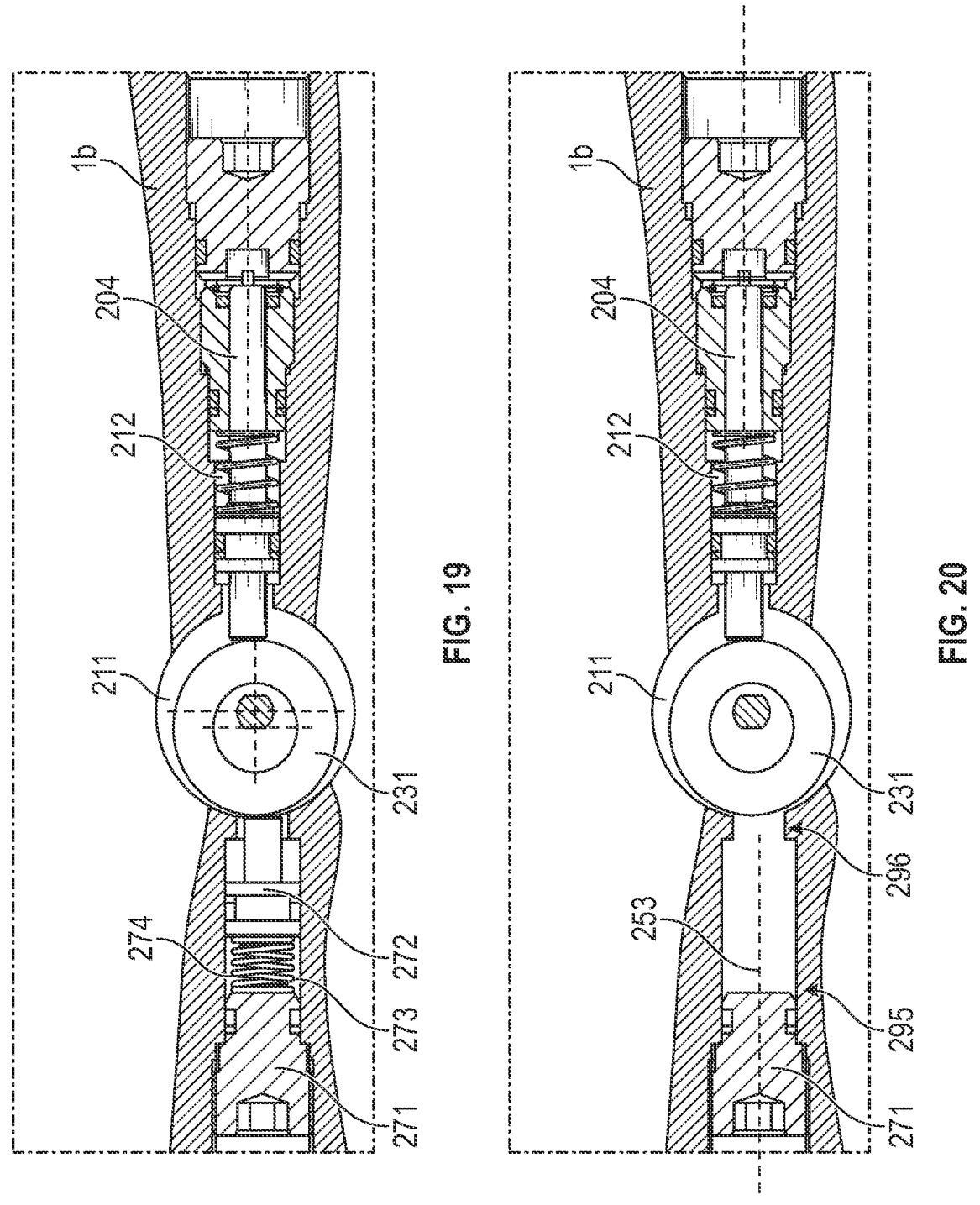
FIG. 19 illustrates a cross-sectional view of a large piston cavity that includes a large piston according to some example embodiments.
FIG. 20 illustrates a cross-sectional view of the large piston cavity without the large piston according to some example embodiments.

Referring to FIG. 20, which illustrates a cross-sectional view of a large piston cavity 207 in the hydraulic unit base 1b of FIG. 18 in accordance with various embodiments. The large piston cavity 207 may be connected to a drive cavity 211 that contains the eccentric wheel 231. The drive cavity 211 may be further connected to the previously described piston cavity 212 containing the dual pump piston 204. As further illustrated in FIG. 20, the large piston cavity 207 has a closed end 295, which is enclosed by a large piston block 271, and at the opposite end an opened end 296 that opens or interfaces with a driver cavity 211 containing the eccentric wheel 231 The large piston cavity 207, in some embodiments, may be an elongated cavity that extends along a large piston cavity axis 253. In various embodiments, the large piston cavity 207 may have a larger volume than the piston cavity 212.

In various embodiments, and as will be further described herein, the hydraulic unit base 1b may further include a large piston outlet channel 275 (see FIG. 22) to hold at least some of the components of the hydraulic outlet system 308 (see FIG. 21) of the large piston 272. Although not illustrated, the hydraulic unit base 1b may also additionally include the previously described small piston outlet channel 221 and medium piston outlet channel 222 to hold various components of the hydraulic outlet systems 304 and 306 of the small and medium pistons 241 and 242.

FIG. 19 illustrates a cross-sectional view of the large piston 272 and a large piston spring 273 disposed in the large piston cavity 207. In various embodiments, the large piston 272 may have a larger fluid displacement than the fluid displacements of the small piston 241 and medium piston 242 in accordance with various embodiments. The large piston 272 may be slidably disposed in the large piston cavity 207. In various embodiments, the large piston spring 273 may push off from the large piston block 271 urging at least an end of the large piston 272 to extend out into the drive cavity 211 and push against the eccentric wheel 231. When the eccentric wheel rotates, the large piston 272 is cyclically pushed into the large piston cavity 207. As a result, like the dual pump piston 204, the large piston 272 has a certain degree of longitudinal freedom to move.

Figure 21:
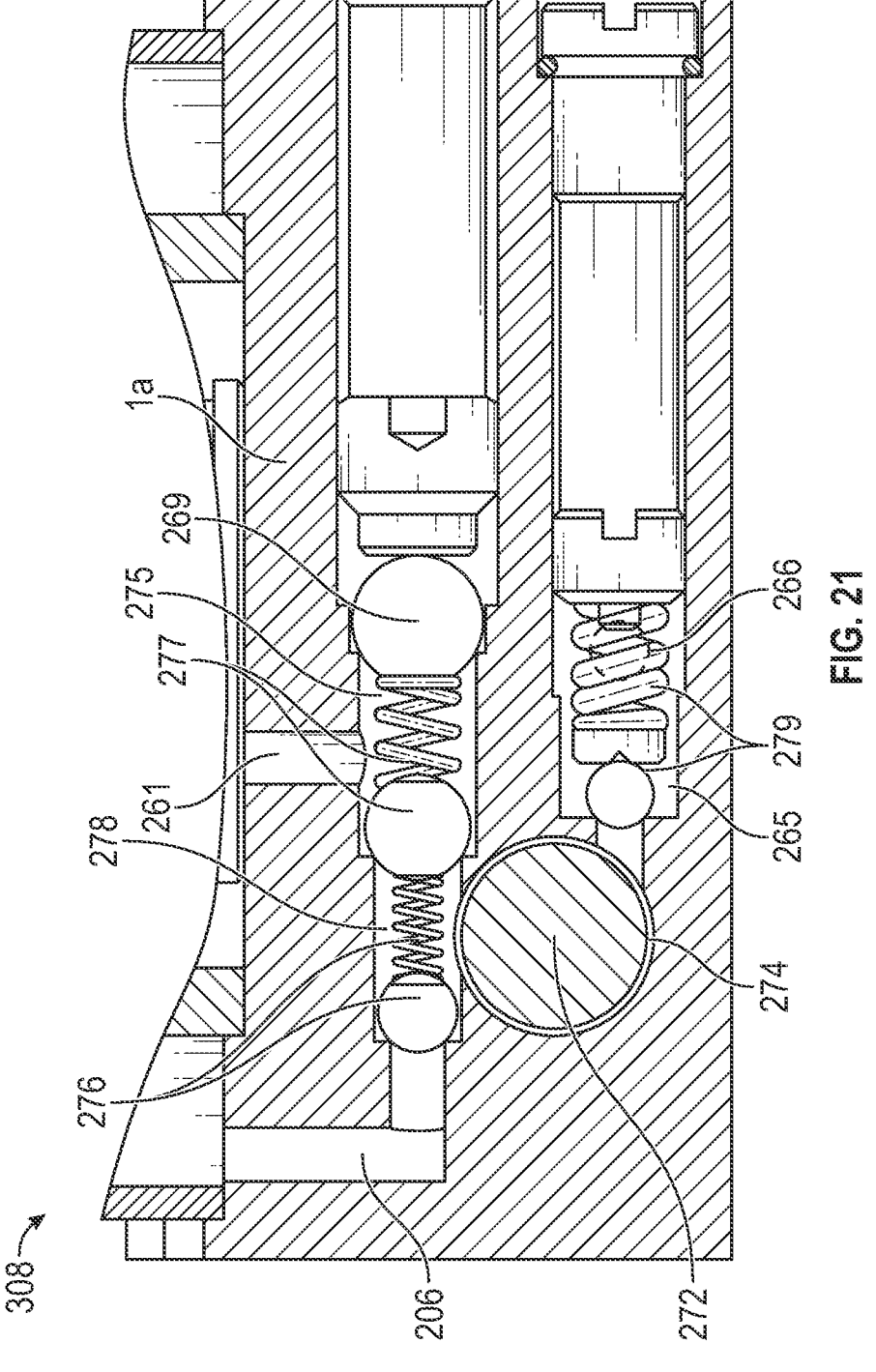
FIG. 21 illustrates an example hydraulic outlet system for the large piston of FIG. 19 according to some example embodiments.
Figure 22:
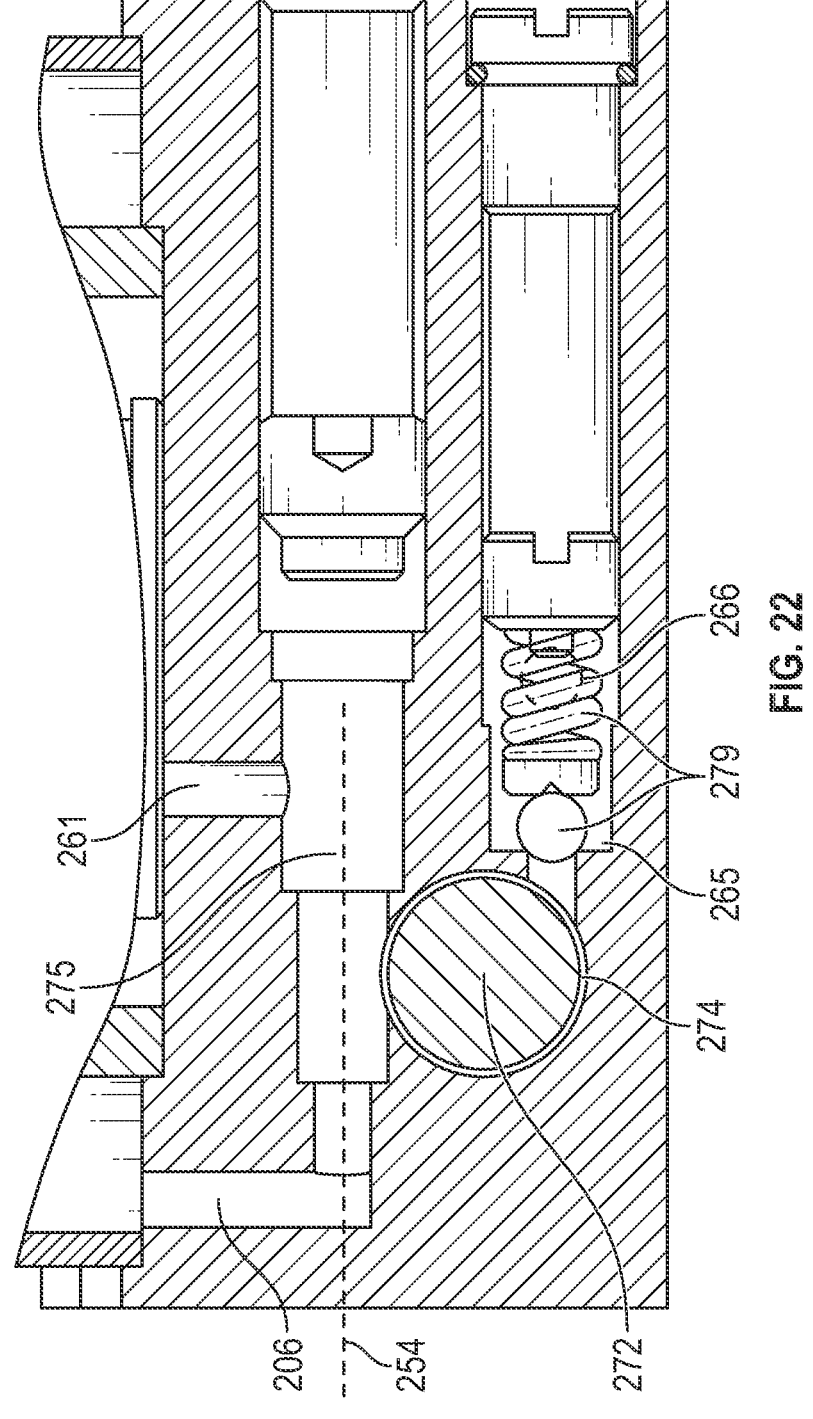
FIG. 22 illustrates a cross-sectional view of the large piston outlet channel of FIG. 21 according to some example embodiments.

The portion of the large piston cavity 207 between the large piston 272 and the large piston block 271 that encloses the end of the large piston cavity 207 and that may be filled with hydraulic fluid will be referred to herein as a large piston fluid space 274. Note that the fluid volume of the large piston fluid space 274 will expand and contract when the large piston 272 slides or strokes back and forth, resulting in hydraulic fluid being pulled in from the large piston outlet channel 275 (see FIG. 22) as well as being pushed out through the large piston outlet channel 275. That is, connected to the large piston fluid space 274 is the large piston outlet channel 275 that includes some of the hydraulic outlet system 308 of the large piston 272 according to various embodiments. Referring to FIG. 22, which illustrates a cross-sectional view at E-E in FIG. 18 of the large piston outlet channel 275 without its hydraulic outlet system components as shown in FIG. 21. The large piston outlet channel 275 is connected to a fluid inlet 206 (which may be connected to the same hydraulic fluid source that the fluid inlets 206 of the small piston outlet channel 221 and the medium piston outlet channel 222 are connected to) and a fluid outlet 261 (which may be connected to the same hydraulic fluid destination that the fluid outlets 261 of the small piston outlet channel 221 and the medium piston outlet channel 222 are connected to). Note that the longitudinal axis 254 of the large piston outlet channel 275 is orthogonal to the longitudinal axis 253 of the large piston cavity 207 as can be seen in FIGS. 20 to 22.

FIG. 21 also shows an overflow channel 265 connected to the large piston fluid space 274 that includes a large piston safety valve 279. The overflow channel 265 for the large piston 272 is further connected to an overflow hole 266 that may be connected to the hydraulic fluid source that the fluid inlet 206 may be connected to. In FIG. 21 only the outline of overflow hole 266 can be seen because it is perpendicular to the overflow channel 265. In various embodiments, the opening pressure (i.e., cracking pressure) of the large piston safety valve 279 may be smaller than the cracking pressure of the medium piston safety valve 268, while the cracking pressure of the medium piston safety valve 268 is smaller than the cracking pressure of the small piston safety valve 267. In the embodiment illustrated in FIG. 21, the large piston safety valve 279 is a ball and spring check valve.

As will be further described herein, as the large piston 272 moves back and forth in the large piston cavity 207 in response to the eccentric wheel 231 rotating, the hydraulic fluid pumped by the large piston 272 originates from and leaves through the large piston outlet channel 275, which is connected to the large piston fluid space 274. More particularly, as the large piston 272 moves back and forth within the large piston cavity 207, the volume of the hydraulic fluid in the large piston fluid space 274 expands and contracts by pulling or receiving hydraulic fluid from the fluid inlet 206 via the large fluid outlet channel 275, and then contracts by expelling hydraulic fluid to the fluid outlet 261 via the large fluid outlet channel 275.

Because of the relative size (e.g., cross-sectional size) of the large piston 272 with respect to the size of the medium piston 242 and the size of the small piston 241 of the dual pump piston 204, the hydraulic fluid that is injected into the large piston outlet channel 275 during a pumping operation by the large piston 272 will be under lower pressure than the hydraulic fluids that are injected into the small piston outlet channel 221 and the medium piston outlet channel 222 by the small piston 241 and the medium piston 242, respectively.

In various embodiments, the hydraulic fluid that is injected/driven into the large piston outlet channel 275, as well as the hydraulic fluids that are injected/driven into the small piston outlet channel 221 and the medium piston outlet channel 222 may all be used during lifting operations when the load is relatively light. However, when the lifting operations involve lifting relatively heavy loads, only the high-pressure hydraulic fluids in the small piston outlet channel 221 and the medium piston outlet channel 222, or only the hydraulic fluid in the small piston outlet channel 221 may be used by the hydraulic pump piston assembly 300b during the heavy lifting operations. In extreme cases, where the load is extremely heavy, even the hydraulic fluid from the small piston outlet channel 221 may not be used, and instead, may be returned back to the hydraulic fluid source via the overflow channel 265.

Referring particularly now to FIG. 22, which shows a cross-sectional view at E-E in FIG. 18 of the large piston outlet channel 275 and the portion of the large piston cavity 207 where the large piston outlet channel 275 connects with the large piston cavity 207. FIG. 22 further shows an overflow channel 265 connected to the large piston fluid space 274. In contrast, FIG. 21 illustrates the same cross-sectional view of the large piston outlet channel 275 of FIG. 22 but with some of the components that facilitate the functionalities of the hydraulic pump piston assembly 300b (e.g., the components of the hydraulic outlet system 308 of the large piston 272) inserted into the large piston outlet channel 275.

As illustrated in FIG. 21 the large piston outlet channel 275 is connected to fluid inlet 206, which may be connected to a hydraulic fluid source, and a fluid outlet 261, which may be connected to a hydraulic fluid destination. Located in the large piston outlet channel 275 between the fluid inlet 206 and the fluid outlet 261 are a large piston low-pressure one-way outlet valve 276 and a large piston high-pressure one-way outlet valve 277 in series. In various embodiments, each of the large piston low-pressure one-way outlet valve 276 and the large piston high-pressure one-way outlet valve 277 may be a ball and spring check valve. Alternatively, other types of one-way vales may be employed in alternative embodiments. The large piston low-pressure one-way outlet valve 276 and the large piston high-pressure one-way outlet valve 277 in various embodiments are oriented in the large piston outlet channel 275 such that a fluid can flow from the fluid inlet 206 to the fluid outlet 261 of the large piston outlet channel 275 but cannot flow in the opposite direction from the fluid outlet 261 to the fluid inlet 206 of the large piston outlet channel 275. In various embodiments, the large piston low-pressure one-way outlet valve 276 is set to open at a lower pressure than the large piston high-pressure one-way outlet valve 277.

Located and formed between the large piston low-pressure one-way outlet valve 276 and the large piston high-pressure one-way outlet valve 277 is a large piston temporary storage cavity 278 that is connected to the large piston fluid space 274. At the enclosed end of the large piston outlet channel 275 is a sealing ball 269 to seal and enclose the end of the large piston outlet channel 275.

Connected to the large piston fluid space 274 is an overflow channel 265 that contains a large piston safety valve 279, which in the embodiment illustrated in FIG. 21 is a ball and spring check valve. The overflow channel 265 may be connected to an overflow hole 266 that may be further connected to the hydraulic fluid source that is connected to the fluid inlet 206. Note that in FIG. 21, only an outline of the overflow hole 266 is visible because the overflow hole 266 is orthogonal to the overflow channel 265. In various embodiments, the large piston safety valve 279, which is a one-way check valve, may be set to open when the large piston high-pressure one-way outlet valve 277 is closed and when the hydraulic fluid pressure in the large piston cavity 207 exceeds the cracking pressure of the large piston safety valve 279 at which the large piston safety valve 279 opens.

When the large piston 272 is moving/sliding back and forth in the large piston cavity 207, this causes the fluid volume (e.g., large piston fluid space 274) between the large piston 272, the internal walls of the large piston cavity 207, and the closed end (e.g., large piston block 271) of the large piston cavity 207 to contract and expand accordingly. Because of the contraction and expansion of the fluid volume in this space (e.g., large piston fluid space 274), negative and positive pressures are cyclically applied to the large piston temporary storage cavity 278.

During one-half of a pumping cycle of the large piston 272 (e.g., when the large piston 272 is extending outwards into the drive cavity 211), a negative pressure is applied to the hydraulic fluid in the large piston temporary storage cavity 278. As a result, the large piston low-pressure one-way outlet valve 276 is opened while the large piston high-pressure one-way outlet valve 277 remains shut, resulting in hydraulic fluid being pulled from the hydraulic fluid source through the fluid inlet 206, but not being allowed to flow out of the large piston high-pressure one-way outlet valve 277 and instead, flows into the expanding fluid volume (e.g., large piston fluid space 274) between the large piston 272, the internal walls of the large piston cavity 207, and the closed end (e.g., large piston block 271) of the large piston cavity 207.

During the other half of the pumping cycle of the large piston 272 (e.g., when the large piston 272 is contracting inwards into the drive cavity 211), a positive pressure is applied to the hydraulic fluid in the large piston temporary storage cavity 278. As a result, the large piston low-pressure one-way outlet valve 276 is closed while the large piston high-pressure one-way outlet valve 277 may be opened (depending on the pressure at the fluid outlet 261), resulting in hydraulic fluid in the large piston temporary storage cavity 278 being pushed through the large piston high-pressure one-way outlet valve 277 and out through the fluid outlet 261 while the large piston low-pressure one-way outlet valve 276 remains shut.

Note that in cases where the hydraulic pressure at the fluid outlet 261 is greater than the hydraulic pressure at the large piston temporary storage cavity 278, the large piston high-pressure one-way outlet valve 277 may not open even if hydraulic fluid is being injected/driven into the large piston temporary storage cavity 278 so long as the hydraulic pressure of the large piston temporary storage cavity 278 does not at least exceed the hydraulic pressure at the fluid outlet 261. Such a scenario may occur, for example, if the hydraulic pump piston assembly 300b is being implemented as a part of a hydraulic jack and the load of the hydraulic jack is relatively heavy. Under such circumstances, the pressure in the large piston temporary storage cavity 278 will rise if the large piston 272 continues to "squeeze" the hydraulic fluid in the large piston fluid space 274 and the large piston temporary storage capacity 78, rising until their pressures reach the cracking pressure of the large piston safety valve 279 at which point the large piston safety valve 279 opens. Once the large piston safety valve 279 opens, hydraulic fluid from the large piston temporary storage cavity 278 and/or the large piston fluid space 274 may flow through the large piston safety valve 279, through the overflow hole 266, and back to the hydraulic fluid source.

Figure 23:
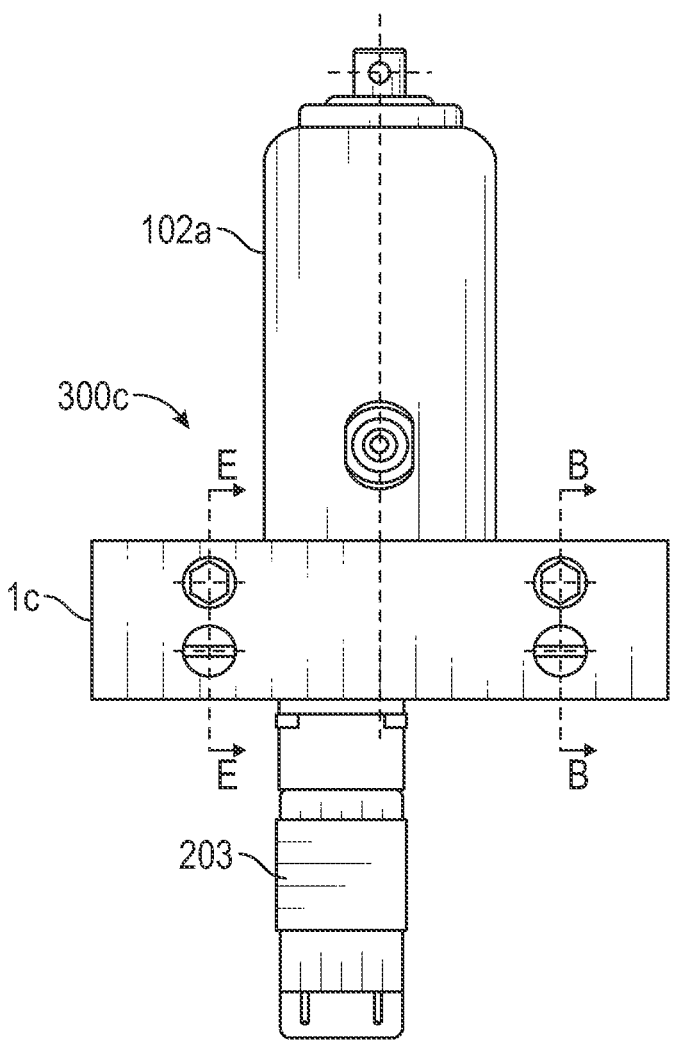
FIG. 23 illustrates some components of another example hydraulic piston pump assembly that may be connected to a hydraulic cylinder assembly according to some example embodiments.
Figure 24:
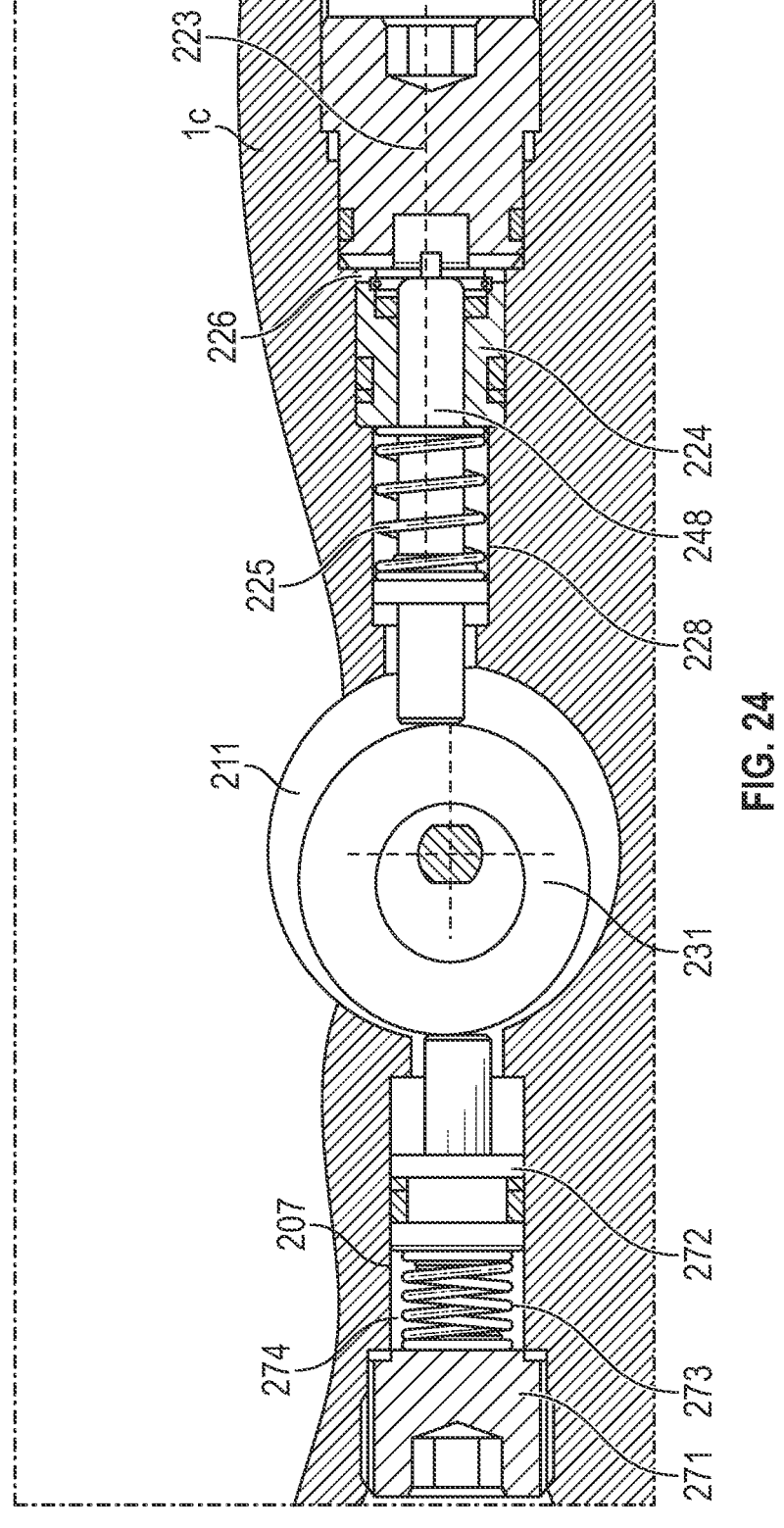
FIG. 24 illustrates a cross-sectional view of a large piston cavity with a large piston and a small piston cavity with a small piston according to some example embodiments.

FIGS. 23 and 24 illustrates components of yet another example hydraulic piston pump assembly according to some embodiments. More particularly, FIGS. 23 and 24 illustrate portions of another hydraulic piston pump assembly 300c, where the hydraulic piston pump assembly 300c employs two individual pump pistons without a dual pump piston. For the embodiments, the hydraulic piston pump assembly 300c may include a small piston 248 and a large piston 272 that are situated in their own individual piston cavities in the hydraulic unit base 1c as will be illustrated in FIG. 24. As in the previous embodiments, these pistons have different capabilities to selectively use hydraulic fluids with different characteristics (e.g., different hydraulic pressures and flow rates) in response to, for example, different load conditions.

FIG. 23 illustrates a hydraulic unit base 1c of a hydraulic piston pump assembly 300c connected to an example hydraulic cylinder assembly 102a of a hydraulic jack according to various embodiments. The hydraulic unit base 1c, similar to the hydraulic unit base 1a and the hydraulic unit base 1b that were previously described, may be a support or housing structure to hold or support various components including various pump components such as the components associated with the small piston 248 and the large piston 272, and the components of their associated hydraulic outlet systems such as the above-described hydraulic outlet systems 104 and 108, that may be part of the hydraulic piston pump assembly 300c.

As illustrated in FIG. 23, the hydraulic piston pump assembly 300c may also include a motor 203 that may be used to drive the small piston 248 and the large piston 272 of the hydraulic piston pump assembly 300c. In various embodiments, the hydraulic unit base 1c may be made of steel, iron, aluminum, or other metal or alloy.

FIG. 24 illustrates a cross-sectional view of some of the components of the hydraulic piston pump assembly 300c that may be included in a large piston cavity 207 and a small piston cavity 228 according to various embodiments. Connected to both the large piston cavity 207 and the small piston cavity 228 is a drive cavity 211 that includes an eccentric wheel 231. Included in the large piston cavity 207 is a large piston 272, a large piston spring 273, and a large piston block 271 at the enclosed end of the large piston cavity 207. Since these components in the large piston cavity 207 were already described above, for purposes of succinctness their functionalities and features will not be provided here.

Included in the small piston cavity 228 is a block 223 at the enclosed end of the small piston cavity 228, a small piston 248, a spring 225, and a pump housing 224 to slidably hold the small piston 248. Note that small piston 248 essentially performs the same function/role as the small piston 241 previously described except that the small piston 248 in FIG. 24 is not connected to a medium piston 242. In various embodiments, the large piston 272 has a larger fluid displacement during a pumping operation and a larger cross-section than the small piston 248.

Although not illustrated in FIG. 24, the small piston cavity 228 may be connected to a hydraulic outlet system, such as the hydraulic outlet system 304 of FIG. 14, for pulling or receiving hydraulic fluid from a hydraulic fluid source via the small piston outlet channel 221 and for discharging hydraulic fluid to a hydraulic fluid destination via the small piston outlet channel 221. Similarly, the large piston cavity 207, as well as the large piston fluid space 274, may be connected to a hydraulic outlet channel, such as the hydraulic outlet channel 275 of FIG. 21 for pulling or receiving hydraulic fluid from the hydraulic fluid source via the large piston outlet channel 275 and for discharging hydraulic fluid to a hydraulic fluid destination via the large piston outlet channel 275.

Operationally, as the eccentric wheel 231 rotates, each piston (e.g., the large piston 272 and the small piston 248) take turns being pushed into and out of their respective cavities (e.g., small piston cavity 228 and large piston cavity 207). As a result, hydraulic fluids may be pulled or received from a hydraulic fluid source and then potentially discharged/driven into a hydraulic fluid destination by one or more of the small piston 248 and the large piston 272 depending on, for example, the load to be lifted. For example, if the load to be lifted is relatively light, hydraulic fluids outputted by both the small piston 248 and the large piston 272 may be used for lifting the load. However, if the load to be lifted is relatively heavy, then only hydraulic fluid discharged by the small piston 248, or no hydraulic fluid, may be used to lift the heavy load. That is, if the load is extremely heavy, then during a pumping operation, the hydraulic fluids outputted by both the small piston 248 and the large piston 272 may be recirculated back to the hydraulic fluid source (e.g., a hydraulic retention tank) via their overflow channel 265 rather than, for example, used for lifting the heavy load. On the other hand, if the load is moderately heavy, then at least the hydraulic fluid outputted by the small piston 248 may be used for lifting the moderately heavy load.

From another perspective, the hydraulic piston pump assembly 300c may comprise a hydraulic unit base 1c that includes a first piston cavity (e.g., small piston cavity 228) and a second piston cavity (e.g., large piston cavity 207), a drive cavity 211 connected to both the first piston cavity (e.g., small piston cavity 228) and the second piston cavity (e.g., large piston cavity 207). The hydraulic unit base 1c may further include a small piston outlet channel 221 (see, for example, FIG. 14), and a large piston outlet channel 275

(see, for example, FIG. 21), where the small piston outlet channel 221 and the large piston outlet channel 275 are each connected to a respective fluid inlet 206 and a respective fluid outlet 261.

For the embodiments, a small piston 248 may be slidably disposed in the first piston cavity (e.g., small piston cavity 228) and a large piston 272 may be slidably disposed in the second piston cavity (e.g., large piston cavity 207), the small piston 248 having a smaller displacement volume than the displacement volume of the large piston 272. An eccentric wheel 231 may be included in the drive cavity 211 to drive the small piston 248 and the large piston 272.

In various embodiments, a small piston low-pressure one-way outlet valve 243 and a small piston high-pressure one-way outlet valve 244 may be disposed in series in the small piston outlet channel 221 between the fluid inlet 206 and the fluid outlet 261 connected to the small piston outlet channel 221 to form a small piston temporary storage cavity 263 between the small piston low-pressure one-way outlet valve 243 and the small piston high-pressure one-way outlet valve 244. For these embodiments, the small piston low-pressure one-way outlet valve 243 and the small piston high-pressure one-way outlet valve 244 may be oriented in the small piston outlet channel 221 such that a fluid can flow from the fluid inlet 206 to the fluid outlet 261 of the small piston outlet channel 221 but cannot flow in opposite direction from the fluid outlet 261 to the fluid inlet 206 of the small piston outlet channel 221. Further, the small piston temporary storage cavity 263 may be connected to the first piston cavity (e.g., small piston cavity 228).

In the same embodiments, a large piston low-pressure one-way outlet valve 276 and a large piston high-pressure one-way outlet valve 277 may be disposed in series in the large piston outlet channel 275 between the fluid inlet 206 and the fluid outlet 261 connected to the large piston outlet channel 275 to form a large piston temporary storage cavity 278 between the large piston low-pressure one-way outlet valve 276 and the large piston high-pressure one-way outlet valve 277 as illustrated, for example, in FIG. 21. For these embodiments, the large piston low-pressure one-way outlet valve 276 and the large piston high-pressure one-way outlet valve 277 may be oriented in the large piston outlet channel 275 such that a fluid can flow from the fluid inlet 206 to the fluid outlet 261 of the large piston outlet channel but cannot flow in opposite direction from the fluid outlet to the fluid inlet of the large piston outlet channel 275. Further, the large piston temporary storage cavity 278 may be connected to the second piston cavity (e.g., large piston cavity 207).

Although the various one-way valves that were described above were all described as being ball and spring check valves, in alternative embodiments, other types of one-way valves may be employed in various alternative embodiments as one of ordinary skill in the art will recognize.

Figure 25:
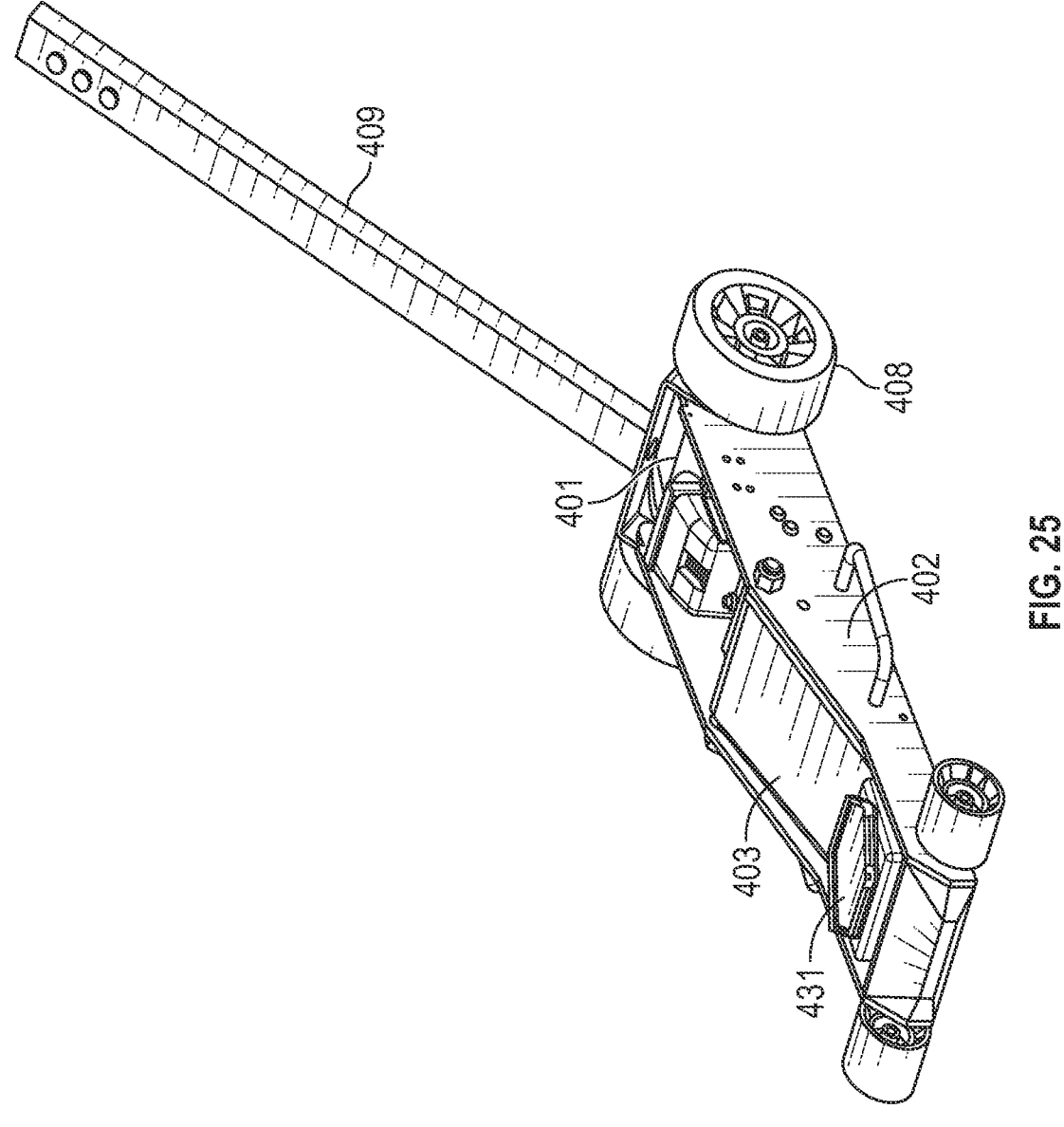
FIG. 25 is a perspective view of an example hydraulic jack according to some example embodiments.
Figure 26:
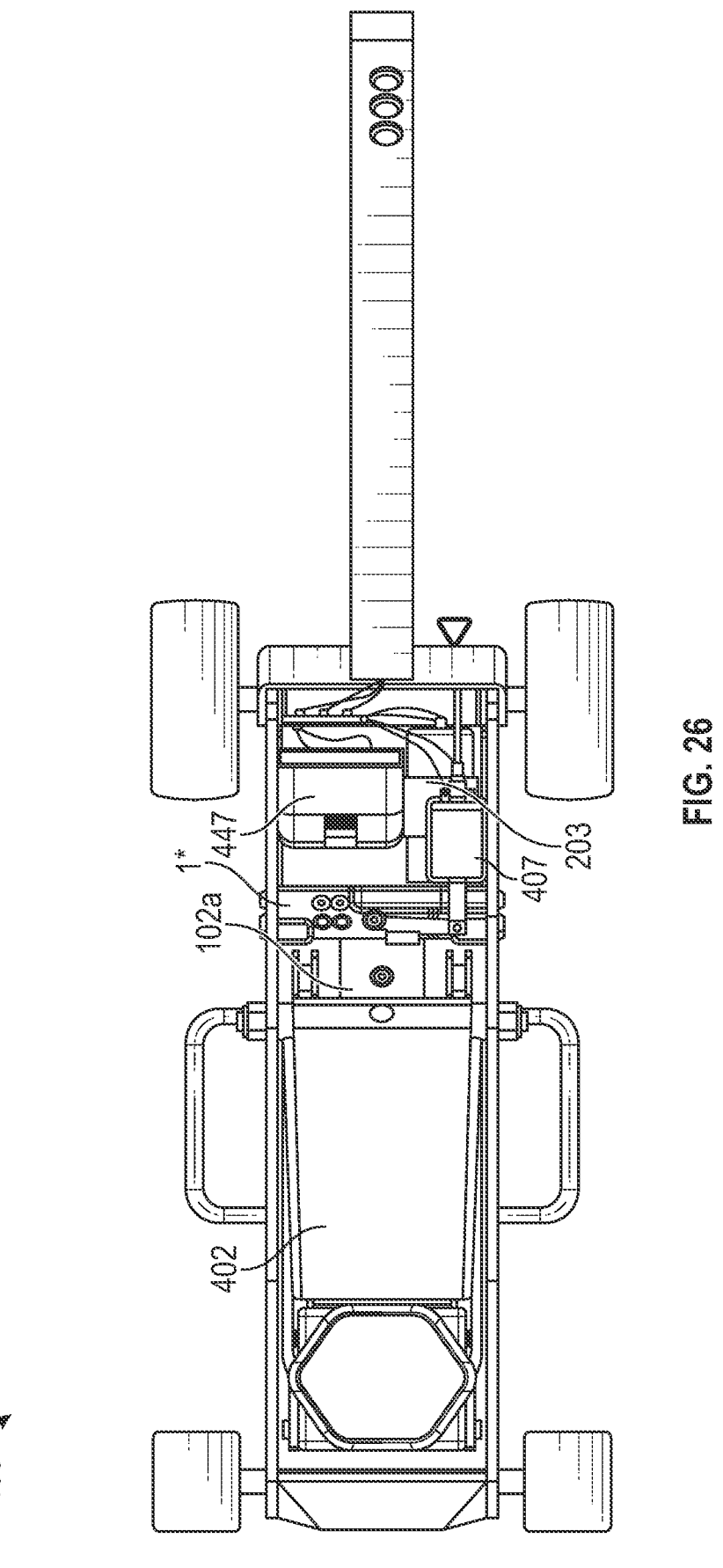
FIG. 26 is another perspective view of the example hydraulic jack of FIG. 25 according to some example embodiments.

FIG. 25 is a perspective view of an example hydraulic jack according to various embodiments. As illustrated, the hydraulic jack 400 includes a hydraulic jack body 401, a frame assembly 402, an arm assembly 403, wheels 408, a handle 409, and a saddle 431. FIG. 26 is another perspective view of the example hydraulic jack of FIG. 25 according to various embodiments. As illustrated in FIG. 26, the hydraulic jack 400 may additionally include a hydraulic unit base 1\* (e.g., the hydraulic unit base 1a, 1b, or 1c of FIG. 10, 18, or 23), a hydraulic cylinder assembly 102a, a driving mechanism 407, and a motor 203. In various embodiments, the driving mechanism 407 may include, among other things, a driving assembly 3, a driver 4, and a manual puller 7.

Figure 27:
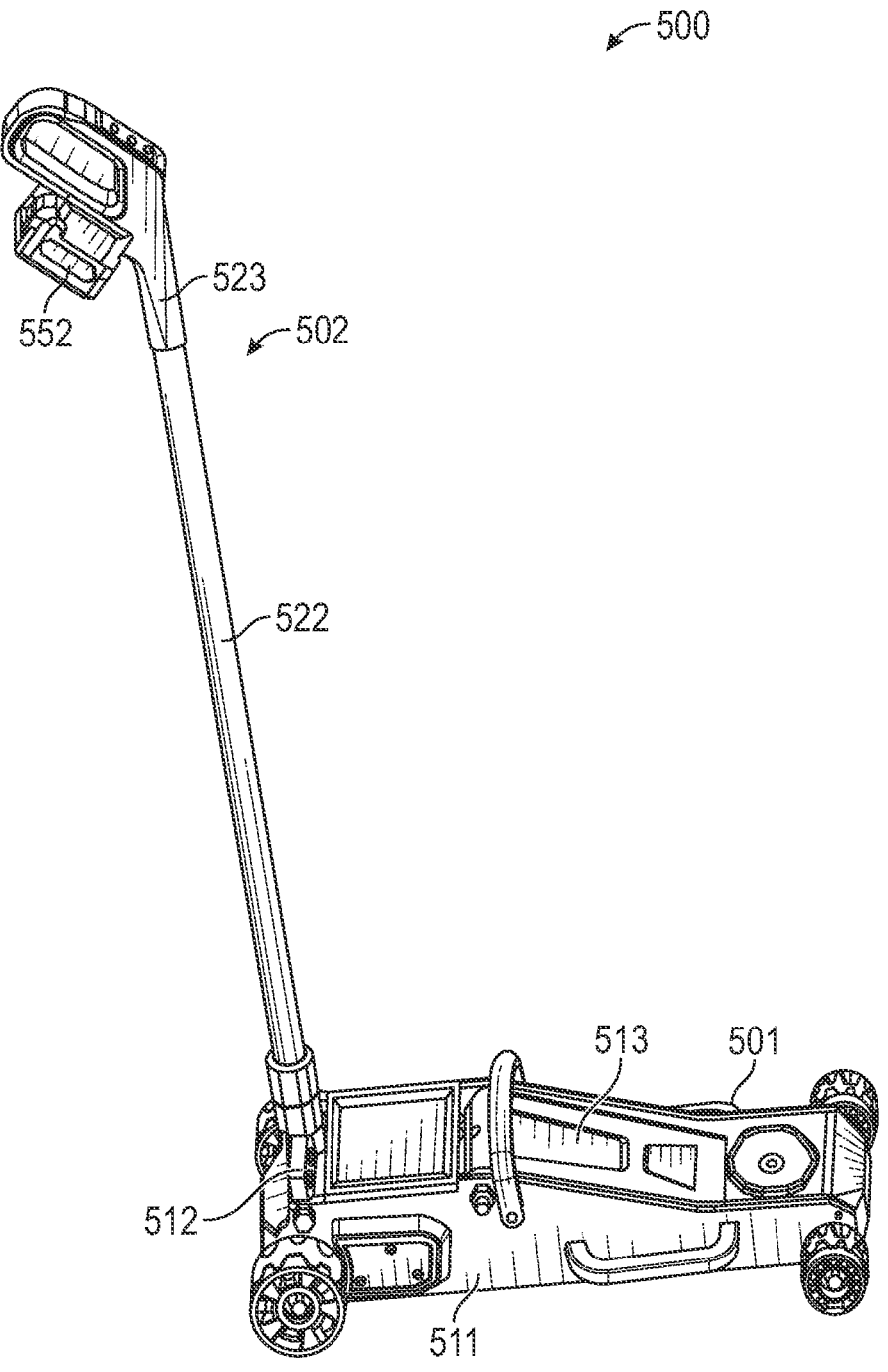
FIG. 27 is a perspective view of another example hydraulic jack with a handle assembly according to some example embodiments.
Figure 28:
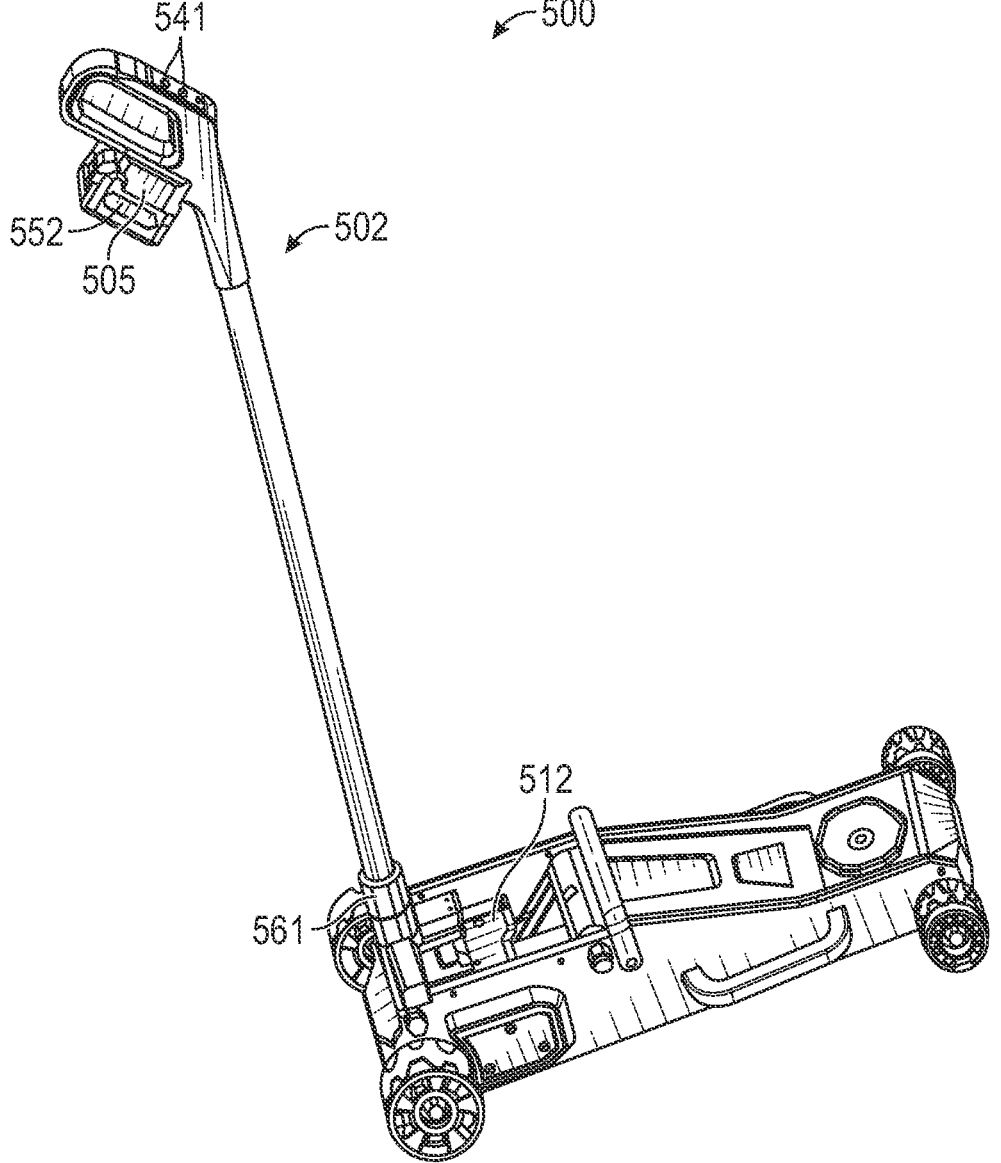
FIG. 28 is another perspective view of the example hydraulic jack of FIG. 27 according to some example embodiments.
Figure 29:
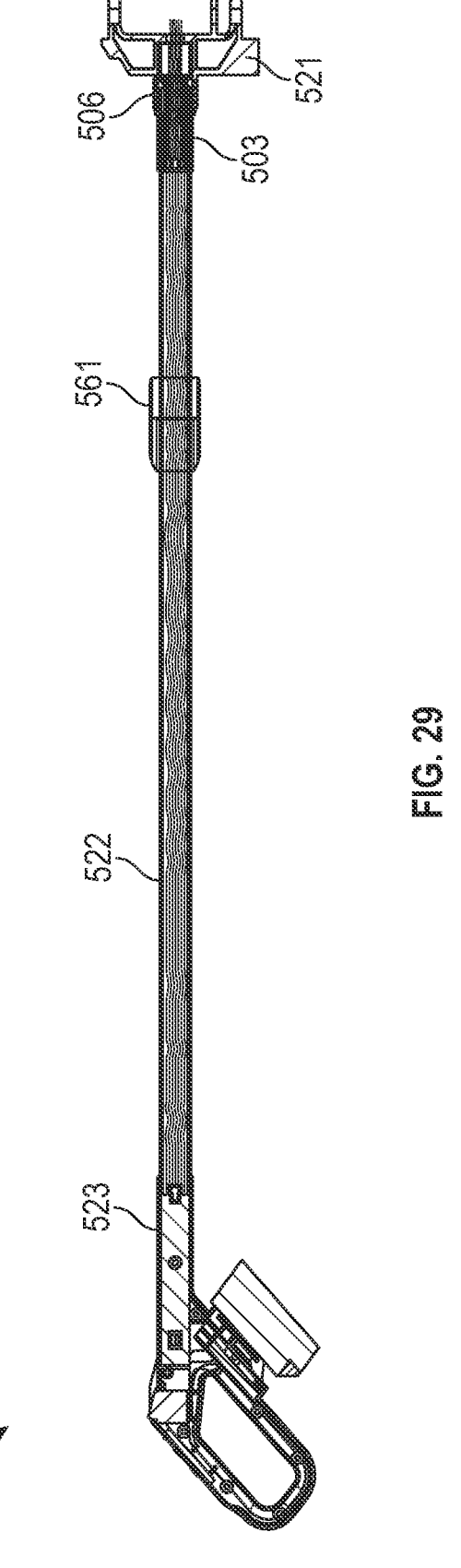
FIG. 29 illustrates the handle assembly of FIGS. 27 and 28, in isolation, according to some example embodiments.
Figure 30:
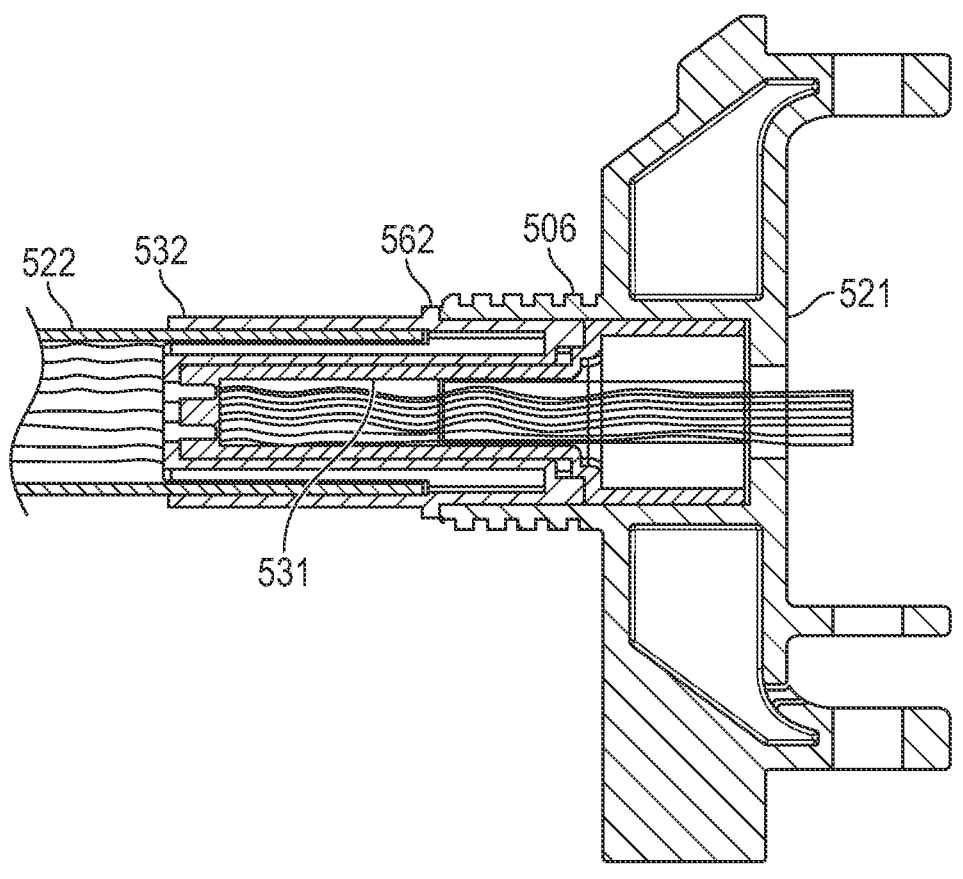
FIG. 30 illustrates selective components of the handle assembly of FIG. 29 according to some example embodiments.
Figure 31:
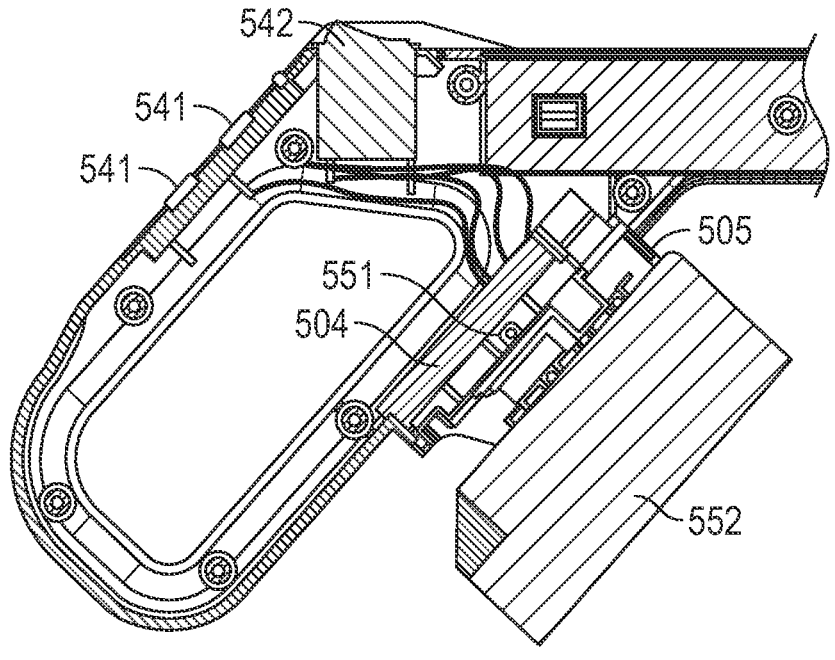
FIG. 31 illustrates selective components of the handle assembly of FIG. 29 according to some example embodiments.

FIGS. 27 to 31 illustrate a handle assembly for a hydraulic jack according to various embodiments. More particularly, FIGS. 27 and 28 illustrate different perspective views of a hydraulic jack 500 that includes a handle assembly 502 in accordance with some example embodiments, while FIG. 29 illustrates the handle assembly 502 of FIGS. 27 and 28 in isolation, and FIGS. 30 and 31 illustrate selective components of the handle assembly 502. As illustrated, the hydraulic jack 500 may include a jack body 501 and a handle assembly 502 that may be connected to the jack body 501. In various embodiments, the handle assembly 502 may include a handle yoke 521 movably installed on the jack body 501. For these embodiments, a handle tube 522 may be detachably installed on the handle yoke 521, and a handle 523 may be installed on the handle tube 522. For the embodiments, the handle 523 is equipped with a control circuit board 504, a lifting work switch 541, and a power switch 542 that are electrically connected to the control circuit board 504. A female plug 532 is connected to the control circuit board 504 through wires, and the male plug 531 may be connected to the electronic control device in the jack body 501 through wires.

The electronic control device in the jack body 501 may include a motor for driving the electric pump of the hydraulic jack to start and a driver (e.g., one or more electromagnets) for opening the hydraulic fluid release valve. For the embodiments, the male plug 531 may be connected to a motor, such as the previously described motor 203, and a driver 4, such as one or more push-pull electromagnets through wires. The lifting work switch 541 may include a lift switch that controls the start of the motor 203 and, a drop switch that controls the start of the driver 4. In various embodiments, the handle 523 is also equipped with a battery pack holder 505. The battery pack holder 505 is installed with a battery pack wiring board 551 that is electrically connected to the control circuit board 504 and a removable battery pack 552 that is installed in the battery pack holder 505 and is electrically connected with the battery pack wiring board 551. The battery pack 552 may be used to power the control circuit board 504 and the electronic control devices on the hydraulic jack 500. In some cases, multiple battery packs can be charged and used in rotation, making the entire electric hydraulic floor jack application more convenient. The jack body 501, as described herein, may include a frame assembly 511, a hydraulic fluid pump assembly 512 installed on the frame assembly 511, and an arm assembly 513 installed on the frame assembly 511 and connected to the hydraulic fluid pump assembly 512.

In one embodiment, the handle assembly 502 further includes a threaded connection sleeve 506 provided on the handle yoke 521, and a nut 561, which is movably installed on the handle tube 522 for connecting with the threaded connection sleeve 506 and locking the handle tube 522 on the handle 521 while preventing the male plug 531 and the female plug 532 from easily coming off.

In one embodiment, the handle tube 522 and the handle yoke 521 are also provided with an aviation plug 503 for preliminary connection of the handle tube 522 and the handle yoke 521 and for wire connection. The aviation plug 503 includes a male plug 531 connected in the handle 521 and a female plug 532 connected in the handle tube 522 and adapted to the male plug 531. The female plug 32 may be provided with a position limit step for the nut 561. The limit step 562, in various embodiments, has a blocking effect.

In various embodiments, after the male plug 531 and the female plug 532 are connected, the nut 561 may be screwed to the threaded connection sleeve 5066 through the thread.

When tightening, the nut 561 exerts force on the limit step 562 of the female plug 532. As a result, the female plug 532 and the male plug 531 are locked to prevent disconnection of the female plug 532 and the male plug 531 during use and avoiding the disconnection of the circuit and disconnection between the handle tube 522 and the handle 521. That is, the locking connection between the handle tube 522 and the handle yoke 521 is completed.

By installing the aviation plug 503 on the handle yoke 521 and the handle tube 522, and installing the female plug 532 and the male plug 531 of the aviation plug 503 on the handle tube 522 and the handle yoke 521 respectively, the handle tube 522 can be detached from the handle yoke 521 when the hydraulic jack 500 is packaged, thereby reducing the packaging volume of the jack, and reducing transportation costs. When the handle tube 522 is installed on the handle 521 when using the hydraulic jack 500 again, the male plug 531 and the female plug 532 can be connected to complete the circuit connection, and the disassembly and assembly connection of the handle yoke 521 and the handle tube 522 may be simple, convenient, and fast.

When installing and connecting the handle assembly 502, the end of the handle tube 522 may be inserted with the female plug 532 into the threaded connection sleeve 506. When inserting, the female plug 532 should be aligned with the male plug 531 until the limiter 562 is connected to the thread during the insertion process. In various embodiments, after the end of the sleeve 506 is in contact, the insertion may be completed, and then the nut 561 may be moved to the threaded connecting sleeve 506 and then rotated. After the nut 561 and the threaded connecting sleeve 506 are tightened through the threads, the nut 561 presses the limit step 562. At this time, the connection and installation of the handle assembly 502 may be completed, and the circuit connection between the electronic control device in the hydraulic jack 500 and the control circuit board 4 is completed.

When in use, an operator can control the start of the motor 203 or the driver 4 of the hydraulic jack 500 by driving the corresponding lifting work switch 541. When motor 203 is started, the hydraulic jack 500 is operating in a lifting mode, and when driver 4 is started, the hydraulic fluid release valve is opened to return the hydraulic fluid to the hydraulic fluid tank, and the hydraulic jack 500 is lowered.

In various embodiments, when the handle assembly 502 needs to be disassembled, the first step is to loosen the nut 561, and then pull out the handle tube 522. The handle tube 522 drives the female plug 532 to move outward until the female plug 532 and the male plug 531 are disconnected, and the disassembly is completed. Finally, as a result of the disassembly, the volume of the entire jack can be substantially reduced, thereby reducing the occupied space and the packaging volume.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A hydraulic fluid release valve assembly, comprising:
a hydraulic unit base with a hydraulic fluid return channel;
a hydraulic fluid release valve that is at least partially inserted in the hydraulic fluid return channel;
a driving assembly to apply a pushing force on the hydraulic release valve to open the hydraulic fluid release valve; and
an electric driver connected to the driving assembly, the electric driver, when actuated, causes the driving assembly to move to apply the pushing force to the hydraulic fluid release valve, wherein the driving assembly includes a driving arm, an end of the driving arm being connected to the electric driver, wherein the driving arm is an articulated arm with a pivot point;
wherein the hydraulic fluid return channel of the hydraulic unit base has a first end and a second end opposite of the first end, wherein the first end of the hydraulic fluid return channel is located at a surface of the hydraulic unit base and the second end of the hydraulic fluid return channel is a closed-end enclosed by a block, and wherein the hydraulic fluid release valve partially extends out of the hydraulic unit base through the first end of the hydraulic fluid return channel;
wherein the hydraulic fluid release valve comprises a valve pin movably placed in the hydraulic fluid return channel and having a first end and a second end opposite of the first end, the first end of the valve pin being nearer to the first end of the hydraulic fluid return channel than the second end of the valve pin;
wherein the valve pin is a two-stage valve pin that includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity.

2. The hydraulic fluid release valve assembly of claim 1, wherein disposed between the two-stage valve pin and the second end of the hydraulic fluid return channel is a single spring between the primary valve pin and the second end of the hydraulic fluid return channel without a second spring disposed between the secondary valve pin and the send end of the hydraulic fluid return channel.

3. The hydraulic fluid release valve assembly of claim 1, wherein the hydraulic fluid release valve comprises:
a valve seat disposed in the hydraulic fluid return channel between the first end of the valve pin and the first end of the hydraulic fluid return channel to seat the first end of the valve pin when the valve pin is urged to mate with the valve seat, wherein when the valve pin is seated on the valve seat, hydraulic fluid is prevented from flowing through the hydraulic fluid return channel.

4. The hydraulic fluid release valve assembly of claim 3, wherein the valve seat protrudes inward from one or more walls of the hydraulic fluid return channel.

5. The hydraulic fluid release valve assembly of claim 3, wherein the hydraulic fluid release valve further comprises a push rod movably disposed in the hydraulic fluid return channel and having a first end and a second end opposite of the first end, the first end of the push rod extending out of the hydraulic unit base through the first end of the hydraulic fluid return channel.

6. The hydraulic fluid release valve assembly of claim 5, wherein the hydraulic fluid release valve further comprises a first spring in contact with the push rod to urge the push rod towards the first end of the hydraulic fluid return channel, and a second spring disposed between the second end of the valve pin and the second end of the hydraulic fluid return channel to urge the first end of the valve pin towards the valve seat.

7. The hydraulic fluid release valve assembly of claim 6, wherein the hydraulic unit base includes a hydraulic fluid inlet and a hydraulic fluid outlet connected to the hydraulic fluid return channel, the hydraulic fluid inlet to connect with a high-pressure hydraulic source to receive pressurized hydraulic fluid from the high-pressure hydraulic source and the hydraulic fluid outlet to connect with a hydraulic fluid tank to discharge the pressurized hydraulic fluid into the hydraulic fluid tank via the hydraulic fluid return channel.

8. The hydraulic fluid release valve assembly of claim 7, wherein the valve seat divides the hydraulic fluid return channel into a first channel segment and a second channel segment, the first channel segment includes the push rod and the second channel segment includes the valve pin, and wherein the hydraulic fluid outlet is connected to the first channel segment and the hydraulic fluid inlet is connected to the second channel segment.

9. A hydraulic fluid release valve assembly, comprising:
a hydraulic unit base with a hydraulic fluid return channel;
a hydraulic fluid release valve that is at least partially inserted in the hydraulic fluid return channel;
a driving assembly to apply a pushing force on the hydraulic release valve to open the hydraulic fluid release valve; and
a driver connected to the driving assembly, the driver, when actuated, causes the driving assembly to move to apply the pushing force to the hydraulic fluid release valve;
wherein the hydraulic fluid return channel of the hydraulic unit base has a first end and a second end opposite of the first end, wherein the first end of the hydraulic fluid return channel is located at a surface of the hydraulic unit base and the second end of the hydraulic fluid return channel is a closed-end enclosed by a block, and wherein the hydraulic fluid release valve partially extends out of the hydraulic unit base through the first end of the hydraulic fluid return channel;
wherein the hydraulic fluid release valve comprises:
a valve pin movably placed in the hydraulic fluid return channel and having a first end and a second end opposite of the first end, the first end of the valve pin being nearer to the first end of the hydraulic fluid return channel than the second end of the valve pin; and
a valve seat disposed in the hydraulic fluid return channel between the first end of the valve pin and the first end of the hydraulic fluid return channel to seat the first end of the valve pin when the valve pin is urged to mate with the valve seat, wherein when the valve pin is seated on the valve seat, hydraulic fluid is prevented from flowing through the hydraulic fluid return channel;

wherein the hydraulic fluid release valve further comprises a push rod movably disposed in the hydraulic fluid return channel and having a first end and a second end opposite of the first end, the first end of the push rod extending out of the hydraulic unit base through the first end of the hydraulic fluid return channel;

wherein the hydraulic fluid release valve further comprises a first spring in contact with the push rod to urge the push rod towards the first end of the hydraulic fluid return channel, and a second spring disposed between the second end of the valve pin and the second end of the hydraulic fluid return channel to urge the first end of the valve pin towards the valve seat;

wherein the valve pin is a two-stage valve pin that includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity; and wherein an outer surface of the primary valve pin is provided with a spiral groove.

10. The hydraulic fluid release valve assembly of claim 1, wherein an outer surface of the secondary valve pin is provided with an outlet groove.

11. The hydraulic fluid release valve assembly of claim 5, wherein a guide slope piece is attached to the driving arm to push down on the push rod when the electric driver is actuated.

12. The hydraulic fluid release valve assembly of claim 1, wherein the electric driver includes at least one of a push-pull electromagnet, an electric push rod, an air cylinder, a hydraulic cylinder, or a servo cam mechanism.

13. A valve assembly, comprising:

a hydraulic unit base having a hydraulic fluid return channel disposed in the hydraulic unit base, the hydraulic fluid return channel having a first end and a second end opposite of the first end, wherein the first end of the hydraulic fluid return channel is located at a surface of the hydraulic unit base and the second end of the hydraulic fluid return channel is a closed-end enclosed by a block;

a hydraulic fluid release valve that is at least partially inserted in the hydraulic fluid return channel, wherein the hydraulic fluid release valve partially extends out of the hydraulic unit base through the first end of the hydraulic fluid return channel;

wherein the hydraulic fluid release valve includes a two-stage valve pin movably disposed in the hydraulic fluid return channel and having a first end and a second end opposite of the first end, the first end of the two-stage valve pin being nearer to the first end of the hydraulic fluid return channel than the second end of the two-stage valve pin, the two-stage valve pin includes a primary valve pin and a secondary valve pin, the primary valve pin movably disposed in a secondary valve pin cavity of the secondary valve pin, a push pin attached to an end of the primary valve pin, wherein the push pin extends out of a hole at an end of the secondary valve pin cavity when the primary valve pin is fully inserted into the secondary valve pin cavity;

a valve seat disposed in the hydraulic fluid return channel between the two-stage valve pin and the first end of the hydraulic fluid return channel to seat the first end of the two-stage valve pin when the two-stage valve pin is urged to mate with the valve seat, wherein when the primary valve pin is fully inserted into the secondary valve pin cavity and when the two-stage valve pin is seated on the valve seat, hydraulic fluid is prevented from flowing through the hydraulic fluid return channel;

a push rod movably disposed in the hydraulic fluid return channel and having a first end and a second end opposite of the first end, the first end of the push rod extending out of the hydraulic unit base through the first end of the hydraulic fluid return channel and the second end of the push rod to contact the push pin first before contacting the secondary valve pin when the push rod is urged towards the second end of the hydraulic fluid return channel;

a driving assembly to apply a pushing force on the hydraulic release valve to open the hydraulic fluid release valve; and an electric driver connected to the driving assembly, the electric driver, when actuated, causes the driving assembly to move to apply the pushing force to the hydraulic fluid release valve, wherein the driving assembly includes a driving arm, an end of the driving arm being connected to the electric driver, wherein the driving arm is an articulated arm with a pivot point.

14. The valve assembly of claim 13, wherein the hydraulic fluid return channel includes a first spring in contact with the push rod to urge the push rod towards the first end of the hydraulic fluid return channel, and a single second spring disposed between the second end of the two-stage valve pin and the second end of the hydraulic fluid return channel to urge both the primary valve pin and the secondary valve pin of the two-stage valve pin towards the valve seat.

15. The valve assembly of claim 14, wherein the second spring is in contact with another end of the primary valve pin that is opposite from the end of the primary valve pin attached to the push pin to urge the primary valve pin to be fully inserted into the secondary valve pin cavity and to fully extend the push pin out of the hole at the end of the secondary valve pin.

16. The hydraulic fluid release valve assembly of claim 1, further comprising a sealing ball disposed between the push pin and the primary valve pin, wherein the sealing ball having a larger diameter than a diameter of the hole at the end of the secondary valve pin cavity.

\* \* \* \* \*